US012562843B2

(12) United States Patent
Zhang

(10) Patent No.: US 12,562,843 B2
(45) Date of Patent: Feb. 24, 2026

(54) METHOD AND DEVICES FOR SELECTING TIME-FREQUENCY RESOURCES FOR CONTROL FEEDBACK

(71) Applicant: Apogee Networks, LLC, Dallas, TX (US)

(72) Inventor: Xiaobo Zhang, Shanghai (CN)

(73) Assignee: Apogee Networks, LLC, Dallas, TX (US)

( * ) Notice: Subject to any disclaimer, the term of this patent is extended or adjusted under 35 U.S.C. 154(b) by 240 days.

(21) Appl. No.: 17/974,552

(22) Filed: Oct. 27, 2022

(65) Prior Publication Data

US 2023/0045832 A1     Feb. 16, 2023

Related U.S. Application Data

(63) Continuation of application No. PCT/CN2021/094346, filed on May 18, 2021.

(30) Foreign Application Priority Data

May 19, 2020    (CN) .......................... 202010422182.7
Jun. 4, 2020    (CN) .......................... 202010500247.5

(51) Int. Cl.
*H04L 1/18*          (2023.01)
*H04L 1/1812*        (2023.01)
(Continued)

(52) U.S. Cl.
CPC ....... *H04L 1/1812* (2013.01); *H04W 72/0446* (2013.01); *H04W 72/0453* (2013.01); *H04W 72/21* (2023.01)

(58) Field of Classification Search
CPC ................. H04L 5/0055; H04L 1/1896; H04L 1/1854; H04L 1/1812; H04L 5/001;
(Continued)

(56) References Cited

U.S. PATENT DOCUMENTS 11,595,973 B2 *   2/2023   Wang .................... H04L 5/0055
11,973,602 B2 *   4/2024   Kim .................. H04W 72/0446
(Continued)

FOREIGN PATENT DOCUMENTS

CN          111132329 A      5/2020
WO      2011137408 A2    11/2011
(Continued)

OTHER PUBLICATIONS

Second Office Action of Chinese patent application No. CN202010422182.7 dated Jan. 25, 2024.
Notification to Grant Patent Right for Invention of Chinese patent application No. CN202010500247.5 dated Jan. 22, 2024.
(Continued)

*Primary Examiner* — Brian D Nguyen
(74) *Attorney, Agent, or Firm* — Volpe Koenig

(57)          ABSTRACT

Disclosure provides a method and device in a node for wireless communications. A first receiver, receives a first signaling; and a first transmitter, transmits a first signal in a target time-frequency-resource block, and the first signal carries a second bit block; herein, the first signaling is used to determine a first bit block; the first bit block comprises a second-type HARQ-ACK; the first bit block is used to generate the second bit block; the first time-frequency-resource block and the second time-frequency-resource block are respectively reserved for different bit blocks; a number of resources used to transmit a first-type HARQ-ACK in the first time-frequency-resource block is used to determine whether the target time-frequency-resource block is the first time-frequency-resource block or the second time-frequency-resource block; the first-type HARQ-ACK corresponds to a first index; the second-type HARQ-ACK corresponds to a second index; the first signaling indicates the second index.

20 Claims, 7 Drawing Sheets

(51) Int. Cl.

| | | |
|---|---|---|
| *H04W 72/04* | (2023.01) | |
| *H04W 72/0446* | (2023.01) | |
| *H04W 72/0453* | (2023.01) | |
| *H04W 72/21* | (2023.01) | |

(58) Field of Classification Search

CPC ............. H04W 72/0453; H04W 72/21; H04W 72/0446; H04W 72/569

See application file for complete search history.

(56) References Cited

U.S. PATENT DOCUMENTS

| | | | | |
|---|---|---|---|---|
| 2015/0263829 | A1 | 9/2015 | Nguyen | |
| 2018/0159675 | A1 | 6/2018 | Yang et al. | |
| 2019/0327755 | A1 | 10/2019 | Xiong et al. | |
| 2019/0364543 | A1 | 11/2019 | Ugurlu et al. | |
| 2021/0050966 | A1* | 2/2021 | Liu | H04L 5/0091 |
| 2021/0099268 | A1* | 4/2021 | Yan | H04L 5/0055 |
| 2021/0160013 | A1* | 5/2021 | Kim | H04B 7/024 |
| 2022/0116171 | A1* | 4/2022 | Zhang | H04L 5/0094 |
| 2023/0164762 | A1* | 5/2023 | Lin | H04W 72/11 |
| | | | | 370/329 |
| 2023/0164847 | A1* | 5/2023 | Kim | H04W 74/0833 |
| | | | | 370/329 |

FOREIGN PATENT DOCUMENTS

| | | |
|---|---|---|
| WO | 2019137467 A1 | 7/2019 |
| WO | 2020033941 A1 | 2/2020 |

OTHER PUBLICATIONS

First Search Report of Chinese patent application No. CN202010500247.5 dated Jan. 16, 2024.

Oppo"Summary#1 on UCI enhancements for R16 URLLC"3GPP TSG RAN WG1 #100-e R1-2001016 Feb. 18, 2020.

Huawei, HiSilicon "UL intra-UE multiplexing between control channels"3GPP TSG RAN WG1 Meeting #97 R1-1907547 May 4, 2019.

Ericsson "Uu-based sidelink resource allocation" 3GPP TSG-RAN WG1 Meeting #99 R1-1912598 Nov. 29, 2019.

Oppo "Remaining issues of mode 1 resource allocation for NR-V2X" 3GPP TSG RAN WG1 #100 R1-2000490 Mar. 6, 2020.

ISR received in application No. PCT/CN2021/094346 dated Aug. 17, 2021.

First Office Action of Chinese patent application No. CN202010422182.7 dated Dec. 14, 2023.

First Search Report of Chinese patent application No. CN202010422182.7 dated Dec. 13, 2023.

Third Generation Partnership Project, "Technical Specification Group Radio Access Network; NR; Multiplexing and channel coding (Release 16)," 3GPP TS 38.212 V16.1.0 (Mar. 2020).

Third Generation Partnership Project, "Technical Specification Group Radio Access Network; NR; Physical layer procedures for control (Release 16)," 3GPP TS 38.212 V16.1.0 (Mar. 2020).

Third Generation Partnership Project, "Technical Specification Group Radio Access Network; NR; Physical layer procedures for data (Release 16)," 3GPP TS 38.212 V16.1.0 (Mar. 2020).

Third Generation Partnership Project, "Technical Specification Group Radio Access Network; NR; Radio Resource Control (RRC) protocol specification (Release 16)," 3GPP TS 38.212 V16.1.0 (Mar. 2020).

\* cited by examiner

Start

S61B: is first target index the first index and second target index the second index?

Yes                                            No

S62B. second sub-signal does not carry a bit block generated by second bit block S63B. second sub-signal carries a bit block generated by second bit block End

FIG. 6B

Start

S71: Whether a number of resources used to transmit first-type HARQ-ACK in first time-frequency resource block is greater than first value?

No                                            Yes

S72. target time-frequency resource block is first time-frequency resource block S73. target time-frequency resource block is second time-frequency resource block End

FIG. 7A

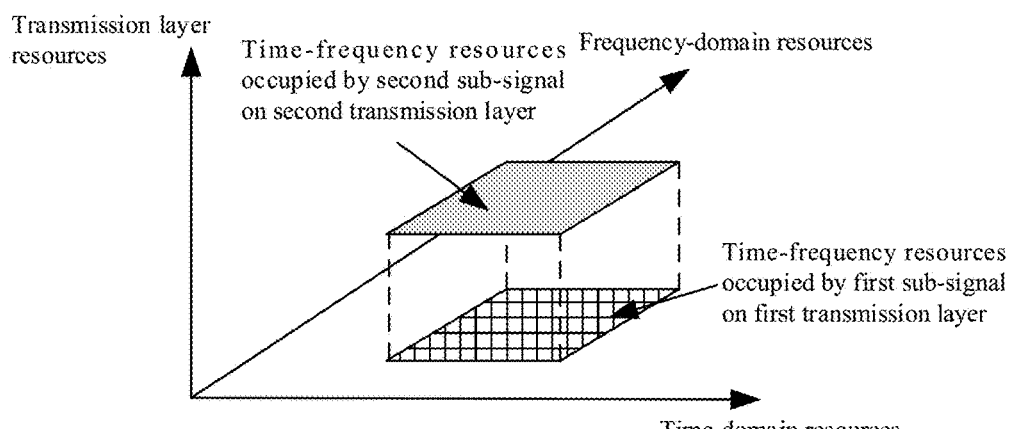

Transmission layer resources

Time-frequency resources occupied by second sub-signal on second transmission layer Frequency-domain resources Time-frequency resources occupied by first sub-signal on first transmission layer Time-domain resources

METHOD AND DEVICES FOR SELECTING TIME-FREQUENCY RESOURCES FOR CONTROL FEEDBACK

CROSS REFERENCE TO RELATED APPLICATIONS

This application is a continuation of International Application No. PCT/CN2021/094346, filed May 18, 2021, which claims the priority benefit of Chinese Patent Application No. 202010422182.7, filed on May 19, 2020, and claims the priority benefit of Chinese Patent Application No. 202010500247.5, filed on Jun. 4, 2020 the full disclosure of which is incorporated herein by reference.

BACKGROUND

Technical Field

The present disclosure relates to transmission methods and devices in wireless communication systems, and in particular to a method and device of radio signal transmission in wireless communication systems supporting cellular networks.

Related Art

In a 5G system, Enhance Mobile Broadband (eMBB) and Ultra Reliable and Low Latency Communication (URLLC) are two typical service types. Targeting requirements for lower target BLER of URLLC services, a new Modulation and Coding Scheme (MCS) table has been defined in 3rdGeneration Partner Project (3GPP) New Radio (NR) Release 15. For the purpose of supporting more demanding URLLC services in 5G system, for example, with higher reliability (e.g., a target BLER is 10^-6) or with lower delay (e.g., 0.5-1 ms), in the 3GPP NR Release 16, a DCI signaling can indicate a scheduled service is of Low Priority or High Priority, wherein the Low Priority corresponds to URLLC services, while the High Priority corresponds to eMBB services. When a low-priority transmission overlaps with a high-priority transmission in time domain, the high-priority one is performed, and the low-priority one is dropped.

A Work Item (WI) of URLLC enhancement in NR Release 17 was approved at the 3GPP RAN #86 Plenary, and a focus of study in this WI is multiplexing of various Intra-UE (that is, User Equipment) services.

SUMMARY

In the existing protocols, when a high-priority Physical Uplink Shared CHannel (PUSCH) collides with a Physical Uplink Control CHannel (PUCCH) carrying low-priority Uplink Control Information (UCI) (especially the Hybrid Automatic Repeat reQuest Acknowledgement (HARQ-ACK)), the low-priority UCI is dropped directly; this collision handling method will reduce overall system efficiency. After introducing multiplexing of intra-UE services of different priorities, it is possible to multiplex the low-priority UCI onto the high-priority PUSCH; how to reasonably deal with the multiplexing of the low-priority UCI onto the high-priority PUSCH is a key problem to be solved.

To address the above problem, the present disclosure provides a solution. It should be noted that though the present disclosure only took the Uplink for example in the statement above, it is also applicable to other scenarios of Downlink and Sidelink, where similar technical effects can be achieved. Additionally, the adoption of a unified solution for various scenarios (including but not limited to Uplink, Downlink and Sidelink) contributes to the reduction of hardcore complexity and costs. It should be noted that the embodiments in a User Equipment (UE) in the present disclosure and characteristics of the embodiments may be applied to a base station if no conflict is incurred, and vice versa. And the embodiments in the present disclosure and the characteristics in the embodiments can be arbitrarily combined if there is no conflict.

In one embodiment, interpretations of the terminology in the present disclosure refer to definitions given in the 3GPP TS36 series.

In one embodiment, interpretations of the terminology in the present disclosure refer to definitions given in the 3GPP TS38 series.

In one embodiment, interpretations of the terminology in the present disclosure refer to definitions given in the 3GPP TS37 series.

In one embodiment, interpretations of the terminology in the present disclosure refer to definitions given in Institute of Electrical and Electronics Engineers (IEEE) protocol specifications.

The present disclosure provides a method in a first node for wireless communications, comprising:

receiving a first signaling; and transmitting a first signal in a target time-frequency-resource block, the first signal carrying a second bit block;

herein, the first signaling is used to determine a first bit block; the first bit block comprises a second-type HARQ-ACK; the first bit block is used to generate the second bit block; the target time-frequency-resource block is a first time-frequency-resource block or a second time-frequency-resource block; the first time-frequency-resource block and the second time-frequency-resource block are respectively reserved for different bit blocks; a number of resources used to transmit a first-type HARQ-ACK in the first time-frequency-resource block is used to determine whether the target time-frequency-resource block is the first time-frequency-resource block or the second time-frequency-resource block; the first-type HARQ-ACK corresponds to a first index; the second-type HARQ-ACK corresponds to a second index, and the first index is not equal to the second index; the first signaling indicates the second index; and the first time-frequency-resource block corresponds to the first index.

In one embodiment, a problem to be solved in the present disclosure includes: when a PUCCH carrying low-priority UCI collides with multiple high-priority PUSCHs, how to determine onto which the high-priority PUSCH the low-priority UCI is multiplexed.

In one embodiment, a problem to be solved in the present disclosure includes: when a PUCCH carrying eMBB-service-type UCI collides with multiple PUSCHs reserved for URLLC service type, how to determine onto which the PUSCHs reserved for URLLC service type the eMBB-service-type UCI is multiplexed.

In one embodiment, the essence of the above method is in that: when a PUCCH carrying low-priority UCI collides with multiple high-priority PUSCHs in different serving cells, whether the high-priority PUSCH in a first serving cell carries high-priority UCI is used to determine the high-priority PUSCH in which of the different serving cells that the low-priority UCI is multiplexed onto; the first serving cell is a serving cell with a smallest serving cell index among the different serving cells.

In one embodiment, the essence of the above method is in that: when a PUCCH carrying eMBB-service-type UCI collides with multiple PUSCHs with URLLC service types in different serving cells, whether the URLLC-service-type PUSCH in a first serving cell carries the URLLC-service-type UCI is used to determine the URLLC-service-type PUSCH in which of the different serving cells that the eMBB-service-type UCI is multiplexed onto; the first serving cell is a serving cell with a smallest serving cell identity (ID) among the different serving cells.

In one embodiment, the essence of the above method is in that: when a PUCCH carrying low-priority UCI collides with multiple high-priority PUSCHs in different serving cells, a number of resources used to transmit high-priority UCI in the high-priority PUSCH in a first serving cell is used to determine the high-priority PUSCH in which of the different serving cells that the low-priority UCI is multiplexed onto; the first serving cell is a serving cell with a smallest serving cell ID among the different serving cells.

In one embodiment, the essence of the above method is in that: when a PUCCH carrying eMBB-service-type UCI collides with multiple URLLC-service-type PUSCHs in different serving cells, a number of resources used to transmit URLLC-service-type UCI in the URLLC-service-type PUSCH in a first serving cell is used to determine the URLLC-service-type PUSCH in which of the different serving cells that the eMBB-service-type UCI is multiplexed onto; the first serving cell is a serving cell with a smallest serving cell ID among the different serving cells.

In one embodiment, the above method is advantageous in that: it enhances transmission performance of UCI, thus improving system efficiency.

In one embodiment, the above method is advantageous in that: when a PUCCH carrying low-priority UCI collides with multiple high-priority PUSCHs and one of the multiple high-priority PUSCHs carries high-priority UCI, pieces of UCI of different priorities are respectively multiplexed onto PUSCHs of different high priorities in the multiple high-priority PUSCHs, which avoids resource shortage caused by UL-SCH data and pieces of UCI of multiple priorities being multiplexed onto a same PUSCH simultaneously.

In one embodiment, the above method is advantageous in that: degradation of UCI transmission performance caused by UL-SCH data and pieces of UCI of multiple priorities being multiplexed onto a same PUSCH simultaneously is avoided.

In one embodiment, the above method is advantageous in that: it is beneficial to guarantee transmission reliability of high-priority UCI.

According to one aspect of the present disclosure, the above method is characterized in:
the first time-frequency-resource block and the second time-frequency-resource block respectively belong to two different serving cells, and a serving cell ID corresponding to the first time-frequency-resource block is smaller than a serving cell ID corresponding to the second time-frequency-resource block.

According to one aspect of the present disclosure, the above method is characterized in:
the second time-frequency-resource block corresponds to the first index.

According to one aspect of the present disclosure, the above method is characterized in:
when a number of resources used to transmit the first-type HARQ-ACK in the first time-frequency-resource block is equal to 0, the target time-frequency-resource block is the first time-frequency-resource block; when the number of resources used to transmit the first-type HARQ-ACK in the first time-frequency-resource block is greater than 0, the target time-frequency-resource block is the second time-frequency-resource block.

In one embodiment, the essence of the above method is in that: when a PUCCH carrying low-priority UCI collides with multiple high-priority PUSCHs in different serving cells: when the high-priority PUSCH in a first serving cell does not carry high-priority UCI, the low-priority UCI is multiplexed onto the high-priority PUSCH in the first serving cell; when the high-priority PUSCH in a first serving cell carries high-priority UCI, the low-priority UCI is multiplexed onto the high-priority PUSCH in a serving cell other than the first serving cell among the different serving cells; the first serving cell is a serving cell with a smallest serving cell ID among the different serving cells.

In one embodiment, the essence of the above method is in that: when a PUCCH carrying eMBB-service-type UCI collides with multiple URLLC-service-type PUSCHs in different serving cells: when the URLLC-service-type PUSCH in a first serving cell does not carry URLLC-service-type UCI, the eMBB-service-type UCI is multiplexed onto the URLLC-service-type PUSCH in the first serving cell; when the URLLC-service-type PUSCH in a first serving cell carries URLLC-service-type UCI, the eMBB-service-type UCI is multiplexed onto the URLLC-service-type PUSCH in a serving cell other than the first serving cell among the different serving cells; the first serving cell is a serving cell with a smallest serving cell ID among the different serving cells.

According to one aspect of the present disclosure, the above method is characterized in:
when a number of resources used to transmit the first-type HARQ-ACK in the first time-frequency-resource block is not greater than a first value, the target time-frequency-resource block is the first time-frequency-resource block; when the number of resources used to transmit the first-type HARQ-ACK in the first time-frequency-resource block is greater than the first value, the target time-frequency-resource block is the second time-frequency-resource block; the first value is greater than 0.

In one embodiment, the essence of the above method is in that: when a PUCCH carrying low-priority UCI collides with multiple high-priority PUSCHs in different serving cells: when a number of resources used to transmit high-priority UCI in the high-priority PUSCH in a first serving cell is not greater than the first value, the low-priority UCI is multiplexed onto the high-priority PUSCH in the first serving cell; when a number of resources used to transmit high-priority UCI in the high-priority
PUSCH in a first serving cell is greater than the first value, the low-priority UCI is multiplexed onto the high-priority PUSCH in a serving cell other than the first serving cell among the different serving cells; the first serving cell is a serving cell with a smallest serving cell ID among the different serving cells.

In one embodiment, the essence of the above method is in that: when a PUCCH carrying eMBB-service-type UCI collides with multiple URLLC-service-type PUSCHs in different serving cells: when a number of resources used to transmit URLLC-service-type UCI in the URLLC-service-type PUSCH in a first serving cell is not greater than the first value, the eMBB-service-type UCI is multiplexed onto the URLLC-service-type PUSCH in the first serving cell; when a number of resources used to transmit URLLC-service-type UCI in the URLLC-service-type PUSCH in a first serving cell is greater than the first value, the eMBB-service-type UCI is multiplexed onto the URLLC-service-type PUSCH in a serving cell other than the first serving cell among the different serving cells; the first serving cell is a serving cell with a smallest serving cell ID among the different serving cells.

According to one aspect of the present disclosure, the above method is characterized in:
a first radio resource block is reserved for the first bit block; the first signaling is used to determine the first radio resource block; the first radio resource block overlaps with the first time-frequency-resource block in time domain; and the first radio resource block overlaps with the second time-frequency-resource block in time domain.

According to one aspect of the present disclosure, the above method is characterized in comprising:
receiving a second signaling;
herein, the second time-frequency-resource block is reserved for a fourth bit block; and the second signaling is used to determine the second time-frequency-resource block.

The present disclosure provides a method in a second node for wireless communications, comprising:
transmitting a first signaling; and
receiving a first signal in a target time-frequency-resource block, the first signal carrying a second bit block;
herein, the first signaling is used to determine a first bit block; the first bit block comprises a second-type HARQ-ACK; the first bit block is used to generate the second bit block; the target time-frequency-resource block is a first time-frequency-resource block or a second time-frequency-resource block; the first time-frequency-resource block and the second time-frequency-resource block are respectively reserved for different bit blocks; a number of resources used to transmit a first-type HARQ-ACK in the first time-frequency-resource block is used to determine whether the target time-frequency-resource block is the first time-frequency-resource block or the second time-frequency-resource block; the first-type HARQ-ACK corresponds to a first index; the second-type HARQ-ACK corresponds to a second index, and the first index is not equal to the second index; the first signaling indicates the second index; and the first time-frequency-resource block corresponds to the first index.

According to one aspect of the present disclosure, the above method is characterized in:
the first time-frequency-resource block and the second time-frequency-resource block respectively belong to two different serving cells, and a serving cell ID corresponding to the first time-frequency-resource block is smaller than a serving cell ID corresponding to the second time-frequency-resource block.

According to one aspect of the present disclosure, the above method is characterized in:
the second time-frequency-resource block corresponds to the first index.

According to one aspect of the present disclosure, the above method is characterized in:
when a number of resources used to transmit the first-type HARQ-ACK in the first time-frequency-resource block is equal to 0, the target time-frequency-resource block is the first time-frequency-resource block; when the number of resources used to transmit the first-type HARQ-ACK in the first time-frequency-resource block is greater than 0, the target time-frequency-resource block is the second time-frequency-resource block.

According to one aspect of the present disclosure, the above method is characterized in:
when a number of resources used to transmit the first-type HARQ-ACK in the first time-frequency-resource block is not greater than a first value, the target time-frequency-resource block is the first time-frequency-resource block; when the number of resources used to transmit the first-type HARQ-ACK in the first time-frequency-resource block is greater than the first value, the target time-frequency-resource block is the second time-frequency-resource block; the first value is greater than 0.

According to one aspect of the present disclosure, the above method is characterized in:
a first radio resource block is reserved for the first bit block; the first signaling is used to determine the first radio resource block; the first radio resource block overlaps with the first time-frequency-resource block in time domain; and the first radio resource block overlaps with the second time-frequency-resource block in time domain.

According to one aspect of the present disclosure, the above method is characterized in comprising:
transmitting a second signaling;
herein, the second time-frequency-resource block is reserved for a fourth bit block; and the second signaling is used to determine the second time-frequency-resource block.

The present disclosure provides a first node for wireless communications, comprising:
a first receiver, which receives a first signaling; and
a first transmitter, which transmits a first signal in a target time-frequency-resource block, the first signal carrying a second bit block;
herein, the first signaling is used to determine a first bit block; the first bit block comprises a second-type HARQ-ACK; the first bit block is used to generate the second bit block; the target time-frequency-resource block is a first time-frequency-resource block or a second time-frequency-resource block; the first time-frequency-resource block and the second time-frequency-resource block are respectively reserved for different bit blocks; a number of resources used to transmit a first-type HARQ-ACK in the first time-frequency-resource block is used to determine whether the target time-frequency-resource block is the first time-frequency-resource block or the second time-frequency-resource block; the first-type HARQ-ACK corresponds to a first index; the second-type HARQ-ACK corresponds to a second index, and the first index is not equal to the second index; the first signaling indicates the second index; and the first time-frequency-resource block corresponds to the first index.

The present disclosure provides a second node for wireless communications, comprising:

a second transmitter, which transmits a first signaling; and a second receiver, which receives a first signal in a target time-frequency-resource block, the first signal carrying a second bit block;

herein, the first signaling is used to determine a first bit block; the first bit block comprises a second-type HARQ-ACK; the first bit block is used to generate the second bit block; the target time-frequency-resource block is a first time-frequency-resource block or a second time-frequency-resource block; the first time-frequency-resource block and the second time-frequency-resource block are respectively reserved for different bit blocks; a number of resources used to transmit a first-type HARQ-ACK in the first time-frequency-resource block is used to determine whether the target time-frequency-resource block is the first time-frequency-resource block or the second time-frequency-resource block; the first-type HARQ-ACK corresponds to a first index; the second-type HARQ-ACK corresponds to a second index, and the first index is not equal to the second index; the first signaling indicates the second index; and the first time-frequency-resource block corresponds to the first index.

In one embodiment, the method in the present disclosure is advantageous in the following aspects:

it allows pieces of UCI of different types (e.g., of different priorities or different service types) to be multiplexed onto a same physical channel;

it enhances transmission performance of UCI, thus improving system efficiency;

when a PUCCH carrying low-priority UCI collides with multiple high-priority PUSCHs and one of the multiple high-priority PUSCHs carries high-priority UCI, pieces of UCI of different priorities are respectively multiplexed onto different high-priority PUSCHs among the multiple high-priority PUSCHs, which avoids degradation of UCI transmission performance caused by UL-SCH data and pieces of UCI of multiple priorities being multiplexed onto a same PUSCH simultaneously.

it avoids resource shortage caused by UL-SCH data and pieces of UCI of multiple priorities being multiplexed onto a same PUSCH.

it is beneficial to guarantee transmission reliability of high-priority UCI.

In the discussion of NR URLLC project, requirements of high-priority data on reliability and delay may be higher than low-priority UCI (e.g., a low-priority HAQR-ACK); when UCI is multiplexed onto a PUSCH, how to reasonably determine resource allocation between UCI and data according to a relative relation between a priority of UCI and a priority of a PUSCH is a key problem to be solved.

To address the above problem, the present disclosure provides a solution. It should be noted that though the present disclosure only took the Uplink for example in the statement above, it is also applicable to other scenarios of Downlink and Sidelink, where similar technical effects can be achieved. Additionally, the adoption of a unified solution for various scenarios (including but not limited to Uplink, Downlink and Sidelink) contributes to the reduction of hardcore complexity and costs. It should be noted that the embodiments in a UE in the present disclosure and characteristics of the embodiments may be applied to a base station if no conflict is incurred, and vice versa. And the embodiments in the present disclosure and the characteristics in the embodiments can be arbitrarily combined if there is no conflict.

In one embodiment, interpretations of the terminology in the present disclosure refer to definitions given in the 3GPP TS36 series.

In one embodiment, interpretations of the terminology in the present disclosure refer to definitions given in the 3GPP TS38 series.

In one embodiment, interpretations of the terminology in the present disclosure refer to definitions given in the 3GPP TS37 series.

In one embodiment, interpretations of the terminology in the present disclosure refer to definitions given in Institute of IEEE protocol specifications.

The present disclosure provides a method in a first node for wireless communications, comprising:

receiving a first signaling and a second signaling; and transmitting a first signal in a first time-frequency-resource block, the first signal carrying a first bit block group and a fourth bit block;

herein, the first signaling indicates the first time-frequency-resource block; the first signaling comprises scheduling information of the first signal; the second signaling is used to determine a second bit block; the first signal comprises a first sub-signal and a second sub-signal; the first sub-signal and the second sub-signal respectively carry different bit blocks in the first bit block group; the first sub-signal carries the fourth bit block, and the second bit block is used to generate the fourth bit block; the first signaling indicates a first target index, and the second signaling indicates a second target index; the first target index and the second target index are used together to determine whether the second sub-signal carries a bit block generated by the second bit block.

In one embodiment, a problem to be solved in the present disclosure includes: when UCI is multiplexed onto a PUSCH, how to reasonably determine transmission resources allocated to the UCI according to a relative relation between a priority of the UCI and a priority of the PUSCH.

In one embodiment, a problem to be solved in the present disclosure includes: UCI is multiplexed onto a PUSCH; the PUSCH comprises multiple transmission layers; the PUSCH is used to transmit two Transport Blocks (TB); how to determine whether the UCI is multiplexed onto all transmission layers in the PUSCH or onto a transmission layer occupied by only one of the two TBs in the PUSCH according to a priority of the UCI and a priority of the PUSCH.

In one embodiment, the essence of the above method is in that: when UCI is multiplexed onto a PUSCH, a priority of the UCI and a priority of the PUSCH are used together to determine transmission resources allocated to the UCI.

In one embodiment, the above method is advantageous in that: it allows multiplexing among services with different priorities, and alleviates the degradation of overall system efficiency caused by directly dropping a low-priority HARQ-ACK when services of different priorities collide with each other.

In one embodiment, the above method is advantageous in that: when UL services of different priorities are multiplexed, it enhances reliability and timeliness of high-priority UL transmission.

In one embodiment, the above method is advantageous in that: when low-priority control information is multiplexed onto a high-priority shared channel/data channel, fewer transmission resources are allocated to the transmission of low-priority control information, which reduces impacts of multiplexing of the low-priority control information on high-priority transmission.

According to one aspect of the present disclosure, the above method is characterized in:

the second sub-signal carries a bit block generated by the second bit block; and the bit block generated by the second bit block is the same as the fourth bit block.

According to one aspect of the present disclosure, the above method is characterized in:

a first index is different from a second index; when the first target index is the first index and the second target index is the second index, the second sub-signal does not carry a bit block generated by the second bit block; when the first target index is not the first index or the second target index is not the second index, the second sub-signal carries a bit block generated by the second bit block.

In one embodiment, the essence of the above method is in that: when low-priority UCI is multiplexed onto a high-priority PUSCH used to transmit two TBs, the low-priority UCI is multiplexed onto a transmission layer occupied by only one of the two TBs; when high-priority UCI is multiplexed onto an any-priority PUSCH used to transmit two TBs, the high-priority UCI is multiplexed onto all transmission layers in the any-priority PUSCH; when low-priority UCI is multiplexed onto a low-priority PUSCH used to transmit two TBs, the low-priority UCI is multiplexed onto all transmission layers in the low-priority PUSCH.

According to one aspect of the present disclosure, the above method is characterized in:

the second bit block comprises an HARQ-ACK.

According to one aspect of the present disclosure, the above method is characterized in:

the first sub-signal and the second sub-signal occupy same time-frequency resources.

According to one aspect of the present disclosure, the above method is characterized in:

the first signal is mapped onto multiple transmission layers; the multiple transmission layers comprises a first transmission layer and a second transmission layer, and the first transmission layer is different from the second transmission layer;

the first sub-signal comprises a part of the first signal mapped onto the first transmission layer; the second sub-signal comprises a part of the first signal mapped onto the second transmission layer.

According to one aspect of the present disclosure, the above method is characterized in:

the first time-frequency-resource block comprises a first time-frequency resource sub-block and a second time-frequency-resource block; the first time-frequency resource sub-block does not overlap with the second time-frequency resource sub-block; the first sub-signal comprises a part of the first signal mapped into the first time-frequency resource sub-block; the second sub-signal comprises a part of the first signal mapped into the second time-frequency resource sub-block.

The present disclosure provides a method in a second node for wireless communications, comprising:

transmitting a first signaling and a second signaling; and receiving a first signal in a first time-frequency-resource block, the first signal carrying a first bit block group and a fourth bit block;

herein, the first signaling indicates the first time-frequency-resource block; the first signaling comprises scheduling information of the first signal; the second signaling is used to determine a second bit block; the first signal comprises a first sub-signal and a second sub-signal; the first sub-signal and the second sub-signal respectively carry different bit blocks in the first bit block group; the first sub-signal carries the fourth bit block, and the second bit block is used to generate the fourth bit block; the first signaling indicates a first target index, and the second signaling indicates a second target index; the first target index and the second target index are used together to determine whether the second sub-signal carries a bit block generated by the second bit block.

According to one aspect of the present disclosure, the above method is characterized in:

the second sub-signal carries a bit block generated by the second bit block; and the bit block generated by the second bit block is the same as the fourth bit block.

According to one aspect of the present disclosure, the above method is characterized in:

a first index is different from a second index; when the first target index is the first index and the second target index is the second index, the second sub-signal does not carry a bit block generated by the second bit block; when the first target index is not the first index or the second target index is not the second index, the second sub-signal carries a bit block generated by the second bit block.

According to one aspect of the present disclosure, the above method is characterized in:

the second bit block comprises an HARQ-ACK.

According to one aspect of the present disclosure, the above method is characterized in:

the first sub-signal and the second sub-signal occupy same time-frequency resources.

According to one aspect of the present disclosure, the above method is characterized in:

the first signal is mapped onto multiple transmission layers; the multiple transmission layers comprises a first transmission layer and a second transmission layer, and the first transmission layer is different from the second transmission layer; the first sub-signal comprises a part of the first signal mapped onto the first transmission layer; the second sub-signal comprises a part of the first signal mapped onto the second transmission layer.

According to one aspect of the present disclosure, the above method is characterized in:

the first time-frequency-resource block comprises a first time-frequency resource sub-block and a second time-frequency-resource block; the first time-frequency resource sub-block does not overlap with the second time-frequency resource sub-block; the first sub-signal comprises a part of the first signal mapped into the first time-frequency resource sub-block; the second sub-signal comprises a part of the first signal mapped into the second time-frequency resource sub-block.

The present disclosure provides a first node for wireless communications, comprising:

a first receiver, which receives a first signaling and a second signaling; and a first transmitter, which transmits a first signal in a first time-frequency-resource block, the first signal carrying a first bit block group and a fourth bit block;

herein, the first signaling indicates the first time-frequency-resource block; the first signaling comprises scheduling information of the first signal; the second signaling is used to determine a second bit block; the first signal comprises a first sub-signal and a second sub-signal; the first sub-signal and the second sub-signal respectively carry different bit blocks in the first bit block group; the first sub-signal carries the fourth bit block, and the second bit block is used to generate the fourth bit block; the first signaling indicates a first target index, and the second signaling indicates a second target index; the first target index and the second target index are used together to determine whether the second sub-signal carries a bit block generated by the second bit block.

The present disclosure provides a second node for wireless communications, comprising:

a second transmitter, which transmits a first signaling and a second signaling; and a second receiver, which receives a first signal in a first time-frequency-resource block, the first signal carrying a first bit block group and a fourth bit block;

herein, the first signaling indicates the first time-frequency-resource block; the first signaling comprises scheduling information of the first signal; the second signaling is used to determine a second bit block; the first signal comprises a first sub-signal and a second sub-signal; the first sub-signal and the second sub-signal respectively carry different bit blocks in the first bit block group; the first sub-signal carries the fourth bit block, and the second bit block is used to generate the fourth bit block; the first signaling indicates a first target index, and the second signaling indicates a second target index; the first target index and the second target index are used together to determine whether the second sub-signal carries a bit block generated by the second bit block.

In one embodiment, the method in the present disclosure is advantageous in the following aspects:

it allows multiplexing among services of different priorities, and alleviates the degradation of overall system efficiency caused by directly dropping a low-priority HARQ-ACK when services of different priorities collide;

when UL services of different priorities are multiplexed, it enhances reliability and timeliness of high-priority UL transmission;

when low-priority control information is multiplexed onto a high-priority shared channel/data channel, fewer transmission resources are allocated to transmission of the low-priority control information, which reduces impacts of the low-priority control information on high-priority transmission;

it comprehensively use control information and priority information of a transmission channel to more reasonably allocate transmission resources.

BRIEF DESCRIPTION OF THE DRAWINGS

Other features, objects and advantages of the present disclosure will become more apparent from the detailed description of non-restrictive embodiments taken in conjunction with the following drawings:

FIG. 6B illustrates a schematic diagram of judging whether a second sub-signal carries a bit block generated by a second bit block according to one embodiment of the present disclosure.

FIG. 7A illustrates a schematic diagram of judging whether a target time-frequency-resource block is a first time-frequency-resource block or a second time-frequency-resource block according to another embodiment of the present disclosure.

FIG. 7B illustrates a schematic diagram of transmission resources occupied by a first sub-signal and transmission resources occupied by a second sub-signal according to one embodiment of the present disclosure.

DESCRIPTION OF THE EMBODIMENTS

The technical scheme of the present disclosure is described below in further details in conjunction with the drawings. It should be noted that the embodiments of the present disclosure and the characteristics of the embodiments may be arbitrarily combined if no conflict is caused.

Embodiment 1A

Figure 1A:
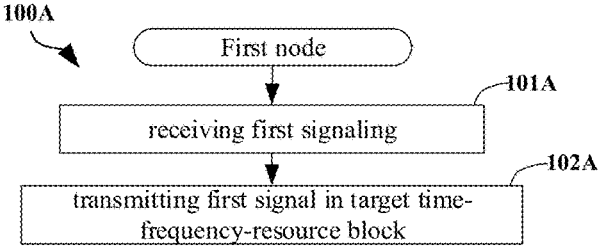
FIG. 1A illustrates a flowchart of the processing of a first node according to one embodiment of the present disclosure.

Embodiment 1A illustrates a flowchart of processing of a first node according to one embodiment of the present disclosure, as shown in FIG. 1A.

In Embodiment 1A, the first node in the present disclosure receives a first signaling in step 101A; transmits a first signal in a target time-frequency-resource block in step 102A.

In Embodiment 1A, the first signal carries a second bit block; the first signaling is used to determine a first bit block; the first bit block comprises a second-type HARQ-ACK; the first bit block is used to generate the second bit block; the target time-frequency-resource block is a first time-frequency-resource block or a second time-frequency-resource block; the first time-frequency-resource block and the second time-frequency-resource block are respectively reserved for different bit blocks; a number of resources used to transmit a first-type HARQ-ACK in the first time-frequency-resource block is used to determine whether the target time-frequency-resource block is the first time-frequency-resource block or the second time-frequency-resource block; the first-type HARQ-ACK corresponds to a first index; the second-type HARQ-ACK corresponds to a second index, and the first index is not equal to the second index; the first signaling indicates the second index; and the first time-frequency-resource block corresponds to the first index.

In one embodiment, the first signal comprises a radio signal.

In one embodiment, the first signal comprises a radio-frequency signal.

In one embodiment, the first signal comprises a baseband signal.

In one embodiment, the first signaling is an RRC layer signaling.

In one embodiment, the first signaling comprises one or more fields in an RRC layer signaling In one embodiment, the first signaling is dynamically configured.

In one embodiment, the first signaling is a physical-layer signaling.

In one embodiment, the first signaling comprises one or more fields in a physical-layer signaling.

In one embodiment, the first signaling is a higher-layer signaling.

In one embodiment, the first signaling comprises one or more fields in a higher-layer signaling.

In one embodiment, the first signaling is a Downlink Control Information (DCI) signaling.

In one embodiment, the first signaling comprises one or more fields in a piece of DCI.

In one embodiment, the first signaling comprises one or more Fields in an Information Element (IE).

In one embodiment, the first signaling is a downlink scheduled signaling.

In one embodiment, the first signaling is transmitted on a downlink physical layer control channel (i.e., a downlink channel that is only capable of bearing a physical layer signaling).

In one embodiment, the downlink physical-layer control channel is a Physical Downlink Control CHannel (PDCCH).

In one embodiment, the downlink physical-layer control channel is a short PDCCH (sPDCCH).

In one embodiment, the downlink physical layer control channel is a Narrow Band PDCCH (NB-PDCCH).

In one embodiment, the first signaling is DCI format 1_0, the specific meaning of the DCI format 1_0 can be found in 3GPP TS38.212, chapter 7.3.1.2.

In one embodiment, the first signaling is DCI format 1_1, the specific meaning of the DCI format 1_1 can be found in 3GPP TS38.212, chapter 7.3.1.2.

In one embodiment, the first signaling is DCI format 1_2, the specific meaning of the DCI format 1_0 can be found in 3GPP TS38.212, chapter 7.3.1.2.

In one embodiment, the first signaling is a signaling used to schedule a downlink physical layer data channel.

In one embodiment, the downlink physical layer data channel is a Physical Downlink Shared CHannel (PDSCH).

In one embodiment, the downlink physical layer data channel is a short PDSCH (sPDSCH).

In one embodiment, the downlink physical layer data channel is a Narrow Band PDSCH (NB-PDSCH).

In one embodiment, the target time-frequency-resource block comprises at least one Resource Element (RE).

In one embodiment, the RE occupies a multicarrier symbol in time domain, and a subcarrier in frequency domain In one embodiment, the multicarrier symbol is an Orthogonal Frequency Division Multiplexing (OFDM) symbol.

In one embodiment, the multicarrier symbol is a Single Carrier-Frequency Division Multiple Access (SC-FDMA) symbol.

In one embodiment, the multicarrier symbol is a Discrete Fourier Transform Spread OFDM (DFT-S-OFDM) symbol.

In one embodiment, the target time-frequency-resource block comprises at least one subcarrier in frequency domain.

In one embodiment, the target time-frequency-resource block comprises at least one Physical resource block (PRB) in frequency domain In one embodiment, the target time-frequency-resource block comprises at least one Resource Block (RB) in frequency domain In one embodiment, the target time-frequency-resource block comprises at least one multi-carrier symbol in time domain In one embodiment, the target time-frequency-resource block comprises at least one slot in time domain.

In one embodiment, the target time-frequency-resource block comprises at least one sub-slot in time domain In one embodiment, the target time-frequency-resource block comprises at least one ms in time domain In one embodiment, the target time-frequency-resource block comprises at least one inconsecutive slot in time domain In one embodiment, the target time-frequency-resource block comprises at least one consecutive slot in time domain In one embodiment, the target time-frequency-resource block comprises at least one sub-frame in time domain.

In one embodiment, the target time-frequency-resource block is configured by a higher-layer signaling.

In one embodiment, the target time-frequency-resource block is configured by an RRC signaling.

In one embodiment, the target time-frequency-resource block is configured by a Medium Access Control layer Control Element (MAC CE) signaling.

In one embodiment, the target time-frequency-resource block comprises a PUSCH.

In one embodiment, the target time-frequency-resource block comprises a short PUSCH (sPUSCH).

In one embodiment, the target time-frequency-resource block comprises a Narrow Band PUSCH (NB-PUSCH).

In one embodiment, the target time-frequency-resource block comprises a PSSCH.

In one embodiment, the target time-frequency-resource block comprises resources scheduled on an Uplink.

In one embodiment, the target time-frequency-resource block comprises resources scheduled on a Sidelink.

In one embodiment, the first time-frequency-resource block comprises at least one RE.

In one embodiment, the first time-frequency-resource block comprises at least one sub-carrier symbol in frequency domain In one embodiment, the first time-frequency-resource block comprises at least one PRB in frequency domain In one embodiment, the first time-frequency-resource block comprises at least one RB in frequency domain.

In one embodiment, the first time-frequency-resource block comprises at least one multi-carrier symbol in time domain In one embodiment, the first time-frequency-resource block comprises at least one slot in time domain In one embodiment, the first time-frequency-resource block comprises at least one sub-slot in time domain In one embodiment, the first time-frequency-resource block comprises at least one ms in time domain In one embodiment, the first time-frequency-resource block comprises at least one inconsecutive slot in time domain In one embodiment, the first time-frequency-resource block comprises at least one consecutive slot in time domain.

In one embodiment, the first time-frequency-resource block comprises at least one subframe in time domain.

In one embodiment, the first time-frequency-resource block is configured by a higher-layer signaling.

In one embodiment, the first time-frequency-resource block is configured by an RRC signaling.

In one embodiment, the first time-frequency-resource block is configured by a MAC CE signaling.

In one embodiment, the first time-frequency-resource block comprises a PUSCH.

In one embodiment, the first time-frequency-resource block comprises an sPUSCH.

In one embodiment, the first time-frequency-resource block comprises an NB-PUSCH.

In one embodiment, the first time-frequency-resource block comprises a PSSCH.

In one embodiment, the first time-frequency-resource block comprises resources scheduled on an Uplink.

In one embodiment, the first time-frequency-resource block comprises resources scheduled on a Sidelink.

In one embodiment, the second time-frequency-resource block comprises at least one RE.

In one embodiment, the second time-frequency-resource block comprises at least one sub-carrier symbol in frequency domain In one embodiment, the second time-frequency-resource block comprises at least one PRB in frequency domain In one embodiment, the second time-frequency-resource block comprises at least one RB in frequency domain In one embodiment, the second time-frequency-resource block comprises at least one multi-carrier symbol in time domain In one embodiment, the second time-frequency-resource block comprises at least one slot in time domain In one embodiment, the second time-frequency-resource block comprises at least one sub-slot in time domain.

In one embodiment, the second time-frequency-resource block comprises at least one ms in time domain.

In one embodiment, the second time-frequency-resource block comprises at least one inconsecutive slot in time domain In one embodiment, the second time-frequency-resource block comprises at least one consecutive slot in time domain In one embodiment, the second time-frequency-resource block comprises at least one subframe in time domain.

In one embodiment, the second time-frequency-resource block is configured by a higher-layer signaling.

In one embodiment, the second time-frequency-resource block is configured by an RRC signaling.

In one embodiment, the second time-frequency-resource block is configured by a MAC CE signaling.

In one embodiment, the second time-frequency-resource block comprises a PUSCH.

In one embodiment, the second time-frequency-resource block comprises an sPUSCH.

In one embodiment, the second time-frequency-resource block comprises an NB-PUSCH.

In one embodiment, the second time-frequency-resource block comprises a PSSCH.

In one embodiment, the second time-frequency-resource block comprises resources scheduled on an Uplink.

In one embodiment, the second time-frequency-resource block comprises resources scheduled on a Sidelink.

In one embodiment, the first index is a priority index.

In one embodiment, the first index is equal to 0 or 1.

In one embodiment, the first index is equal to a numerical value.

In one embodiment, the first index is used to determine one of multiple priorities.

In one embodiment, the first index is used to determine one of multiple service types.

In one embodiment, the first index is used to determine one of multiple Quality of Services (QoSs).

In one embodiment, the second index is a priority index.

In one embodiment, the second index is equal to 0 or 1.

In one embodiment, the second index is equal to a numerical value.

In one embodiment, the second index is used to determine one of multiple priorities.

In one embodiment, the second index is used to determine one of multiple service types.

In one embodiment, the second index is used to determine one of multiple QoSs.

In one embodiment, the first index is equal to 1, and the second index is equal to 0.

In one embodiment, the first index is equal to 0, and the second index is equal to 1.

In one embodiment, the first index indicates a high priority, and the second index indicates a low priority.

In one embodiment, the first index indicates a low priority, and the second index indicates a high priority.

In one embodiment, the first index indicates a URLLC service type, and the second index indicates an eMBB service type.

In one embodiment, the first index indicates an eMBB service type, and the second index indicates a URLLC service type.

In one embodiment, the first index and the second index indicate a QoS respectively.

In one embodiment, the number of resources used to transmit the first-type HARQ-ACK in the first time-frequency-resource block is greater than 0 or equal to 0.

In one embodiment, the number of resources comprises a number of time-frequency resources.

In one embodiment, the number of resources comprises a number of REs.

In one embodiment, the number of resources is a number of time-frequency resources.

In one embodiment, the number of resources is a number of the REs.

In one embodiment, the number of resources used to transmit the first-type HARQ-ACK in the first time-frequency-resource block is: a number of time-frequency resources used to map a modulation symbol generated by a bit block comprising the first-type HARQ-ACK in the first time-frequency-resource block.

In one embodiment, the number of resources used to transmit the first-type HARQ-ACK in the first time-frequency-resource block is: a number of the REs used to map a modulation symbol generated by a bit block comprising the first-type HARQ-ACK in the first time-frequency-resource block.

In one embodiment, the number of resources used to transmit the first-type HARQ-ACK in the first time-frequency-resource block is: a number of time-frequency resources used to map a modulation symbol generated by a bit block comprising the first-type HARQ-ACK in the first time-frequency-resource block determined by the first node performing a judgment or a calculation In one embodiment, the number of resources used to transmit the first-type HARQ-ACK in the first time-frequency-resource block is: a number of the REs used to map a modulation symbol generated by a bit block comprising the first-type HARQ-ACK in the first time-frequency-resource block determined by the first node performing a judgment or a calculation.

In one embodiment, the number of resources used to transmit the first-type HARQ-ACK in the first time-frequency-resource block is: a number of time-frequency resources used to bear a modulation symbol generated by a bit block comprising the first-type HARQ-ACK in the first time-frequency-resource block.

In one embodiment, the number of resources used to transmit the first-type HARQ-ACK in the first time-frequency-resource block is: a number of the REs used to bear a modulation symbol generated by a bit block comprising the first-type HARQ-ACK in the first time-frequency-resource block.

In one embodiment, the number of resources used to transmit the first-type HARQ-ACK in the first time-frequency-resource block is: a number of time-frequency resources used to bear a modulation symbol generated by a bit block comprising the first-type HARQ-ACK in the first time-frequency-resource block determined by the first node performing a judgment or a calculation In one embodiment, the number of resources used to transmit the first-type HARQ-ACK in the first time-frequency-resource block is: a number of the REs used to bear a modulation symbol generated by a bit block comprising the first-type HARQ-ACK in the first time-frequency-resource block determined by the first node performing a judgment or a calculation.

In one embodiment, the number of resources used to transmit the first-type HARQ-ACK in the first time-frequency-resource block is: a number of the REs used to bear a modulation symbol generated by an information bit of the first-type HARQ-ACK in the first time-frequency-resource block.

In one embodiment, the number of resources used to transmit the first-type HARQ-ACK in the first time-frequency-resource block is: a number of time-frequency resources used to bear a modulation symbol generated by an information bit of the first-type HARQ-ACK in the first time-frequency-resource block.

In one embodiment, the number of resources used to transmit the first-type HARQ-ACK in the first time-frequency-resource block is: a number of the REs used to bear a modulation symbol generated by an information bit of the first-type HARQ-ACK in the first time-frequency-resource block determined by the first node performing a judgment or a calculation.

In one embodiment, the number of resources used to transmit the first-type HARQ-ACK in the first time-frequency-resource block is: a number of time-frequency resources used to bear a modulation symbol generated by an information bit of the first-type HARQ-ACK in the first time-frequency-resource block determined by the first node performing a judgment or a calculation In one embodiment, the phrase that the first time-frequency-resource block corresponds to the first index includes: the first index is a priority index; the first index is equal to 1; the first time-frequency-resource block comprises a channel; and the channel comprised in the first time-frequency-resource block is a PUSCH of priority index 1.

In one embodiment, the phrase that the first time-frequency-resource block corresponds to the first index includes: the first index is a priority index; the first index is equal to 0; the first time-frequency-resource block comprises a channel; and the channel comprised in the first time-frequency-resource block is a PUSCH of priority index 0.

In one embodiment, the phrase that the first time-frequency-resource block corresponds to the first index includes: the first index is a priority index; the first index is equal to 1; the first time-frequency-resource block comprises a channel; the channel comprised in the first time-frequency-resource block is a PUCCH of priority index 1.

In one embodiment, the phrase that the first time-frequency-resource block corresponds to the first index includes: the first index is a priority index; the first index is equal to 0; the first time-frequency-resource block comprises a channel; the channel comprised in the first time-frequency-resource block is a PUCCH of priority index 0.

In one embodiment, the phrase that the first time-frequency-resource block corresponds to the first index includes: the first node receives a third signaling; the third signaling indicates the first time-frequency-resource block; and the third signaling indicates the first index.

In one embodiment, the phrase that the first time-frequency-resource block corresponds to the first index includes: the first time-frequency-resource block comprises a physical channel determined as the first index.

In one embodiment, the physical channel is a PUSCH.

In one embodiment, the phrase that the first signal carries a second bit block includes: the first signal comprises an output after all or part of bits in the second bit block sequentially through part or all of an CRC Insertion, Segmentation, Code Block-level CRC Insertion, Channel Coding, Rate Matching, Concatenation, Scrambling, Modulation, Layer Mapping, Precoding, Mapping to REs, Multicarrier symbol Generation and Modulation and Upconversion.

In one embodiment, the first bit block comprises at least one bit; and the at least one bit in the first bit block indicates whether the first signaling is correctly received.

In one embodiment, the first bit block comprises at least one bit; the at least one bit in the first bit block indicates whether a bit block scheduled by the first signaling is correctly received.

In one embodiment, the first bit block comprises a first bit sub-block; the first bit sub-block comprises at least one bit; the at least one bit in the first bit sub-block indicates whether the first signaling is correctly received.

In one embodiment, the first bit block comprises a first bit sub-block; the first bit sub-block comprises at least one bit; the at least one bit in the first bit sub-block indicates whether a bit block scheduled by the first signaling is correctly received.

In one embodiment, the first signaling is used to indicate a Semi-Persistent Scheduling (SPS) release, and the second-type HARQ-ACK in the first bit block indicates whether the first signaling is correctly received.

In one embodiment, the first node receives a sixth bit block; the first signaling comprises scheduling information of the sixth bit block, and the second-type HARQ-ACK in the first bit block indicates whether the sixth bit block is correctly received.

In one embodiment, the sixth bit block comprises a TB.

In one embodiment, the sixth bit block comprises a Code Block Group (CBG).

In one embodiment, the HARQ-ACK in the present disclosure comprises an HARQ-ACK bit.

In one embodiment, the HARQ-ACK in the present disclosure comprises an HARQ-ACK codebook.

In one embodiment, the HARQ-ACK in the present disclosure comprises an HARQ-ACK sub-codebook.

In one embodiment, the HARQ-ACK in the present disclosure indicates a ACK or a NACK.

In one embodiment, the HARQ-ACK in the present disclosure is used to indicate whether a bit block or a signaling is correctly received.

In one embodiment, the first-type HARQ-ACK comprises an HARQ-ACK bit.

In one embodiment, the first-type HARQ-ACK comprises an HARQ-ACK codebook.

In one embodiment, the first-type HARQ-ACK comprises an HARQ-ACK sub-codebook.

In one embodiment, the first-type HARQ-ACK comprises a ACK or a NACK.

In one embodiment, the first-type HARQ-ACK is used to indicate whether a bit block or a signaling is correctly received.

In one embodiment, the second-type HARQ-ACK comprises an HARQ-ACK bit.

In one embodiment, the second-type HARQ-ACK comprises an HARQ-ACK codebook.

In one embodiment, the second-type HARQ-ACK comprises an HARQ-ACK sub-codebook.

In one embodiment, the second-type HARQ-ACK comprises a ACK or a NACK.

In one embodiment, the second-type HARQ-ACK is used to indicate whether a bit block or a signaling is correctly received.

In one embodiment, the scheduling information in the present disclosure comprises at least one of occupied time-domain resources, occupied frequency-domain resources, an MCS, configuration information of DeModulation Reference Signals (DMRS), a Hybrid Automatic Repeat request (HARQ) process number, a Redundancy Version (RV), a New Data Indicator (NDI), a transmitting antenna port, or a corresponding Transmission Configuration Indicator (TCI) state.

In one embodiment, the second bit block is the first bit block.

In one embodiment, the second bit block comprises the first bit block.

In one embodiment, the second bit block is an output of part or all of bits in the first bit block sequentially through one or more of logic and, logical or, xor, deleting bit or zero-padding operation.

In one embodiment, the second time-frequency-resource block is not used to transmit the first-type HARQ-ACK.

In one embodiment, the first node performs a judgment or a calculation to determine that a signal transmitted in the second time-frequency-resource block does not carry the first-type HARQ-ACK.

In one embodiment, the phrase that the first time-frequency-resource block and the second time-frequency-resource block are respectively reserved for different bit blocks includes: the first time-frequency-resource block and the second time-frequency-resource block are respectively reserved for a third bit block and a fourth bit block.

In one embodiment, the first time-frequency-resource block comprises a PUSCH; the second time-frequency-resource block comprises a PUSCH; the second bit block is transmitted on the PUSCH comprised in the first time-frequency-resource block, or, the second bit block is transmitted on the PUSCH comprised in the second time-frequency-resource block.

In one embodiment, the first time-frequency-resource block belongs to a first time window in time domain; the second time-frequency-resource block belongs to a second time window in time domain; the first time window and the second time window do not overlap in time domain.

In one embodiment, the first time-frequency-resource block belongs to a first time window in time domain; the second time-frequency-resource block belongs to a second time window in time domain; the first time window and the second time window do not overlap in time domain; both the first time-frequency-resource block and the second time-frequency-resource block belong to a same serving cell, and a serving cell ID corresponding to the first time-frequency-resource block is the same as a serving cell ID corresponding to the second time-frequency-resource block.

In one embodiment, the first time window is before the second time window.

In one embodiment, a start time of the first time window is earlier than a start time of the second time window.

In one embodiment, the first time window comprises time-domain resources occupied by the first time-frequency-resource block.

In one embodiment, the second time window comprises time-domain resources occupied by the second time-frequency-resource block.

In one embodiment, the first time window comprises at least one multi-carrier symbol.

In one embodiment, the second time window comprises at least one multi-carrier symbol.

In one embodiment, the first time window comprises at least one slot.

In one embodiment, the second time window comprises at least one slot.

In one embodiment, the first time window comprises at least one sub-slot.

In one embodiment, the second time window comprises at least one sub-slot.

In one embodiment, the first time-frequency-resource block only comprises a PUSCH.

In one embodiment, the second time-frequency-resource block only comprises a PUSCH.

Embodiment 1B

Figure 1B:
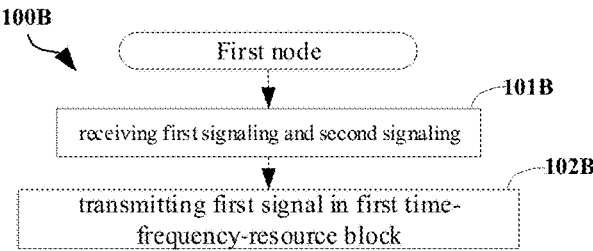
FIG. 1B illustrates a flowchart of the processing of a first node according to one embodiment of the present disclosure.

Embodiment 1B illustrates a flowchart of processing of a first node according to one embodiment of the present disclosure, as shown in FIG. 1B.

In Embodiment 1B, the first node in the present disclosure receives a first signaling and a second signaling in step 101B; and transmits a first signal in a first time-frequency-resource block in step 102B.

In Embodiment 1B, the first signal carries a first bit block group and a fourth bit block; the first signaling indicates the first time-frequency-resource block; the first signaling comprises scheduling information of the first signal; the second signaling is used to determine a second bit block; the first signal comprises a first sub-signal and a second sub-signal; the first sub-signal and the second sub-signal respectively carry different bit blocks in the first bit block group; the first sub-signal carries the fourth bit block, and the second bit block is used to generate the fourth bit block; the first signaling indicates a first target index, and the second signaling indicates a second target index; the first target index and the second target index are used together to determine whether the second sub-signal carries a bit block generated by the second bit block.

In one embodiment, the first signal comprises a radio signal.

In one embodiment, the first signal comprises a radio-frequency signal.

In one embodiment, the first signal comprises a baseband signal.

In one embodiment, the first sub-signal comprises a radio signal.

In one embodiment, the first sub-signal comprises a radio-frequency signal.

In one embodiment, the first sub-signal comprises a baseband signal.

In one embodiment, the second sub-signal comprises a radio signal.

In one embodiment, the second sub-signal comprises a radio-frequency signal.

In one embodiment, the second sub-signal comprises a baseband signal.

In one embodiment, the first signaling is an RRC layer signaling.

In one embodiment, the first signaling comprises one or more fields in an RRC layer signaling In one embodiment, the first signaling is dynamically configured.

In one embodiment, the first signaling is a physical-layer signaling.

In one embodiment, the first signaling comprises a physical-layer signaling.

In one embodiment, the first signaling comprises a higher-layer signaling.

In one embodiment, the first signaling is a DCI signaling.

In one embodiment, the first signaling comprises one or more fields in a piece of DCI.

In one embodiment, the first signaling comprises one or more fields in an IE.

In one embodiment, the first signaling is an UpLink scheduled signaling.

In one embodiment, the first signaling is transmitted on a downlink physical layer control channel (i.e., a downlink channel that is only capable of bearing a physical layer signaling).

In one embodiment, the downlink physical-layer control channel is a PDCCH.

In one embodiment, the downlink physical-layer control channel is an sPDCCH.

In one embodiment, the downlink physical layer control channel is an NB-PDCCH.

In one embodiment, the first signaling is DCI format 0_0, the specific meaning of the DCI format 0_0 can be found in 3GPP TS38.212, chapter 7.3.1.1.

In one embodiment, the first signaling is DCI format 0_1, the specific meaning of the DCI format 0-1 can be found in 3GPP TS38.212, chapter 7.3.1.1.

In one embodiment, the first signaling is DCI format 0_2, the specific meaning of the DCI format 0_2 can be found in 3GPP TS38.212, chapter 7.3.1.1.

In one embodiment, the first signaling comprises scheduling information of a PUSCH.

In one embodiment, the first signaling comprises scheduling information of a Physical Sidelink Shared Channel (PSSCH).

In one embodiment, the first signaling is a signaling used to schedule an uplink physical layer data channel.

In one embodiment, the uplink physical layer data channel is a PUSCH.

In one subembodiment, the UL physical-layer data channel is an sPUSCH.

In one embodiment, the UL physical-layer data channel is an NB-PUSCH.

In one embodiment, the first signaling is a signaling used to schedule an uplink physical layer shared channel In one embodiment, the first signaling comprises scheduling information of a PSSCH.

In one embodiment, the second signaling is an RRC layer signaling

In one embodiment, the second signaling comprises one or more fields in an RRC-layer signaling.

In one embodiment, the second signaling is dynamically configured.

In one embodiment, the second signaling is a physical-layer signaling.

In one embodiment, the second signaling comprises a physical-layer signaling.

In one embodiment, the second signaling comprises a higher-layer signaling.

In one embodiment, the second signaling is DCI.

In one embodiment, the second signaling comprises one or more fields of DCI.

In one embodiment, the second signaling comprises one or more fields in an IE.

In one embodiment, the second signaling is a downlink scheduled signaling.

In one embodiment, the second signaling is transmitted on a downlink physical layer control channel (i.e., a downlink channel that can only be used for bearing physical layer signaling).

In one embodiment, the second signaling is a signaling used to schedule a downlink physical layer data channel.

In one embodiment, the downlink physical layer data channel is a PDSCH.

In one embodiment, the downlink physical layer data channel is an sPDSCH.

In one embodiment, the downlink physical layer data channel is an NB-PDSCH.

In one embodiment, the second signaling is DCI format 1_0, the specific meaning of the DCI format 1_0 can be found in 3GPP TS38.212, chapter 7.3.1.2.

In one embodiment, the second signaling is DCI format 1_1, the specific meaning of the DCI format 1_1 can be found in 3GPP TS38.212, chapter 7.3.1.2.

In one embodiment, the second signaling is DCI format 1_2, the specific meaning of the DCI format 1_0 can be found in 3GPP TS38.212, chapter 7.3.1.2.

In one embodiment, the second signaling is a signaling used to schedule a downlink physical layer shared channel.

In one embodiment, the second signaling comprises scheduling information of a PDSCH.

In one embodiment, the second signaling indicates an SPS release.

In one embodiment, the second signaling is DCI format 0_0, the specific meaning of the DCI format 0_0 can be found in 3GPP TS38.212, chapter 7.3.1.1.

In one embodiment, the second signaling is DCI format 0_1, the specific meaning of the DCI format 0-1 can be found in 3GPP TS38.212, chapter 7.3.1.1.

In one embodiment, the second signaling is DCI format 0_2, the specific meaning of the DCI format 0_2 can be found in 3GPP TS38.212, chapter 7.3.1.1.

In one embodiment, the second signaling comprises scheduling information of a PSSCH.

In one embodiment, the first time-frequency-resource block comprises at least one RE.

In one embodiment, the RE occupies a multicarrier symbol in time domain, and a subcarrier in frequency domain In one embodiment, the multicarrier symbol is an OFDM symbol.

In one embodiment, the multicarrier symbol is an SC-FDMA symbol.

In one embodiment, the multicarrier symbol is a DFT-S-OFDM symbol.

In one embodiment, the first time-frequency-resource block comprises at least one subcarrier in frequency domain.

In one embodiment, the first time-frequency-resource block comprises at least one PRB in frequency domain In one embodiment, the first time-frequency-resource block comprises at least one RB in frequency domain.

In one embodiment, the first time-frequency-resource block comprises at least one multi-carrier symbol in time domain In one embodiment, the first time-frequency-resource block comprises at least one slot in time domain In one embodiment, the first time-frequency-resource block comprises at least one sub-slot in time domain In one embodiment, the first time-frequency-resource block comprises at least one ms in time domain In one embodiment, the first time-frequency-resource block comprises at least one inconsecutive slot in time domain In one embodiment, the first time-frequency-resource block comprises at least one consecutive slot in time domain.

In one embodiment, the first time-frequency-resource block comprises at least one sub-frame in time domain In one embodiment, the first time-frequency-resource block is configured by a higher-layer signaling.

In one embodiment, the first time-frequency-resource block is configured by an RRC signaling.

In one embodiment, the first time-frequency-resource block is configured by a MAC CE signaling.

In one embodiment, the first time-frequency-resource block comprises a PUSCH.

In one embodiment, the first time-frequency-resource block comprises an sPUSCH.

In one embodiment, the first time-frequency-resource block comprises an NB-PUSCH.

In one embodiment, the first time-frequency-resource block comprises a PSSCH.

In one embodiment, the first time-frequency-resource block comprises time-frequency resources scheduled on an Uplink.

In one embodiment, the first time-frequency-resource block comprises time-frequency resources scheduled on a Sidelink.

In one embodiment, the first signaling explicitly indicates the first time-frequency-resource block.

In one embodiment, the first signaling implicitly indicates the first time-frequency-resource block.

In one embodiment, the first signaling indicates frequency-domain resources occupied by the first time-frequency-resource block.

In one embodiment, the first signaling indicates time-domain resources occupied by the first time-frequency-resource block.

In one embodiment, a field in the first signaling indicates frequency-domain resources occupied by the first time-frequency-resource block.

In one embodiment, a field in the first signaling indicates time-domain resources occupied by the first time-frequency-resource block.

In one embodiment, the second signaling is used to indicate an SPS release, and the second bit block comprises an HARQ-ACK indicating whether the second signaling is correctly received.

In one embodiment, the first node also receives a fifth bit block, the second signaling comprises scheduling information of the fifth bit block, and the second bit block comprises an HARQ-ACK indicating whether a fifth bit block is correctly received.

In one embodiment, the first node also receives a second signaling group; the second signaling group comprises at least one signaling, and the second signaling is a last signaling in the second signaling group; one signaling in the second signaling group is used to determine the second bit block, and the second bit block comprises an HARQ-ACK associated with the signaling in the second signaling group.

In one subembodiment of the above embodiment, the signaling in the second signaling group is the second signaling.

In one subembodiment of the above embodiment, the signaling in the second signaling group is not the second signaling; and the second bit block comprises an HARQ-ACK associated with the second signaling.

In one embodiment, the HARQ-ACK in the present disclosure comprises an HARQ-ACK bit.

In one embodiment, the HARQ-ACK in the present disclosure comprises a HARQ-ACK codebook.

In one embodiment, the HARQ-ACK in the present disclosure comprises a HARQ-ACK sub-codebook.

In one embodiment, the HARQ-ACK in the present disclosure comprises at least one bit.

In one embodiment, the HARQ-ACK in the present disclosure comprises at least one bit, and each bit of the at least one bit indicates a ACK or a NACK.

In one embodiment, the HARQ-ACK in the present disclosure comprises a bit used to indicate whether a bit block or a signaling is correctly received.

In one embodiment, the first sub-signal is different from the second sub-signal.

In one embodiment, the first signal only comprises the first sub-signal and the second sub-signal.

In one embodiment, the first signal comprises a first sub-signal group; the first signal sub-group comprises at least one sub-signal; the first sub-signal group does not comprise the first sub-signal and the second sub-signal.

In one embodiment, the first bit block group does not comprise the fourth bit block.

In one embodiment, the second sub-signal carries a bit block generated by the second bit block; and the first bit block group does not comprise the bit block generated by the second bit block.

In one embodiment, the first sub-signal carries a bit block in the first bit block group; and the second sub-signal carries another bit block in the first bit block group.

In one embodiment, the first sub-signal carries a bit block in the first bit block group; the second sub-signal carries another bit block in the first bit block group; the bit block in the first bit block group comprises a TB, and the another bit block in the first bit block group comprises another TB.

In one embodiment, the first bit block group comprises multiple bit blocks.

In one embodiment, any bit block in the first bit block group comprises a TB.

In one embodiment, any bit block in the first bit block group comprises a CBG.

In one embodiment, any bit block in the first bit block group comprises a CB.

In one embodiment, any bit block in the first bit block group comprises at least one bit.

In one embodiment, the second bit block comprises HARQ-ACK information.

In one embodiment, the second bit block comprises at least one bit.

In one embodiment, the fourth bit block comprises at least one bit.

In one embodiment, the fourth bit block comprises HARQ-ACK information.

In one embodiment, the bit block generated by the second bit block comprises at least one bit.

In one embodiment, the bit block generated by the second bit block comprises HARQ-ACK information.

In one embodiment, the first sub-signal comprises an output after all or part of bits in the fourth bit block sequentially through part or all of CRC Insertion, Segmentation, Code Block-level CRC Insertion, Channel Coding, Rate Matching, Concatenation, Scrambling, Modulation, Layer Mapping, Precoding, Mapping to REs, Multicarrier symbol Generation and Modulation and Upconversion.

In one embodiment, the fourth bit block comprises all or part of bits in a bit block of an output of all or part of bits in the second bit block after through a first procedure; the first procedure comprises part or all of CRC Insertion, segmentation, code-block level CRC Insertion, channel coding, rate matching, concatenation and scrambling.

In one embodiment, the fourth bit block comprises at least one bit obtained by a bit related to the second bit block through channel coding-related operation.

In one embodiment, the first sub-signal comprises an output after all or part of bits in a bit block in the first bit block group sequentially through part or all of CRC Insertion, Segmentation, Code Block-level CRC Insertion, Channel Coding, Rate Matching, Concatenation, Scrambling, Modulation, Layer Mapping, Precoding, Mapping to REs, Multicarrier symbol Generation and Modulation and Upconversion.

In one embodiment, a bit block in the first bit block group comprises at least one bit obtained by the first node performing channel coding related operation.

In one embodiment, the second sub-signal comprises an output after all or part of bits in another bit block in the first bit block group sequentially through part or all of CRC Insertion, Segmentation, Code Block-level CRC Insertion, Channel Coding, Rate Matching, Concatenation, Scrambling, Modulation, Layer Mapping, Precoding, Mapping to RE, Multicarrier symbol Generation and Modulation and Upconversion.

In one embodiment, another bit block in the first bit block group comprises at least one bit obtained by the first node performing a channel coding related operation.

In one embodiment, the fourth bit block comprises the second bit block.

In one embodiment, the fourth bit block comprises all bits in the second bit block.

In one embodiment, the fourth bit block only comprises part of bits in the second bit block.

In one embodiment, the second bit block generates the fourth bit block through a second procedure; and the second procedure comprises at least one operation of logic and, logical or, xor, deleting bit or zero-padding.

In one embodiment, the bit block generated by the second bit block comprises the second bit block.

In one embodiment, the bit block generated by the second bit block comprises all of bits in the second bit block.

In one embodiment, the bit block generated by the second bit block only comprises part of bits in the second bit block.

In one embodiment, the second bit block generates the first bit block generated by the second bit block through a second procedure; and the second procedure comprises at least one operation of logic and, logical or, xor, deleting bit or zero-padding.

In one embodiment, the fourth bit block comprises an HARQ-ACK.

In one embodiment, the bit block generated by the second bit block comprises an HARQ-ACK.

In one embodiment, the fourth bit block comprises a bit carrying HARQ-ACK information.

In one embodiment, the bit block generated by the second bit block comprises a bit carrying HARQ-ACK information In one embodiment, the second signaling indicates a second radio resource block; and the second radio resource block is overlapped with the first time-frequency-resource block in time domain.

In one embodiment, the second radio resource block comprises at least one RE.

In one embodiment, the second radio resource block comprises at least one sub-carrier in frequency domain.

In one embodiment, the second radio resource block comprises at least one PRB in frequency domain In one embodiment, the second radio resource block comprises at least one RB in frequency domain In one embodiment, the second radio resource block comprises at least one multi-carrier symbol in time domain In one embodiment, the second radio resource block comprises at least one slot in time domain In one embodiment, the second radio resource block comprises at least one sub-slot in time domain.

In one embodiment, the second radio resource block comprises at least one ms in time domain.

In one embodiment, the second radio resource block comprises at least one inconsecutive slot in time domain.

In one embodiment, the second radio resource block comprises at least one consecutive slot in time domain In one embodiment, the second radio resource block comprises at least one subframe in time domain In one embodiment, the second radio resource block comprises a PUCCH.

In one embodiment, the second radio resource block comprises an sPUSCH.

In one embodiment, the second radio resource block comprises an NB-PUSCH.

In one embodiment, the second radio resource block comprises a PSSCH.

In one embodiment, the second radio resource block comprises time-frequency resources scheduled on an Uplink.

In one embodiment, the second radio resource block comprises time-frequency resources scheduled on a Side-link.

In one embodiment, the first signaling explicitly indicates the first target index.

In one embodiment, the first signaling implicitly indicates the first target index.

In one embodiment, the second signaling explicitly indicates the second target index.

In one embodiment, the second signaling implicitly indicates the second target index.

In one embodiment, the first signaling comprises a first field, and the first field comprised in the first signaling indicates the first target index.

In one embodiment, the second signaling comprises a first field, and the first field comprised in the second signaling indicates the second target index.

In one embodiment, the first field is a Priority Indicator field.

In one embodiment, a signaling format of the first signaling implicitly indicates the first target index.

In one embodiment, a signaling format of the second signaling implicitly indicates the second target index.

In one embodiment, a Radio Network Temporary Identity (RNTI) of the first signaling implicitly indicates the first target index.

In one embodiment, an RNTI of the second signaling implicitly indicates the second target index.

In one embodiment, the first target index and the second target index are both priority indexes.

In one embodiment, the first target index and the second target index are both indexes used to indicate priority.

In one embodiment, the first target index indicates one of multiple different priorities, and the second target index indicates one of the multiple different priorities.

In one embodiment, the multiple different priorities comprises a high priority and a low priority.

In one embodiment, the first target index and the second target index are both indexes used to indicate service type.

In one embodiment, the first target index indicates one of multiple different service types, and the second target index indicates one of the multiple different service types.

In one embodiment, the multiple different service types comprises a URLLC and an eMBB.

In one embodiment, the multiple different service types comprises a service on an Uplink and a service on a Sidelink.

In one embodiment, the first target index is a positive integer.

In one embodiment, the first target index is 0.

In one embodiment, the first target index is 1.

In one embodiment, the second target index is a positive integer.

In one embodiment, the second target index is 0.

In one embodiment, the second target index is 1.

In one embodiment, the first target index and the second target index are respectively priority index 1 andnd priority index 0.

In one embodiment, the first target index and the second target index are respectively priority index 0 and priority index 1.

In one embodiment, both the first target index and the second target index are positive integers; a magnitude relation between the first target index and the second target index is used to determine whether the second sub-signal carries a bit block generated by the second bit block.

In one embodiment, the scheduling information comprises at least one of occupied time-domain resources, occupied frequency-domain resources, an MCS, configuration information of DMRS, an HARQ process number, an RV, an NDI, a transmitting antenna port, or a corresponding TCI state.

Embodiment 2

Figure 2:
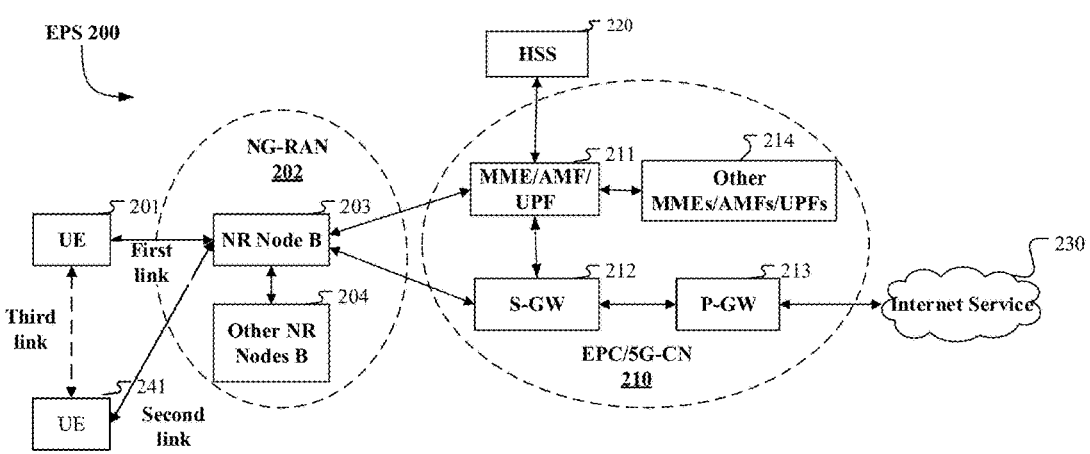
FIG. 2 illustrates a schematic diagram of a network architecture according to one embodiment of the present disclosure.

Embodiment 2 illustrates a schematic diagram of a network architecture according to the present disclosure, as shown in FIG. 2.

FIG. 2 illustrates a network architecture 200 of 5G NR, Long-Term Evolution (LTE) and Long-Term Evolution Advanced (LTE-A) systems. The NR 5G or LTE network architecture 200 may be called an Evolved Packet System (EPS) 200 or other appropriate terms. The EPS 200 may comprise one or more UEs 201, an NG-RAN 202, an Evolved Packet Core/5G-Core Network(EPC/5G-CN) 210, a Home Subscriber Server (HSS) 220 and an Internet Service 230. The EPS 200 may be interconnected with other access networks. For simple description, the entities/interfaces are not shown. As shown in FIG. 2, the EPS 200 provides packet switching services. Those skilled in the art will readily understand that various concepts presented throughout the present disclosure can be extended to networks providing circuit switching services or other cellular networks. The NG-RAN 202 comprises an NR node B (gNB) 203 and other gNBs 204. The gNB 203 provides UE 201-oriented user plane and control plane protocol terminations. The gNB 203 may be connected to other gNBs 204 via an Xn interface (for example, backhaul). The gNB 203 may be called a base station, a base transceiver station, a radio base station, a radio transceiver, a transceiver function, a Base Service Set (B SS), an Extended Service Set (ESS), a Transmitter Receiver Point (TRP) or some other applicable terms. The gNB 203 provides an access point of the EPC/5G-CN 210 for the UE 201. Examples of the UE 201 include cellular phones, smart phones, Session Initiation Protocol (SIP) phones, laptop computers, Personal Digital Assistant (PDA), satellite Radios, non-terrestrial base station communications, Satellite Mobile Communications, Global Positioning Systems (GPSs), multimedia devices, video devices, digital audio players (for example, MP3 players), cameras, game consoles, unmanned aerial vehicles (UAV), aircrafts, narrow-band Internet of Things (IoT) devices, machine-type communication devices, land vehicles, automobiles, wearable devices, or any other similar functional devices. Those skilled in the art also can call the UE 201 a mobile station, a subscriber station, a mobile unit, a subscriber unit, a wireless unit, a remote unit, a mobile device, a wireless device, a radio communication device, a remote device, a mobile subscriber station, an access terminal, a mobile terminal, a wireless terminal, a remote terminal, a handset, a user proxy, a mobile client, a client or some other appropriate terms. The gNB 203 is connected to the EPC/5G-CN 210 via an S1/NG interface. The EPC/5G-CN 210 comprises a Mobility Management Entity (MME)/Authentication Management Field (AMF)/User Plane Function (UPF) 211, other MMEs/AMFs/UPFs 214, a Service Gateway (S-GW) 212 and a Packet Date Network Gateway (P-GW) 213. The MME/AMF/UPF 211 is a control node for processing a signaling between the UE 201 and the EPC/5G-CN 210. Generally, the MME/AMF/UPF 211 provides bearer and connection management. All user Internet Protocol (IP) packets are transmitted through the S-GW 212, the S-GW 212 is connected to the P-GW 213. The P-GW 213 provides UE IP address allocation and other functions. The P-GW 213 is connected to the Internet Service 230. The Internet Service 230 comprises IP services corresponding to operators, specifically including Internet, Intranet, IP Multimedia Subsystem (IMS) and Packet Switching Streaming Services (PSS).

In one embodiment, the UE 201 corresponds to the first node in the present disclosure.

In one embodiment, the UE 241 corresponds to the second node in the present disclosure.

In one embodiment, the gNB 203 corresponds to the second node in the present disclosure.

In one embodiment, the UE 241 corresponds to the first node in the present disclosure.

In one embodiment, the UE 201 corresponds to the second node in the present disclosure.

Embodiment 3

Figure 3:
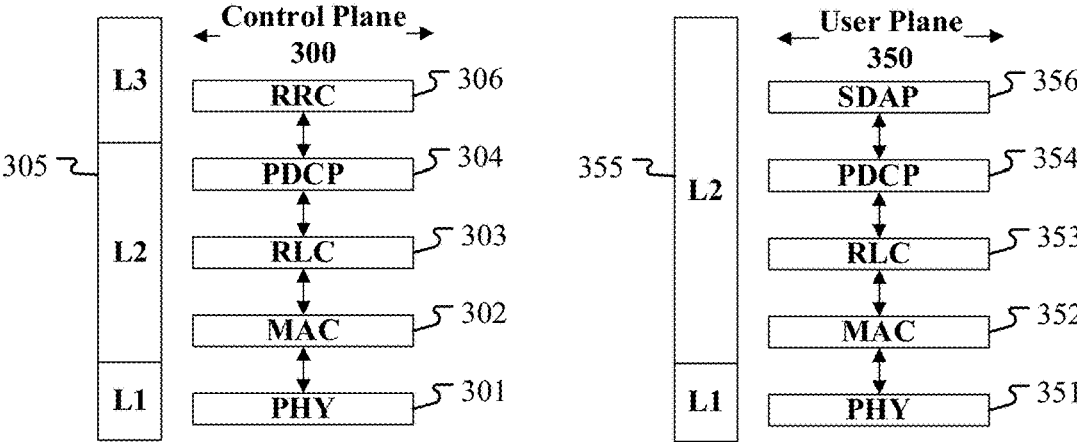
FIG. 3 illustrates a schematic diagram of a radio protocol architecture of a user plane and a control plane according to one embodiment of the present disclosure.

Embodiment 3 illustrates a schematic diagram of an example of a radio protocol architecture of a user plane and a control plane according to one embodiment of the present disclosure, as shown in FIG. 3. FIG. 3 is a schematic diagram illustrating an embodiment of a radio protocol architecture of a user plane 350 and a control plane 300. In FIG. 3, the radio protocol architecture for a first communication node (UE, gNB or an RSU in V2X) and a second communication node (gNB, UE or an RSU in V2X), or between two UEs is represented by three layers, which are a layer 1, a layer 2 and a layer 3, respectively. The layer 1 (L1) is the lowest layer and performs signal processing functions of various PHY layers. The L1 is called PHY 301 in the present disclosure. The layer 2 (L2) 305 is above the PHY 301, and is in charge of a link between a first communication node and a second communication node, as well as two UEs via the PHY 301. L2 305 comprises a Medium Access Control (MAC) sublayer 302, a Radio Link Control (RLC) sublayer 303 and a Packet Data Convergence Protocol (PDCP) sublayer 304. All the three sublayers terminate at the second communication node. The PDCP sublayer 304 provides multiplexing among variable radio bearers and logical channels. The PDCP sublayer 304 provides security by encrypting a packet and provides support for a first communication node handover between second communication nodes. The RLC sublayer 303 provides segmentation and reassembling of a higher-layer packet, retransmission of a lost packet, and reordering of a data packet so as to compensate the disordered receiving caused by HARQ. The MAC sublayer 302 provides multiplexing between a logical channel and a transport channel. The MAC sublayer 302 is also responsible for allocating between first communication nodes various radio resources (i.e., resource block) in a cell. The MAC sublayer 302 is also in charge of HARQ operation. The Radio Resource Control (RRC) sublayer 306 in layer 3 (L3) of the control plane 300 is responsible for acquiring radio resources (i.e., radio bearer) and configuring the lower layer with an RRC signaling between a second communication node and a first communication node device. The radio protocol architecture of the user plane 350 comprises layer 1 (L1) and layer 2 (L2). In the user plane 350, the radio protocol architecture for the first communication node and the second communication node is almost the same as the corresponding layer and sublayer in the control plane 300 for physical layer 351, PDCP sublayer 354, RLC sublayer 353 and MAC sublayer 352 in L2 layer 355, but the PDCP sublayer 354 also provides a header compression for a higher-layer packet so as to reduce a radio transmission overhead. The L2 layer 355 in the user plane 350 also includes Service Data Adaptation Protocol (SDAP) sublayer 356, which is responsible for the mapping between QoS flow and Data Radio Bearer (DRB) to support the diversity of traffic. Although not described in FIG. 3, the first communication node may comprise several higher layers above the L2 layer 355, such as a network layer (e.g., IP layer) terminated at a P-GW of the network side and an application layer terminated at the other side of the connection (e.g., a peer UE, a server, etc.).

In one embodiment, the radio protocol architecture in FIG. 3 is applicable to the first node in the present disclosure.

In one embodiment, the radio protocol architecture in FIG. 3 is applicable to the second node in the present disclosure.

In one embodiment, the first bit block in the present disclosure is generated by the RRC sublayer 306.

In one embodiment, the first bit block in the present disclosure is generated by the MAC sublayer 302.

In one embodiment, the first bit block in the present disclosure is generated by the MAC sublayer 352.

In one embodiment, the first bit block in the present disclosure is generated by the PHY 301.

In one embodiment, the first bit block in the present disclosure is generated by the PHY 351.

In one embodiment, the second bit block in the present disclosure is generated by the RRC sublayer 306.

In one embodiment, the second bit block in the present disclosure is generated by the MAC sublayer 302.

In one embodiment, the second bit block in the present disclosure is generated by the MAC sublayer 352.

In one embodiment, the second bit block in the present disclosure is generated by the PHY 301.

In one embodiment, the second bit block in the present disclosure is generated by the PHY 351.

In one embodiment, the third bit block in the present disclosure is generated by the SDAP sublayer 356.

In one embodiment, the third bit block in the present disclosure is generated by the MAC sublayer 302.

In one embodiment, the third bit block in the present disclosure is generated by the MAC sublayer 352.

In one embodiment, the third bit block in the present disclosure is generated by the PHY 301.

In one embodiment, the third bit block in the present disclosure is generated by the PHY 351.

In one embodiment, the fourth bit block in the present disclosure is generated by the SDAP sublayer 356.

In one embodiment, the fourth bit block in the present disclosure is generated by the MAC sublayer 302.

In one embodiment, the fourth bit block in the present disclosure is generated by the MAC sublayer 352.

In one embodiment, the fourth bit block in the present disclosure is generated by the PHY 301.

In one embodiment, the fourth bit block in the present disclosure is generated by the PHY 351.

In one embodiment, the first signaling in the present disclosure is generated by the RRC sublayer 306.

In one embodiment, the first signaling in the present disclosure is generated by the MAC sublayer 302.

In one embodiment, the first signaling in the present disclosure is generated by the MAC sublayer 352.

In one embodiment, the first signaling in the present disclosure is generated by the PHY 301.

In one embodiment, the first signaling in the present disclosure is generated by the PHY 351.

In one embodiment, the second signaling in the present disclosure is generated by the RRC sublayer 306.

In one embodiment, the second signaling in the present disclosure is generated by the MAC sublayer 302.

In one embodiment, the second signaling in the present disclosure is generated by the MAC sublayer 352.

In one embodiment, the second signaling in the present disclosure is generated by the PHY 301.

In one embodiment, the second signaling in the present disclosure is generated by the PHY351.

In one embodiment, the third signaling in the present disclosure is generated by the RRC sublayer 306.

In one embodiment, the third signaling in the present disclosure is generated by the MAC sublayer 302.

In one embodiment, the third signaling in the present disclosure is generated by the MAC sublayer 352.

In one embodiment, the third signaling in the present disclosure is generated by the PHY 301.

In one embodiment, the third signaling in the present disclosure is generated by the PHY351.

In one embodiment, any bit block group in the first bit block group in the present disclosure is generated by the SDAP sub-layer 356.

In one embodiment, any bit block group in the first bit block group in the present disclosure is generated by the MAC sub-layer 302.

In one embodiment, any bit block group in the first bit block group in the present disclosure is generated by the MAC sub-layer 352.

In one embodiment, any bit block group in the first bit block group in the present disclosure is generated by the PHY 301.

In one embodiment, any bit block group in the first bit block group in the present disclosure is generated by the PHY 351.

In one embodiment, the second bit block in the present disclosure is generated by the RRC sublayer 306.

In one embodiment, the second bit block in the present disclosure is generated by the MAC sublayer 302.

In one embodiment, the second bit block in the present disclosure is generated by the MAC sublayer 352.

In one embodiment, the second bit block in the present disclosure is generated by the PHY 301.

In one embodiment, the second bit block in the present disclosure is generated by the PHY 351.

In one embodiment, the fourth bit block in the present disclosure is generated by the RRC sublayer 306.

In one embodiment, the fourth bit block in the present disclosure is generated by the MAC sublayer 302.

In one embodiment, the fourth bit block in the present disclosure is generated by the MAC sublayer 352.

In one embodiment, the fourth bit block in the present disclosure is generated by the PHY 301.

In one embodiment, the fourth bit block in the present disclosure is generated by the PHY 351.

In one embodiment, the bit block generated by the second bit block in the present disclosure is generated by the RRC sublayer 306.

In one embodiment, the bit block generated by the second bit block in the present disclosure is generated by the MAC sublayer 302.

In one embodiment, the bit block generated by the second bit block in the present disclosure is generated by the MAC sublayer 352.

In one embodiment, the bit block generated by the second bit block in the present disclosure is generated by the PHY 301.

In one embodiment, the bit block generated by the second bit block in the present disclosure is generated by the PHY 351.

In one embodiment, the first signaling in the present disclosure is generated by the RRC sublayer 306.

In one embodiment, the first signaling in the present disclosure is generated by the MAC sublayer 302.

In one embodiment, the first signaling in the present disclosure is generated by the MAC sublayer 352.

In one embodiment, the first signaling in the present disclosure is generated by the PHY 301.

In one embodiment, the first signaling in the present disclosure is generated by the PHY 351.

In one embodiment, the second signaling in the present disclosure is generated by the RRC sublayer 306.

In one embodiment, the second signaling in the present disclosure is generated by the MAC sublayer 302.

In one embodiment, the second signaling in the present disclosure is generated by the MAC sublayer 352.

In one embodiment, the second signaling in the present disclosure is generated by the PHY 301.

In one embodiment, the second signaling in the present disclosure is generated by the PHY351.

Embodiment 4

Figure 4:
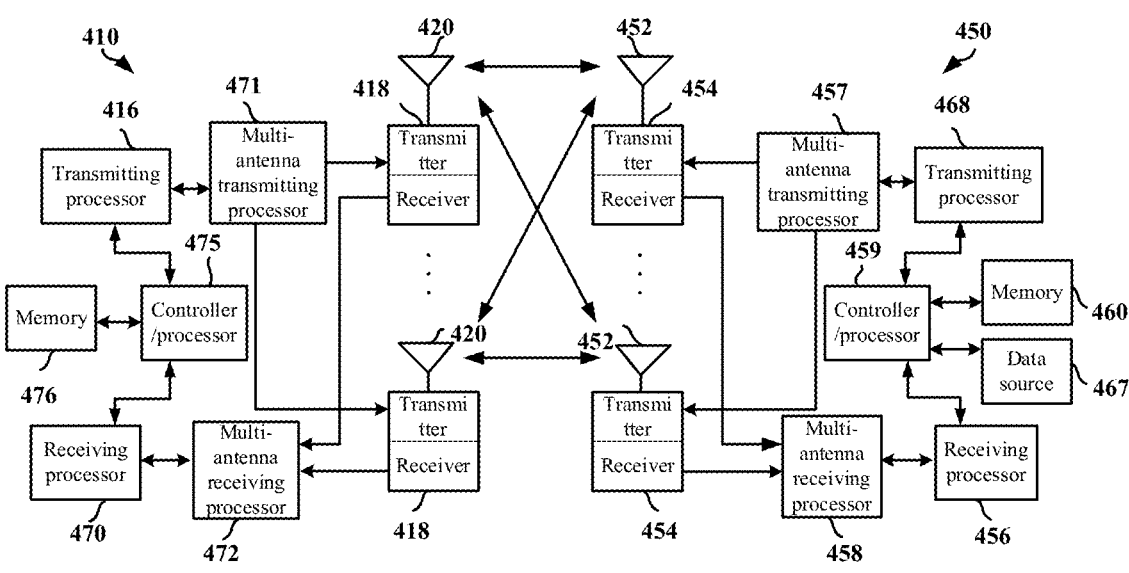
FIG. 4 illustrates a schematic diagram of a first communication device and a second communication device according to one embodiment of the present disclosure.

Embodiment 4 illustrates a schematic diagram of a first communication device and a second communication device in the present disclosure, as shown in FIG. 4. FIG. 4 is a block diagram of a first communication device 410 in communication with a second communication device 450 in an access network.

The first communication device 410 comprises a controller/processor 475, a memory 476, a receiving processor 470, a transmitting processor 416, a multi-antenna receiving processor 472, a multi-antenna transmitting processor 471, a transmitter/receiver 418 and an antenna 420.

The second communication device 450 comprises a controller/processor 459, a memory 460, a data source 467, a transmitting processor 468, a receiving processor 456, a multi-antenna transmitting processor 457, a multi-antenna receiving processor 458, a transmitter/receiver 454 and an antenna 452.

In a transmission from the first communication device 410 to the second communication device 450, at the first communication device 410, a higher layer packet from the core network is provided to a controller/processor 475. The controller/processor 475 provides a function of the L2 layer. In the transmission from the first communication device 410 to the first communication device 450, the controller/processor 475 provides header compression, encryption, packet segmentation and reordering, and multiplexing between a logical channel and a transport channel, and radio resources allocation to the second communication device 450 based on various priorities. The controller/processor 475 is also responsible for retransmission of a lost packet and a signaling to the second communication device 450. The transmitting processor 416 and the multi-antenna transmitting processor 471 perform various signal processing functions used for the L1 layer (that is, PHY). The transmitting processor 416 performs coding and interleaving so as to ensure an FEC (Forward Error Correction) at the second communication device 450, and the mapping to signal clusters corresponding to each modulation scheme (i.e., BPSK, QPSK, M-PSK, M-QAM, etc.). The multi-antenna transmitting processor 471 performs digital spatial precoding, including codebook-based precoding and non-codebook-based precoding, and beamforming on encoded and modulated symbols to generate one or more spatial streams. The transmitting processor 416 then maps each spatial stream into a subcarrier. The mapped symbols are multiplexed with a reference signal (i.e., pilot frequency) in time domain and/or frequency domain, and then they are assembled through Inverse Fast Fourier Transform (IFFT) to generate a physical channel carrying time-domain multi-carrier symbol streams. After that the multi-antenna transmitting processor 471 performs transmission analog precoding/beamforming on the time-domain multi-carrier symbol streams. Each transmitter 418 converts a baseband multicarrier symbol stream provided by the multi-antenna transmitting processor 471 into a radio frequency (RF) stream. Each radio frequency stream is later provided to different antennas 420.

In a transmission from the first communication device 410 to the second communication device 450, at the second communication device 450, each receiver 454 receives a signal via a corresponding antenna 452. Each receiver 454 recovers information modulated to the RF carrier, converts the radio frequency stream into a baseband multicarrier symbol stream to be provided to the receiving processor 456. The receiving processor 456 and the multi-antenna receiving processor 458 perform signal processing functions of the L1 layer. The multi-antenna receiving processor 458 performs receiving analog precoding/beamforming on a baseband multicarrier symbol stream from the receiver 454. The receiving processor 456 converts the baseband multicarrier symbol stream after receiving the analog precoding/beamforming from time domain into frequency domain using FFT. In frequency domain, a physical layer data signal and a reference signal are de-multiplexed by the receiving processor 456, wherein the reference signal is used for channel estimation, while the data signal is subjected to multi-antenna detection in the multi-antenna receiving processor 458 to recover any the second communication device-targeted spatial stream. Symbols on each spatial stream are demodulated and recovered in the receiving processor 456 to generate a soft decision. Then the receiving processor 456 decodes and de-interleaves the soft decision to recover the higher-layer data and control signal transmitted on the physical channel by the first communication node 410. Next, the higher-layer data and control signal are provided to the controller/processor 459. The controller/processor 459 performs functions of the L2 layer. The controller/processor 459 can be connected to a memory 460 that stores program code and data. The memory 460 can be called a computer readable medium. In the transmission from the first communication device 410 to the second communication device

450, the controller/processor 459 provides demultiplexing between a transport channel and a logical channel, packet reassembling, decryption, header decompression and control signal processing so as to recover a higher-layer packet from the core network. The higher-layer packet is later provided to all protocol layers above the L2 layer, or various control signals can be provided to the L3 layer for processing.

In a transmission from the second communication device 450 to the first communication device 410, at the second communication device 450, the data source 467 is configured to provide a higher-layer packet to the controller/processor 459. The data source 467 represents all protocol layers above the L2 layer. Similar to a transmitting function of the first communication device 410 described in the transmission from the first communication device 410 to the second communication device 450, the controller/processor 459 performs header compression, encryption, packet segmentation and reordering, and multiplexing between a logical channel and a transport channel based on radio resources allocation so as to provide the L2 layer functions used for the user plane and the control plane. The controller/processor 459 is also responsible for retransmission of a lost packet, and a signaling to the first communication device 410. The transmitting processor 468 performs modulation mapping and channel coding. The multi-antenna transmitting processor 457 implements digital multi-antenna spatial precoding, including codebook-based precoding and non-codebook-based precoding, as well as beamforming. Following that, the generated spatial streams are modulated into multicarrier/single-carrier symbol streams by the transmitting processor 468, and then modulated symbol streams are subjected to analog precoding/beamforming in the multi-antenna transmitting processor 457 and provided from the transmitters 454 to each antenna 452. Each transmitter 454 first converts a baseband symbol stream provided by the multi-antenna transmitting processor 457 into a radio frequency symbol stream, and then provides the radio frequency symbol stream to the antenna 452.

In the transmission from the second communication device 450 to the first communication device 410, the function of the first communication device 410 is similar to the receiving function of the second communication device 450 described in the transmission from the first communication device 410 to the second communication device 450. Each receiver 418 receives a radio frequency signal via a corresponding antenna 420, converts the received radio frequency signal into a baseband signal, and provides the baseband signal to the multi-antenna receiving processor 472 and the receiving processor 470. The receiving processor 470 and multi-antenna receiving processor 472 collectively provide functions of the L1 layer. The controller/processor 475 provides functions of the L2 layer. The controller/processor 475 can be connected with the memory 476 that stores program code and data. The memory 476 can be called a computer readable medium. In the transmission from the second communication device 450 to the first communication device 410,the controller/processor 475 provides de-multiplexing between a transport channel and a logical channel, packet reassembling, decryption, header decompression, control signal processing so as to recover a higher-layer packet from the UE 450. The higher-layer packet coming from the controller/processor 475 may be provided to the core network.

In one embodiment, the first node in the present disclosure comprises the second communication device 450, and the second node in the present disclosure comprises the first communication device 410.

In one subembodiment of the above embodiment, the first node is a UE, and the second node is a UE.

In one subembodiment of the above embodiment, the first node is a UE, and the second node is a relay node.

In one subembodiment of the above embodiment, the first node is a relay node, and the second node is a UE.

In one subembodiment of the above embodiment, the first node is a UE, and the second node is a base station In one subembodiment of the above embodiment, the first node is a relay node, and the second node is a base station In one subembodiment of the above embodiment, the second communication device 450 comprises: at least one controller/processor; the at least one controller/processor is responsible for HARQ operation.

In one subembodiment of the above embodiment, the first communication device 410 comprises: at least one controller/processor; the at least one controller/processor is responsible for HARQ operation.

In one subembodiment of the above embodiment, the first communication device 410 comprises: at least one controller/processor; the at least one controller/processor is responsible for error detection using ACK and/or NACK protocols as a way to support HARQ operation In one embodiment, the second communication device 450 comprises at least one processor and at least one memory. The at least one memory comprises computer program codes; the at least one memory and the computer program codes are configured to be used in collaboration with the at least one processor. The second communication device 450 at least: receives the first signaling in the present disclosure; and transmits the first signal in the present disclosure in the target time-frequency-resource block in the present disclosure, and the first signal carries the second bit block in the present disclosure; herein, the first signaling is used to determine a first bit block in the present disclosure; the first bit block comprises the second-type HARQ-ACK in the present disclosure; the first bit block is used to generate the second bit block; the target time-frequency-resource block is the first time-frequency-resource block in the present disclosure or the second time-frequency-resource block in the present disclosure; the first time-frequency-resource block and the second time-frequency-resource block are respectively reserved for different bit blocks; a number of resources used to transmit the first-type HARQ-ACK in the present disclosure in the first time-frequency-resource block is used to determine whether the target time-frequency-resource block is the first time-frequency-resource block or the second time-frequency-resource block; the first-type HARQ-ACK corresponds to the first index in the present disclosure; the second-type HARQ-ACK corresponds to the second index in the present disclosure, and the first index is not equal to the second index; the first signaling indicates the second index; and the first time-frequency-resource block corresponds to the first index.

In one subembodiment of the above embodiment, the second communication device 450 corresponds to the first node in the present disclosure.

In one embodiment, the second communication device 450 comprises a memory that stores a computer readable instruction program. The computer readable instruction program generates an action when executed by at least one processor. The action includes: receiving the first signaling in the present disclosure; and transmitting the first signal in the present disclosure in the target time-frequency-resource block in the present disclosure, and the first signal carrying the second bit block in the present disclosure; herein, the first signaling is used to determine a first bit block in the present disclosure; the first bit block comprises the second-type HARQ-ACK in the present disclosure; the first bit block is used to generate the second bit block; the target time-frequency-resource block is the first time-frequency-resource block in the present disclosure or the second time-frequency-resource block in the present disclosure; the first time-frequency-resource block and the second time-frequency-resource block are respectively reserved for different bit blocks; a number of resources used to transmit the first-type HARQ-ACK in the present disclosure in the first time-frequency-resource block is used to determine whether the target time-frequency-resource block is the first time-frequency-resource block or the second time-frequency-resource block; the first-type HARQ-ACK corresponds to the first index in the present disclosure; the second-type HARQ-ACK corresponds to the second index in the present disclosure, and the first index is not equal to the second index; the first signaling indicates the second index; and the first time-frequency-resource block corresponds to the first index.

In one subembodiment of the above embodiment, the second communication device 450 corresponds to the first node in the present disclosure.

In one embodiment, the first communication device 410 comprises at least one processor and at least one memory. The at least one memory comprises computer program codes; the at least one memory and the computer program codes are configured to be used in collaboration with the at least one processor. The first communication device 410 at least: transmits the first signaling in the present disclosure; and receives the first signal in the present disclosure in the target time-frequency-resource block in the present disclosure, and the first signal carries the second bit block in the present disclosure; herein, the first signaling is used to determine the first bit block in the present disclosure; the first bit block comprises the second-type HARQ-ACK in the present disclosure; the first bit block is used to generate the second bit block; the target time-frequency-resource block is the first time-frequency-resource block in the present disclosure or the second time-frequency-resource block in the present disclosure; the first time-frequency-resource block and the second time-frequency-resource block are respectively reserved for different bit blocks; a number of resources used to transmit the first-type HARQ-ACK in the present disclosure in the first time-frequency-resource block is used to determine whether the target time-frequency-resource block is the first time-frequency-resource block or the second time-frequency-resource block; the first-type HARQ-ACK corresponds to the first index in the present disclosure; the second-type HARQ-ACK corresponds to the second index in the present disclosure, and the first index is not equal to the second index; the first signaling indicates the second index; and the first time-frequency-resource block corresponds to the first index.

In one subembodiment of the above embodiment, the first communication device 410 corresponds to the second node in the present disclosure.

In one embodiment, the first communication device 410 comprises a memory that stores a computer readable instruction program. The computer readable instruction program generates an action when executed by at least one processor.

The action includes: transmitting the first signaling in the present disclosure; and receiving the first signal in the present disclosure in the target time-frequency-resource block in the present disclosure, and the first signal carrying the second bit block in the present disclosure; herein, the first signaling is used to determine a first bit block in the present disclosure; the first bit block comprises the second-type HARQ-ACK in the present disclosure; the first bit block is used to generate the second bit block; the target time-frequency-resource block is the first time-frequency-resource block in the present disclosure or the second time-frequency-resource block in the present disclosure; the first time-frequency-resource block and the second time-frequency-resource block are respectively reserved for different bit blocks; a number of resources used to transmit the first-type HARQ-ACK in the present disclosure in the first time-frequency-resource block is used to determine whether the target time-frequency-resource block is the first time-frequency-resource block or the second time-frequency-resource block; the first-type HARQ-ACK corresponds to the first index in the present disclosure; the second-type HARQ-ACK corresponds to the second index in the present disclosure, and the first index is not equal to the second index; the first signaling indicates the second index; and the first time-frequency-resource block corresponds to the first index.

In one subembodiment of the above embodiment, the first communication device 410 corresponds to the second node in the present disclosure.

In one embodiment, at least one of the antenna 452, the receiver 454, the multi-antenna receiving processor 458, the receiving processor 456, the controller/processor 459, the memory 460, or the data source 467 is used to receive the first signaling in the present disclosure.

In one embodiment, at least one of the antenna 420, the transmitter 418, the multi-antenna transmitting processor 471, the transmitting processor 416, the controller/processor 475, or the memory 476 is used to transmit the first signaling in the present disclosure.

In one embodiment, at least one of the antenna 452, the receiver 454, the multi-antenna receiving processor 458, the receiving processor 456, the controller/processor 459, the memory 460, or the data source 467 is used to receive the second signaling in the present disclosure.

In one embodiment, at least one of the antenna 420, the transmitter 418, the multi-antenna transmitting processor 471, the transmitting processor 416, the controller/processor 475, or the memory 476 is used to transmit the second signaling in the present disclosure.

In one embodiment, at least one of the antenna 452, the receiver 454, the multi-antenna receiving processor 458, the receiving processor 456, the controller/processor 459, the memory 460, or the data source 467 is used to receive the third signaling in the present disclosure.

In one embodiment, at least one of the antenna 420, the transmitter 418, the multi-antenna transmitting processor 471, the transmitting processor 416, the controller/processor 475, or the memory 476 is used to transmit the third signaling in the present disclosure.

In one embodiment, at least one of the antenna 452, the transmitter 454, the multi-antenna transmission processor 458, the transmitting processor 468, the controller/processor 459, the memory 460, or the data source 467 is used to transmit the first signaling in the present disclosure in the target time-frequency-resource block in the present disclosure.

In one embodiment, at least one of the antenna 420, the receiver 418, the multi-antenna receiving processor 472, the receiving processor 470, the controller/processor 475, or the memory 476 is used to receive the first signal in the present disclosure in the target time-frequency-resource block in the present disclosure.

In one embodiment, the second communication device 450 comprises at least one processor and at least one memory. The at least one memory comprises computer program codes; the at least one memory and the computer program codes are configured to be used in collaboration with the at least one processor. The second communication device 450 at least: receives the first signaling in the present disclosure and the second signaling in the present disclosure; and transmits the first signal in the present disclosure in the first time-frequency-resource block in the present disclosure, and the first signal in the present disclosure carries the first bit block group in the present disclosure and the fourth bit block in the present disclosure; the first signaling indicates the first time-frequency-resource block; the first signaling comprises scheduling information of the first signal; the second signaling is used to determine a second bit block in the present disclosure; the first signal comprises the first sub-signal in the present disclosure and the second sub-signal in the present disclosure; the first sub-signal and the second sub-signal respectively carry different bit blocks in the first bit block group; the first sub-signal carries the fourth bit block, and the second bit block is used to generate the fourth bit block; the first signaling indicates the first target index in the present disclosure, and the second signaling indicates the second target index in the present disclosure; the first target index and the second target index are used together to determine whether the second sub-signal carries a bit block generated by the second bit block.

In one subembodiment of the above embodiment, the second communication device 450 corresponds to the first node in the present disclosure.

In one embodiment, the second communication device 450 comprises a memory that stores a computer readable instruction program. The computer readable instruction program generates an action when executed by at least one processor. The action includes: receiving the first signaling in the present disclosure and the second signaling in the present disclosure; and transmitting the first signal in the present disclosure in the first time-frequency-resource block in the present disclosure, and the first signal in the present disclosure carrying the first bit block group in the present disclosure and the fourth bit block in the present disclosure; the first signaling indicates the first time-frequency-resource block; the first signaling comprises scheduling information of the first signal; the second signaling is used to determine a second bit block in the present disclosure; the first signal comprises the first sub-signal in the present disclosure and the second sub-signal in the present disclosure; the first sub-signal and the second sub-signal respectively carry different bit blocks in the first bit block group; the first sub-signal carries the fourth bit block, and the second bit block is used to generate the fourth bit block; the first signaling indicates the first target index in the present disclosure, and the second signaling indicates the second target index in the present disclosure; the first target index and the second target index are used together to determine whether the second sub-signal carries a bit block generated by the second bit block.

In one subembodiment of the above embodiment, the second communication device 450 corresponds to the first node in the present disclosure.

In one embodiment, the first communication device 410 comprises at least one processor and at least one memory. The at least one memory comprises computer program codes; the at least one memory and the computer program codes are configured to be used in collaboration with the at least one processor. The first communication device 410 at least least: transmits the first signaling in the present disclosure and the second signaling in the present disclosure; and receives the first signal in the present disclosure in the first time-frequency-resource block in the present disclosure, and the first signal in the present disclosure carries the first bit block group in the present disclosure and the fourth bit block in the present disclosure; the first signaling indicates the first time-frequency-resource block; the first signaling comprises scheduling information of the first signal; the second signaling is used to determine a second bit block in the present disclosure; the first signal comprises the first sub-signal in the present disclosure and the second sub-signal in the present disclosure; the first sub-signal and the second sub-signal respectively carry different bit blocks in the first bit block group; the first sub-signal carries the fourth bit block, and the second bit block is used to generate the fourth bit block; the first signaling indicates the first target index in the present disclosure, and the second signaling indicates the second target index in the present disclosure; the first target index and the second target index are used together to determine whether the second sub-signal carries a bit block generated by the second bit block.

In one subembodiment of the above embodiment, the first communication device 410 corresponds to the second node in the present disclosure.

In one embodiment, the first communication device 410 comprises a memory that stores a computer readable instruction program. The computer readable instruction program generates an action when executed by at least one processor. The action includes: transmitting the first signaling in the present disclosure and the second signaling in the present disclosure; and receiving the first signal in the present disclosure in the first time-frequency-resource block in the present disclosure, and the first signal in the present disclosure carrying the first bit block group in the present disclosure and the fourth bit block in the present disclosure; the first signaling indicates the first time-frequency-resource block; the first signaling comprises scheduling information of the first signal; the second signaling is used to determine a second bit block in the present disclosure; the first signal comprises the first sub-signal in the present disclosure and the second sub-signal in the present disclosure; the first sub-signal and the second sub-signal respectively carry different bit blocks in the first bit block group; the first sub-signal carries the fourth bit block, and the second bit block is used to generate the fourth bit block; the first signaling indicates the first target index in the present disclosure, and the second signaling indicates the second target index in the present disclosure; the first target index and the second target index are used together to determine whether the second sub-signal carries a bit block generated by the second bit block.

In one subembodiment of the above embodiment, the first communication device 410 corresponds to the second node in the present disclosure.

In one embodiment, at least one of the antenna 452, the receiver 454, the multi-antenna receiving processor 458, the receiving processor 456, the controller/processor 459, the memory 460, or the data source 467 is used to receive the first signaling in the present disclosure.

In one embodiment, at least one of the antenna 420, the transmitter 418, the multi-antenna transmitting processor 471, the transmitting processor 416, the controller/processor 475, or the memory 476 is used to transmit the first signaling in the present disclosure.

In one embodiment, at least one of the antenna 452, the receiver 454, the multi-antenna receiving processor 458, the receiving processor 456, the controller/processor 459, the memory 460, or the data source 467 is used to receive the second signaling in the present disclosure.

In one embodiment, at least one of the antenna 420, the transmitter 418, the multi-antenna transmitting processor 471, the transmitting processor 416, the controller/processor 475, or the memory 476 is used to transmit the second signaling in the present disclosure.

In one embodiment, at least one of the antenna 452, the transmitter 454, the multi-antenna transmission processor 458, the transmitting processor 468, the controller/processor 459, the memory 460, or the data source 467 is used to transmit the first signal in the present disclosure in the first time-frequency-resource block in the present disclosure.

In one embodiment, at least one of the antenna 420, the receiver 418, the multi-antenna receiving processor 472, the receiving processor 470, the controller/processor 475, or the memory 476 is used to receive the first signal in the present disclosure in the first time-frequency-resource block in the present disclosure.

Embodiment 5A

Figure 5A:
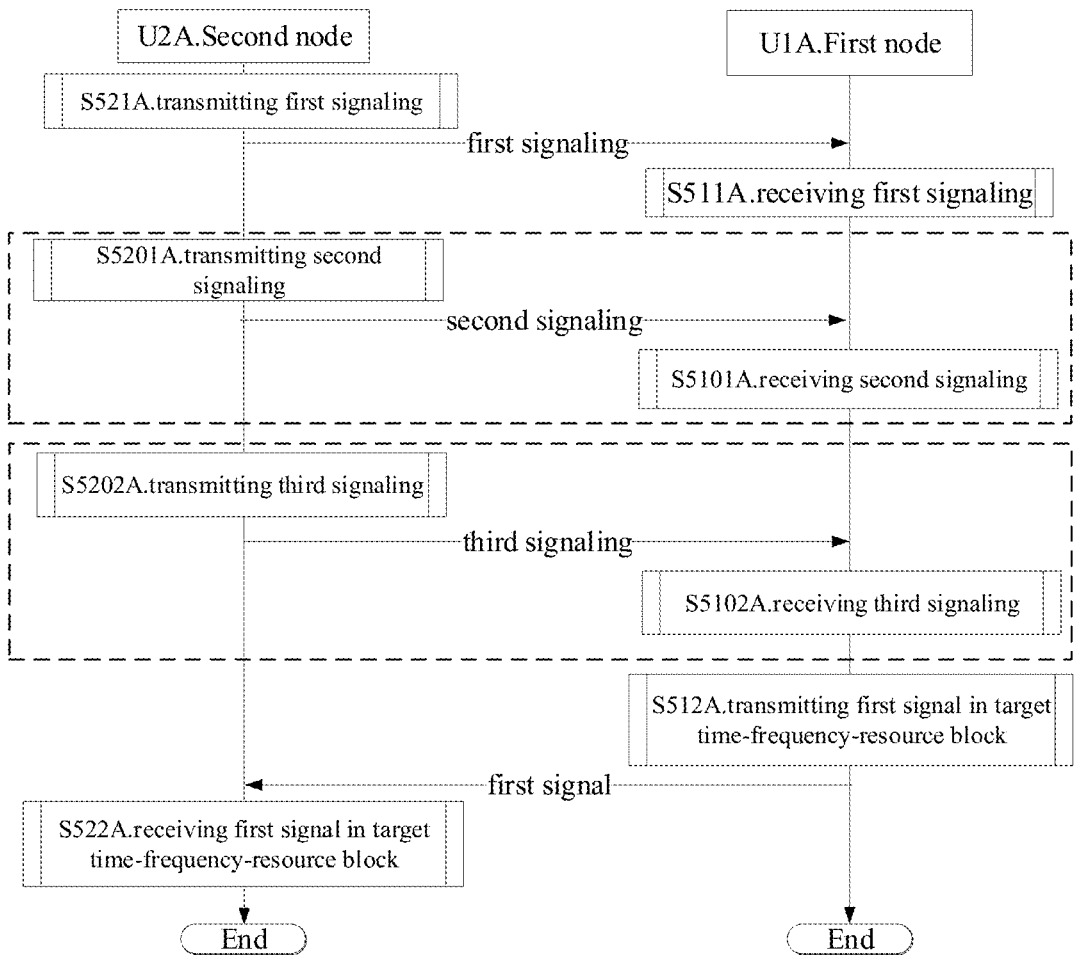
FIG. 5A illustrates a flowchart of signal transmission according to one embodiment of the present disclosure.

Embodiment 5A illustrates a flowchart of radio signal transmission according to one embodiment in the present disclosure, as shown in FIG. 5. In FIG. 5A, a first node U1A and a second node U2A are in communications via an air interface. In particular, the sequence of three step pairs of {S521A, S511A}, {S5201A, S5101A} and {S5202A, S5102A} does not represent a specific time-domain relation. In FIG. 5A, parts of boxes F1A and F2A framed by dotted lines are optional.

The first node U1A receives a first signaling in step S511A; receives a second signaling in step S5101A; receives a third signaling in step S5102A; and transmits a first signal in a target time-frequency-resource block in step S512A.

The second node U2A transmits a first signaling in step S521A; transmits a second signaling in step S5201A; transmits a third signaling in step S5202A; and receives a first signal in a target time-frequency-resource block in step S522A.

In Embodiment 5A, the first signal carries a second bit block; the first signaling is used to determine a first bit block; the first bit block comprises a second-type HARQ-ACK; the first bit block is used to generate the second bit block; the target time-frequency-resource block is a first time-frequency-resource block or a second time-frequency-resource block; the first time-frequency-resource block and the second time-frequency-resource block are respectively reserved for different bit blocks; a number of resources used to transmit a first-type HARQ-ACK in the first time-frequency-resource block is used to determine whether the target time-frequency-resource block is the first time-frequency-resource block or the second time-frequency-resource block; the first-type HARQ-ACK corresponds to a first index; the second-type HARQ-ACK corresponds to a second index, and the first index is not equal to the second index; the first signaling indicates the second index; the first time-frequency-resource block corresponds to the first index; the first time-frequency-resource block and the second time-frequency-resource block respectively belong to two different serving cells, and a serving cell ID corresponding to the first time-frequency-resource block is smaller than a serving cell ID corresponding to the second time-frequency-resource block; the second time-frequency-resource block corresponds to the first index; a first radio resource block is reserved for the first bit block; the first signaling is used for determining the first radio resource block; the first radio resource block overlaps with the first time-frequency-resource block in time domain; the first radio resource block overlaps with the second time-frequency-resource block in time domain; the second time-frequency-resource block is reserved for a fourth bit block; and the second signaling is used to determine the second time-frequency-resource block; the first time-frequency-resource block is reserved for a third bit block; and the third signaling is used to determine the first time-frequency-resource block.

In one subembodiment of Embodiment 5A, when a number of resources used to transmit the first-type HARQ-ACK in the first time-frequency-resource block is not greater than a first value, the target time-frequency-resource block is the first time-frequency-resource block; when the number of resources used to transmit the first-type HARQ-ACK in the first time-frequency-resource block is greater than the first value, the target time-frequency-resource block is the second time-frequency-resource block; the first value is greater than 0.

In one subembodiment of Embodiment 5A, when a number of resources used to transmit the first-type HARQ-ACK in the first time-frequency-resource block is equal to 0, the target time-frequency-resource block is the first time-frequency-resource block; when the number of resources used to transmit the first-type HARQ-ACK in the first time-frequency-resource block is greater than 0, the target time-frequency-resource block is the second time-frequency-resource block.

In one embodiment, the first node U1A is the first node in the present disclosure.

In one embodiment, the second node U2A is the second node in the present disclosure.

In one embodiment, the first node U1A is a UE.

In one embodiment, the second node U2A is a base station.

In one embodiment, the second node U2A is a UE.

In one embodiment, an air interface between the second node U2A and the first node U1A is a Uu interface.

In one embodiment, an air interface between the second node U2A and the first node U1A comprises a cellular link.

In one embodiment, an air interface between the second node U2A and the first node U1A is a PC5 interface.

In one embodiment, an air interface between the second node U2A and the first node U1A comprises a Sidelink.

In one embodiment, an air interface between the second node U2A and the first node U1A comprises a radio interface between a base station and a UE.

In one embodiment, the first time-frequency-resource block and the second time-frequency-resource block belong to two different serving cells respectively.

In one embodiment, a first serving cell and a second serving cell are respectively different serving cells; the first time-frequency-resource block belongs to the first serving cell; frequency-domain resources occupied by the first time-frequency-resource block are comprised in a band corresponding to the first serving cell; the second time-frequency-resource block belongs to the second serving cell; frequency-domain resources occupied by the second time-frequency-resource block are comprised in a band corresponding to the second serving cell.

In one embodiment, the first time-frequency-resource block and the second time-frequency-resource block belong to two different serving cells respectively; the two different serving cells respectively correspond to two different bands.

In one embodiment, a first serving cell and a second serving cell are respectively different serving cells; the first time-frequency-resource block belongs to the first serving cell; the serving cell ID corresponding to the first time-frequency resource is an ID of the first serving cell; the second time-frequency-resource block belongs to the second serving cell; the serving cell identity corresponding to the second time-frequency resource is an ID of the second serving cell.

In one embodiment, the first time-frequency-resource block belongs to a first serving cell; the first time-frequency-resource block comprises a PUSCH; the PUSCH comprised in the first time-frequency-resource block is transmitted by the first node in the first serving cell.

In one embodiment, the second time-frequency-resource block belongs to a second serving cell; the second time-frequency-resource block comprises a PUSCH; the PUSCH comprised in the second time-frequency-resource block is transmitted by the first node in the second serving cell.

In one embodiment, the second time-frequency-resource block is a time-frequency-resource block in a second time-frequency-resource block group.

In one embodiment, the second time-frequency-resource block is a time-frequency-resource block in a second time-frequency-resource block group; any time-frequency-resource block in the second time-frequency-resource block belongs to one of multiple serving cells, a serving cell ID corresponding to the second time-frequency-resource block is not greater than a serving cell ID corresponding to any time-frequency-resource block other than the second time-frequency-resource block in the second time-frequency-resource block group.

In one embodiment, the phrase that the second time-frequency-resource block corresponds to the first index includes:

the first index is a priority index; the first index is equal to 1; the second time-frequency-resource block comprises a channel; and the channel comprised in the second time-frequency-resource block is a PUSCH of priority index 1.

In one embodiment, the phrase that the second time-frequency-resource block corresponds to the first index includes: the first index is a priority index; the first index is equal to 0; the second time-frequency-resource block comprises a channel; the channel comprised in the second time-frequency-resource block is a PUSCH of priority index 0.

In one embodiment, the phrase that the second time-frequency-resource block corresponds to the first index includes: the first index is a priority index; the first index is equal to 1; the second time-frequency-resource block comprises a channel; the channel comprised in the second time-frequency-resource block is a PUCCH of priority index 1.

In one embodiment, the phrase that the second time-frequency-resource block corresponds to the first index includes: the first index is a priority index; the first index is equal to 0; the second time-frequency-resource block comprises a channel; the channel comprised in the second time-frequency-resource block is a PUCCH of priority index 0.

In one embodiment, the phrase that the second time-frequency-resource block corresponds to the first index includes: the first node receives a second signaling; the second signaling indicates the second time-frequency-resource block; and the second signaling indicates the first index.

In one embodiment, the phrase that the first time-frequency-resource block corresponds to the first index includes: the first time-frequency-resource block comprises a physical channel determined as the first index.

In one embodiment, an index corresponding to the second time-frequency-resource block is the same as an index corresponding to the first time-frequency-resource block.

In one embodiment, the second time-frequency-resource block corresponds to the second index.

In one subembodiment of the above embodiment, the second time-frequency-resource block comprises a physical channel determined as the second index.

In one subembodiment of the above embodiment, the first node receives a second signaling; the second signaling indicates the second time-frequency-resource block; and the second signaling indicates the second index.

In one embodiment, a method used in the first node in the present disclosure also comprises:

receiving a third signaling;

herein, the first time-frequency-resource block is reserved for a third bit block; and the third signaling is used to determine the first time-frequency-resource block.

In one embodiment, steps in the box F1A framed with dotted lines in FIG. 5A exist.

In one embodiment, steps in the box F1A framed with dotted lines in FIG. 5A do not exist.

In one embodiment, steps in the box F2A framed with dotted lines in FIG. 5A exist.

In one embodiment, steps in the box F2A framed with dotted lines in FIG. 5A do not exist.

Embodiment 5B

Figures 5B, 6A:
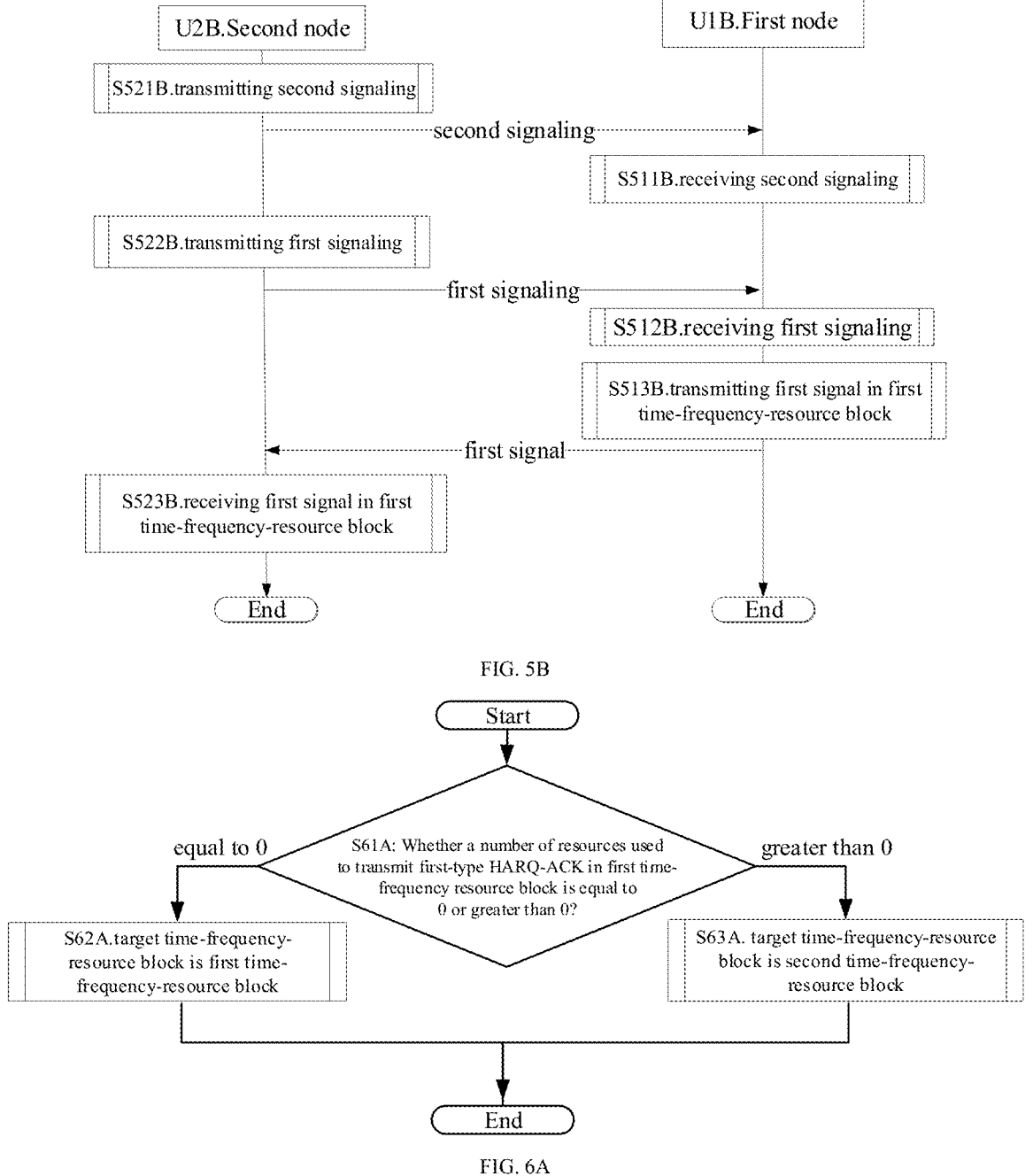
FIG. 5B illustrates a flowchart of signal transmission according to one embodiment of the present disclosure.
FIG. 6A illustrates a schematic diagram of judging whether a target time-frequency-resource block is a first time-frequency-resource block or a second time-frequency-resource block according to one embodiment of the present disclosure.

Embodiment 5B illustrates a flowchart of radio signal transmission according to one embodiment in the present disclosure, as shown in FIG. 5. In FIG. 5B, a first node U1B and a second node U2B are in communications via an air interface.

The first node U1B receives a second signaling in step S511B; receives a first signaling in step S512B; and transmits a first signal in a first time-frequency-resource block in step S513B.

The second node U2B transmits a second signaling in step S521B; transmits a first signaling in step S522B; and receives a first signal in a first time-frequency-resource block in step S523B.

In Embodiment 5B, the first signal carries a first bit block group and a fourth bit block; the first signaling indicates the first time-frequency-resource block; the first signaling comprises scheduling information of the first signal; the second signaling is used to determine a second bit block; the first signal comprises a first sub-signal and a second sub-signal; the first sub-signal and the second sub-signal respectively carry different bit blocks in the first bit block group; the first sub-signal carries the fourth bit block, and the second bit block is used to generate the fourth bit block; the first signaling indicates a first target index, and the second signaling indicates a second target index; the first target index and the second target index are used together to determine whether the second sub-signal carries a bit block generated by the second bit block; the second sub-signal carries a bit block generated by the second bit block; and the bit block generated by the second bit block is the same as the fourth bit block; a first index is different from a second index; when the first target index is the first index and the second target index is the second index, the second sub-signal does not carry a bit block generated by the second bit block; when the first target index is not the first index or the second target index is not the second index, the second sub-signal carries a bit block generated by the second bit block; the second bit block comprises an HARQ-ACK.

In one subembodiment of Embodiment 5B, the first sub-signal and the second sub-signal occupy same time-frequency resources; the first signal is mapped onto multiple transmission layers; the multiple transmission layers comprises a first transmission layer and a second transmission layer, and the first transmission layer is different from the second transmission layer; the first sub-signal comprises a part of the first signal mapped onto the first transmission layer; the second sub-signal comprises a part of the first signal mapped onto the second transmission layer.

In one subembodiment of Embodiment 5B, the first time-frequency-resource block comprises a first time-frequency resource sub-block and a second time-frequency-resource block; the first time-frequency resource sub-block does not overlap with the second time-frequency resource sub-block; the first sub-signal comprises a part of the first signal mapped into the first time-frequency resource sub-block; the second sub-signal comprises a part of the first signal mapped into the second time-frequency resource sub-block.

In one embodiment, the first node U1B is the first node in the present disclosure.

In one embodiment, the second node U2B is the second node in the present disclosure.

In one embodiment, the first node U1B is a UE.

In one embodiment, the second node U2B is a base station

In one embodiment, the second node U2B is a UE.

In one embodiment, an air interface between the second node U2B and the first node U1B is a Uu interface.

In one embodiment, an air interface between the second node U2B and the first node U1B comprises a cellular link.

In one embodiment, an air interface between the second node U2B and the first node U1B is a PC5 interface.

In one embodiment, an air interface between the second node U2B and the first node U1B comprises a Sidelink.

In one embodiment, an air interface between the second node U2B and the first node U1B comprises a radio interface between a base station and a UE.

In one embodiment, the second sub-signal carries a bit block generated by the second bit block; and the bit block generated by the second bit block comprises all of bits comprised in the fourth bit block.

In one embodiment, the second sub-signal carries a bit block generated by the second bit block; the bit block generated by the second bit block only comprises all of bits comprised in the fourth bit block.

In one embodiment, the second sub-signal carries a bit block generated by the second bit block; the bit block generated by the second bit block comprises part of bits comprised in the fourth bit block.

In one embodiment, the second bit block comprises a low-priority HARQ-ACK.

In one embodiment, the second bit block comprises a high-priority HARQ-ACK.

In one embodiment, the second bit block comprises an HARQ-ACK; the second target index is used to determine whether the HARQ-ACK comprised in the second bit block is a high-priority HARQ-ACK or a low-priority HARQ-ACK.

In one embodiment, the second bit block comprises an HARQ-ACK; the second target index indicates whether the HARQ-ACK comprised in the second bit block is a high-priority HARQ-ACK or a low-priority HARQ-ACK.

In one embodiment, the second bit block comprises an HARQ-ACK; the second target index is used to determine whether the HARQ-ACK comprised in the second bit block is a URLLC-service-type HARQ-ACK or an eMBB-service-type
HARQ-ACK.

In one embodiment, the second bit block comprises an HARQ-ACK; the second target index indicates whether the HARQ-ACK comprised in the second bit block is a URLLC-service-type HARQ-ACK or an eMBB-service-type HARQ-ACK.

In one embodiment, all HARQ-ACKs comprised in the second bit block have a same priority.

In one embodiment, all HARQ-ACKs comprised in the second bit block have a same service type.

In one embodiment, the second bit block only comprises an HARQ-ACK.

In one embodiment, the second bit block comprises indication information of whether the second signaling is correctly received.

In one embodiment, the second bit block comprises indication information of whether a bit block scheduled by the second signaling is correctly received.

Embodiment 6A

Embodiment 6A illustrates a schematic diagram of judging whether a target time-frequency-resource block is a first time-frequency-resource block or a second time-frequency-resource block according to one embodiment of the present disclosure, as shown in FIG. 6A.

In Embodiment 6A, the first node in the present disclosure judges whether a number of resources used to transmit a first-type HARQ-ACK in a first time-frequency-resource block is equal to 0 or greater than 0 in step S61A; if a result of a judgment is equal to 0, then determines that a target time-frequency-resource block is a first time-frequency-resource block in step S62A; if a result of a judgment is greater than 0, then determines that a target time-frequency-resource block is a second time-frequency-resource block in step S63A.

In one embodiment, the phrase that a number of resources used to transmit the first-type HARQ-ACK in the first time-frequency-resource block is equal to 0 includes: the first time-frequency-resource block comprises a PUSCH; the PUSCH comprised in the first time-frequency-resource block is not used to transmit the first-type HARQ-ACK.

In one embodiment, the phrase that a number of resources used to transmit the first-type HARQ-ACK in the first time-frequency-resource block is greater than 0 includes: the first time-frequency-resource block comprises a PUSCH; the PUSCH comprised in the first time-frequency-resource block is used to transmit the first-type HARQ-ACK.

In one embodiment, the phrase that a number of resources used to transmit the first-type HARQ-ACK in the first time-frequency-resource block is equal to 0 includes: the first time-frequency-resource block is not used to transmit the first-type HARQ-ACK.

In one embodiment, the phrase that a number of resources used to transmit the first-type HARQ-ACK in the first time-frequency-resource block is greater than 0 includes: the first time-frequency-resource block is used to transmit the first-type HARQ-ACK.

In one embodiment, when the first time-frequency-resource block is not used to transmit the first-type HARQ-ACK, the target time-frequency-resource block is the first time-frequency-resource block; when the first time-frequency-resource block is used to transmit the first-type HARQ-ACK, the target time-frequency-resource block is the second time-frequency-resource block.

In one embodiment, the phrase that the first time-frequency-resource block is used to transmit the first-type HARQ-ACK includes: a modulation symbol generated by a bit block comprising the first-type HARQ-ACK is mapped into part or all of time-frequency resources in the first time-frequency resources in the first time-frequency-resource block.

In one embodiment, the phrase that the first time-frequency-resource block is used to transmit the first-type HARQ-ACK includes: a signal transmitted in the first time-frequency-resource block carries a bit block comprising the first-type HARQ-ACK.

In one embodiment, the phrase that the first time-frequency-resource block is used to transmit the first-type HARQ-ACK includes: the first node performs a judgment or a calculation to determine that a signal transmitted in the first time-frequency-resource block carries a bit block comprising the first-type HARQ-ACK.

In one embodiment, the phrase that a signal transmitted in the first time-frequency-resource block carries a bit block comprising the first-type HARQ-ACK includes: the signal transmitted in the first time-frequency-resource block comprises an output after all or part of bits in a bit block in the first-type HARQ-ACK sequentially through part or all of CRC Insertion, Segmentation, Code Block-level CRC Insertion, Channel Coding, Rate Matching, Concatenation, Scrambling, Modulation, Layer Mapping, Precoding, Mapping to REs, Multicarrier symbol Generation and Modulation and Upconversion.

In one embodiment, the first bit block comprises at least one bit; the at least one bit in the first bit block indicates whether the first signaling is correctly received or not.

In one embodiment, the phrase that the first time-frequency-resource block is not used to transmit the first-type HARQ-ACK includes: the first node performs a judgment or a calculation to determine that a signal transmitted in the first time-frequency-resource block does not carry the first-type HARQ-ACK.

In one embodiment, the phrase that the first time-frequency-resource block is not used to transmit the first-type HARQ-ACK includes: the first node performs a judgment or a calculation to determine that a signal transmitted in the first time-frequency-resource block does not carry any bit block comprising the first-type HARQ-ACK.

In one embodiment, the phrase that the first time-frequency-resource block is not used to transmit the first-type HARQ-ACK includes: a signal transmitted in the first time-frequency-resource block does not carry the first-type HARQ-ACK.

In one embodiment, the phrase that the first time-frequency-resource block is not used to transmit the first-type HARQ-ACK includes: a signal transmitted in the first time-frequency-resource block does not carry any bit block comprising the first-type HARQ-ACK.

In one embodiment, the phrase that the first time-frequency-resource block is not used to transmit the first-type HARQ-ACK includes: any time-frequency resource in the first time-frequency-resource block is not used to bear any modulation symbol generated by a bit block comprising the first-type HARQ-ACK.

In one embodiment, when the first time-frequency-resource block is not used to transmit the first-type HARQ-ACK, the target time-frequency-resource block is the first time-frequency-resource block; when the first time-frequency-resource block is used to transmit the first-type HARQ-ACK, a first number is used to determine whether the target time-frequency-resource block is the first time-frequency-resource block or the second time-frequency-resource block.

In one embodiment, the first time-frequency-resource block is used to transmit the first-type HARQ-ACK; when the first number is not greater than a first threshold, the target time-frequency-resource block is the first time-frequency-resource block; when the first number is greater than a first threshold, the target time-frequency-resource block is the second time-frequency-resource block.

In one embodiment, the first number is equal to a number of bits of the transmitted second-type HARQ-ACK determined by the first node performing a calculation.

In one embodiment, the first bit block is used to determine the first number.

In one embodiment, a number of bits comprised in the first bit block or a number of bits comprised in a bit block generated by the first bit block is used to determine the first number.

In one embodiment, a number of bits comprised in the first bit block or a number of bits comprised in a bit block generated by the first bit block is used to perform a calculation to obtain the first number.

In one embodiment, the first threshold is a positive integer.

In one embodiment, the first threshold is related to a number of bits of the first-type HARQ-ACK transmitted in the first time-frequency-resource block.

In one embodiment, the first threshold is equal to a value minus a number of bits of the first-type HARQ-ACK transmitted in the first time-frequency-resource block.

In one subembodiment of the above embodiment, the value is a positive integer.

In one subembodiment of the above embodiment, the value is configured by a higher layer.

In one subembodiment of the above embodiment, the value is calculated by the first node.

In one embodiment, the first threshold is equal to a largest one between a first intermediate number and 0; the first intermediate value is equal to a value minus a number of bits of the first-type HARQ-ACK transmitted in the first time-frequency-resource block.

In one subembodiment of the above embodiment, the value is a positive integer.

In one subembodiment of the above embodiment, the value is configured by a higher layer.

In one subembodiment of the above embodiment, the value is calculated by the first node.

In one embodiment, when a number of resources used to transmit the first-type HARQ-ACK in the first time-frequency-resource block is equal to 0, the target time-frequency-resource block is the second time-frequency-resource block; when the number of resources used to transmit the first-type HARQ-ACK in the first time-frequency-resource block is greater than 0, the target time-frequency-resource block is the first time-frequency-resource block.

Embodiment 6B

Embodiment 6B illustrates a schematic diagram of judging whether a second sub-signal carries a bit block generated by a second bit block according to one embodiment of the present disclosure, as shown in FIG. 6B.

In Embodiment 6B, the first node in the present disclosure judges whether conditions of a first target index being a first index and a second target index being a second index are true in step S61B; if yes, moves to step S62B, determines that a second sub-signal does not early a bit block generated by a second bit block; otherwise, moves to step S63B, determines that a second sub-signal carries a bit block generated by a second bit block.

In Embodiment 6B, the first index is different from the second index.

In one embodiment, when the first target index is not the first index, the first target index is the second index.

In one embodiment, when the second target index is not the second index, the second target index is the first index.

In one embodiment, the first target index is only one of the first index or the second index.

In one embodiment, the second target index is only one of the first index or the second index.

In one embodiment, the first target index is an index in a first index set; and the first index set comprises the first index and the second index.

In one embodiment, the second target index is an index in a first index set; and the first index set comprises the first index and the second index.

In one embodiment, the first index set only comprises the first index and the second index.

In one embodiment, the first index set also comprises an index other than the first index and the second index.

In one embodiment, the first index and the second index are respectively different priority indexes.

In one embodiment, the first index and the second index are respectively priority index 1 andnd priority index 0.

In one embodiment, the first index and the second index are respectively priority index 0 and priority index 1.

In one embodiment, the first index and the second index are respectively different positive integers.

In one embodiment, the first index and the second index are respectively indexes used to indicate different priorities.

In one embodiment, the first index indicates one of multiple different priorities, and the second index indicates another one of the multiple different priorities.

In one embodiment, the first index indicates one of a high priority and a low priority, and the second index indicates one of a high priority and a low priority.

In one embodiment, the first index and the second index are indexes used to indicate different service types respectively.

In one embodiment, the first index indicates one of multiple different service types, and the second index indicates another one of the multiple different service types.

In one embodiment, both the first index and the second index are positive integers; and the first index is greater than the second index.

In one embodiment, both the first index and the second index are positive integers; and the first index is less than the second index.

In one embodiment, the first index is a positive integer.

In one embodiment, the first index is equal to 0.

In one embodiment, the first index is equal to 1.

In one embodiment, the second index is a positive integer.

In one embodiment, the second index is equal to 0.

In one embodiment, the second index is equal to 1.

In one embodiment, the second bit block comprises an HARQ-ACK; the first target index is the first index and the second target index is the second index; and the second sub-signal does not carry any HARQ-ACK information.

In one embodiment, the first target index is the first index and the second target index is the second index; and the second sub-signal does not carry any bit block generated by the second bit block.

In one embodiment, the phrase that the second sub-signal does not carry any bit block generated by the second bit block includes: the second sub-signal does not carry any bit related to the second bit block.

In one embodiment, the phrase that the second sub-signal does not carry any bit block generated by the second bit block includes: the second bit block comprises an HARQ-ACK; and the second sub-signal does not carry any bit related to an HARQ-ACK comprised in the second bit block.

In one embodiment, when the first target index is the first index and the second target index is the second index, the second sub-signal carries a bit block generated by the second bit block; when the first target index is not the first index or the second target index is not the second index, the second sub-signal does not carry a bit block generated by the second bit block.

In one embodiment, when the first target index is the first index and the second target index is the first index, the second sub-signal does not carry a bit block generated by the second bit block; when the first target index is not the first index or the second target index is not the first index, the second sub-signal carries a bit block generated by the second bit block.

In one embodiment, when the first target index is the first index and the second target index is the first index, the second sub-signal carries a bit block generated by the second bit block; when the first target index is not the first index or the second target index is not the first index, the second sub-signal does not carry a bit block generated by the second bit block.

In one embodiment, when the first target index is the same as the second target index, the second sub-signal does not carry a bit block generated by the second bit block; when the first target index is different from the second target index, the second sub-signal carries a bit block generated by the second bit block.

In one embodiment, when the first target index is different from the second target index, the second sub-signal does not carry a bit block generated by the second bit block; and when the first target index is the same as the second target index, the second sub-signal carries a bit block generated by the second bit block.

In one embodiment, the second sub-signal carries a bit block generated by the second bit block; the second sub-signal comprises an output after all or part of bits in the bit block generated by the second bit block sequentially through part or all of CRC Insertion, Segmentation, Code Block-level CRC Insertion, Channel Coding, Rate Matching, Concatenation, Scrambling, Modulation, Layer Mapping, Precoding, Mapping to REs, Multicarrier symbol Generation and Modulation and Upconversion.

In one embodiment, the second sub-signal carries a bit block generated by the second bit block; the bit block generated by the second bit block comprises all or part of bits in a bit block of an output of all or part of bits in the second bit block after a first procedure; the first procedure comprises part or all of CRC Insertion, segmentation, code-block level CRC Insertion, channel coding, rate matching, concatenation and scrambling.

In one embodiment, the second sub-signal carries a bit block generated by the second bit block; the bit block generated by the second bit block comprises at least one bit obtained by a bit related to the second bit block through channel coding-related operation.

Embodiment 7A

Embodiment 7A illustrates a schematic diagram of judging whether a target time-frequency-resource block is a first time-frequency-resource block or a second time-frequency-resource block according to another embodiment of the present disclosure, as shown in FIG. 7A.

In Embodiment 7A, the first node in the present disclosure judges whether a number of resources used to transmit the first-type HARQ-ACK in a first time-frequency-resource block is greater than a first value in step S71; if a result of a judgment is no, then determines that a target time-frequency-resource block is a first time-frequency-resource block in step S72; if a result of a judgment is yes, then determines that a target time-frequency-resource block is a second time-frequency-resource block in step S73.

In one embodiment, the phrase that a number of resources used to transmit the first-type HARQ-ACK in the first time-frequency-resource block is not greater than a first value includes: the first time-frequency-resource block comprises a PUSCH; the number of resources used to transmit the first-type HARQ-ACK in the PUSCH comprised in the first time-frequency-resource block is not greater than the first value.

In one embodiment, the phrase that the number of resources used to transmit the first-type HARQ-ACK in the first time-frequency-resource block is greater than the first value includes: the first time-frequency-resource block comprises a PUSCH; the number of resources used to transmit the first-type HARQ-ACK in the PUSCH comprised in the first time-frequency-resource block is greater than the first value.

In one embodiment, a magnitude relation between the number of resources used to transmit the first-type HARQ-ACK in the first time-frequency-resource block and a first value is used to determine whether the target time-frequency-resource block is the first time-frequency-resource block or the second time-frequency-resource block; the first value is greater than 0.

In one embodiment, the first value is a positive integer.

In one embodiment, the first value is configured on the physical layer.

In one embodiment, the first value is configured on a higher layer.

In one embodiment, the first value is configured on a MAC layer.

In one embodiment, the first value is configured on an RRC layer.

In one embodiment, the phrase that a number of resources used to transmit the first-type HARQ-ACK in the first time-frequency-resource block is not greater than a first value includes: the first time-frequency-resource block is not used to transmit the first-type HARQ-ACK, or, the first time-frequency-resource block is used to transmit the first-type HARQ-ACK and the number of resources used to transmit the first-type HARQ-ACK in the first time-frequency-resource block is not greater than the first value.

In one embodiment, the phrase that a number of resources used to transmit the first-type HARQ-ACK in the first time-frequency-resource block is not greater than a first value includes: the number of resources used to transmit the first-type HARQ-ACK in the first time-frequency-resource block is equal to 0 or equal to a value not greater than the first value.

In one embodiment, the phrase that a number of resources used to transmit the first-type HARQ-ACK in the first time-frequency-resource block is not greater than a first value includes: the first node performs a judgment or a calculation to determine: the first time-frequency-resource block is not used to transmit the first-type HARQ-ACK, or, the first time-frequency-resource block is used to transmit the first-type HARQ-ACK and the number of resources used to transmit the first-type HARQ-ACK in the first time-frequency-resource block is not greater than the first value.

In one embodiment, the phrase that a number of resources used to transmit the first-type HARQ-ACK in the first time-frequency-resource block is not greater than a first value includes: the first node performs a judgment or a calculation to determine: the number of resources used to transmit the first-type HARQ-ACK in the first time-frequency-resource block is equal to 0 or equal to a value not greater than the first value.

In one embodiment, the phrase that the number of resources used to transmit the first-type HARQ-ACK in the first time-frequency-resource block is greater than the first value includes: the first node performs a judgment or a calculation to determine that a signal transmitted in the first time-frequency-resource block carries a bit block comprising the first-type HARQ-ACK; the first node performs a judgment or a calculation to determine that the number of resources used to transmit the first-type HARQ-ACK in the first time-frequency-resource block is greater than the first value.

In one embodiment, a first parameter is used to determine the first value.

In one embodiment, the first node performs a calculation to obtain the first value.

In one embodiment, the first value is equal to a value rounded up to an integer; and the value is linearly related to the first parameter.

In one embodiment, the first value is equal to a value rounded up to an integer then minus 1; and the value is linearly related to the first parameter.

In one embodiment, the first value is less than a value rounded up to an integer; and the value is linearly related to the first parameter.

In one embodiment, the first parameter is configured on the physical layer.

In one embodiment, the first parameter is configured on a higher layer.

In one embodiment, the first parameter is configured on a MAC layer.

In one embodiment, the first parameter is configured on an RRC layer.

In one embodiment, the first parameter is a scaling parameter or a scalingForDCI-Format0-2r16 parameter; and the specific definitions of the scaling parameter and the scalingForDCI-Format0-2r16 parameter can be found in TS38.331, section 6. 3. 2.

In one embodiment, the first parameter is a parameter used to limit a number of resources used to transmit the second-type HARQ-ACK in the first time-frequency-resource block.

In one embodiment, the first parameter is a parameter used to limit a number of resources used to transmit the first-type HARQ-ACK in the first time-frequency-resource block.

In one embodiment, the first value is related to the second-type HARQ-ACK.

In one embodiment, the first parameter corresponds to the second index.

In one embodiment, the first bit block is used to determine the first value.

In one embodiment, a number of bits comprised in the first bit block or a number of bits comprised in a bit block generated by the first bit block is used to determine the first value.

In one embodiment, a number of bits comprised in the first bit block or a number of bits comprised in a bit block generated by the first bit block is used to perform a calculation to obtain the first value.

In one embodiment, when a second intermediate number minus a third intermediate number is greater than 0, the first value is equal to the second intermediate number minus the third intermediate number; when the second intermediate number minus the third intermediate number is not greater than 0, the first value is equal to 0; both the second intermediate number and the third intermediate number are positive integers.

In one subembodiment of the above embodiment, a second parameter is used to determine the second intermediate number; the second parameter is a scaling parameter or a scalingForDCI-Format0-2r16 parameter; and the specific definitions of the scaling parameter and the scalingForDCI-Format0-2r16 parameter can be found in TS38.331, section 6. 3. 2.

In one subembodiment of the above embodiment, a second parameter is used to determine the second intermediate number; the second parameter is a parameter used to limit a number of resources used to transmit the second-type HARQ-ACK in the first time-frequency-resource block.

In one subembodiment of the above embodiment, a second parameter is used to determine the second intermediate number; the second parameter is a parameter used to limit a number of resources used to transmit the first-type HARQ-ACK in the first time-frequency-resource block.

In one subembodiment of the above embodiment, the second intermediate number is equal to a value rounded up to an integer; and the value is linearly related to the second parameter.

In one subembodiment of the above embodiment, the third intermediate value is related to the second-type HARQ-ACK.

In one subembodiment of the above embodiment, the first bit block is used to determine the third intermediate number.

In one subembodiment of the above embodiment, a number of bits comprised in the first bit block or a number of bits comprised in a bit block generated by the first bit block is used to determine the third intermediate number.

In one subembodiment of the above embodiment, a number of bits comprised in the first bit block or a number of bits comprised in a bit block generated by the first bit block is used to perform a calculation to obtain the third intermediate number.

In one subembodiment of the above embodiment, the third intermediate number is equal to another value rounded up to an integer; the another value is linearly related to a number of bits comprised in the first bit block or a number of bits comprised in a bit block generated by the first bit block.

In one embodiment, when a number of resources used to transmit the first-type HARQ-ACK in the first time-frequency-resource block is not greater than a first value or greater than a second value, the target time-frequency-resource block is the first time-frequency-resource block; when the number of resources used to transmit the first-type HARQ-ACK in the first time-frequency-resource block is greater than the first value and not greater than the second value, the target time-frequency-resource block is the second time-frequency-resource block; the first value is greater than 0; and the second value is greater than the first value.

In one embodiment, when a number of resources used to transmit the first-type HARQ-ACK in the first time-frequency-resource block is equal to 0 or greater than a second value, the target time-frequency-resource block is the first time-frequency-resource block; when the number of resources used to transmit the first-type HARQ-ACK in the first time-frequency-resource block is greater than 0 and not greater than the second value, the target time-frequency-resource block is the second time-frequency-resource block; and the second value is greater than 0.

In one embodiment, the first bit block is used to determine the second value.

In one embodiment, a number of bits comprised in the first bit block or a number of bits comprised in a bit block generated by the first bit block is used to determine the second value.

In one embodiment, a number of bits comprised in the first bit block or a number of bits comprised in a bit block generated by the first bit block is used to perform a calculation to obtain the second value.

Embodiment 7B

Embodiment 7B illustrates a schematic diagram of transmission resources occupied by a first sub-signal and transmission resources occupied by a second sub-signal according to one embodiment of the present disclosure, as shown in FIG. 7B. In FIG. 7B, the reticle part represents time-frequency resources occupied by a first sub-signal on a first transmission layer, and the grey part represents time-frequency resources occupied by a second sub-signal on a second transmission layer.

In Embodiment 7B, the first signal in the present disclosure is mapped onto multiple transmission layers; the multiple transmission layers comprises a first transmission layer and a second transmission layer, and the first transmission layer is different from the second transmission layer; a first sub-signal comprises a part of the first signal mapped onto the first transmission layer; a second sub-signal comprises a part of the first signal mapped onto the second transmission layer; the first sub-signal and the second sub-signal occupy same time-frequency resources.

In one embodiment, the first sub-signal and the second sub-signal occupies same time-domain resources.

In one embodiment, the first sub-signal and the second sub-signal occupies same frequency-domain resources.

In one embodiment, the first signal is mapped onto at least one transmission layer.

In one embodiment, the at least one transmission layer is used to transmit one or more TBs.

In one embodiment, the first signal is mapped onto at least one transmission layer; the first sub-signal comprises part of one of the at least one transmission layer onto which the first signal is mapped; the second sub-signal comprises another part of the one of the at least one transmission layer onto which the first signal is mapped.

In one embodiment, the phrase that the first sub-signal comprises a part of the first signal mapped onto the first transmission layer includes: the first sub-signal comprises all of signals mapped onto the first transmission layer in the first signal.

In one embodiment, the phrase that the second sub-signal comprises a part of the first signal mapped onto the second transmission layer includes: the second sub-signal comprises all of signals mapped onto the second transmission layer in the first signal.

In one embodiment, the first transmission layer is used to transmit a TB; and the second transmission layer is used to transmit another TB.

In one embodiment, the first transmission layer is used to transmit a first CBG set; the second transmission layer is used to transmit a second CBG set; the first CBG set and the second CBG set respectively comprise at least one CBG; and the first CBG set is different from the second CBG set.

In one embodiment, the first sub-signal carries a TB; the second sub-signal carries another TB.

In one embodiment, the first sub-signal carries a first CBG set; the second sub-signal carries a second CBG set; the first CBG set and the second CBG set respectively comprise at least one CBG; and the first CBG set is different from the second CBG set.

In one embodiment, the first sub-signal and the second sub-signal occupies same time-frequency resources; and the first sub-signal and the second sub-signal occupy different transmission-layer resources.

In one embodiment, the first sub-signal does not comprise any signal comprised in the second sub-signal.

In one embodiment, the second sub-signal does not comprise any signal comprised in the first sub-signal.

Embodiment 8A

Figure 8A:
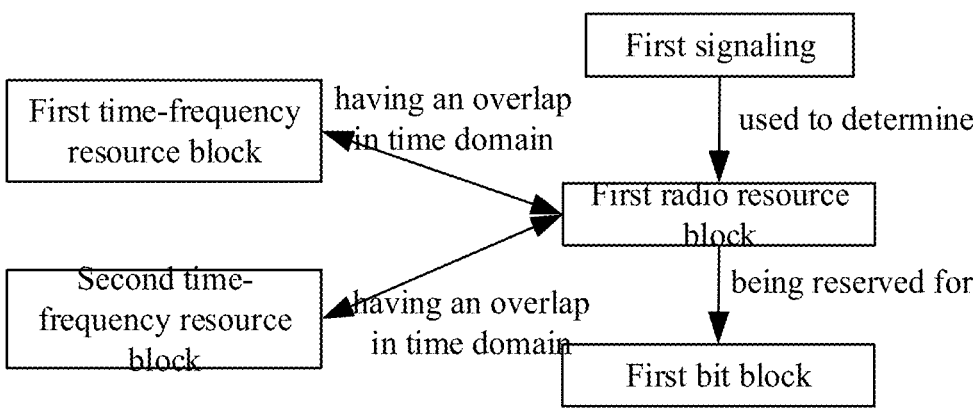
FIG. 8A illustrates a schematic diagram of relations among a first signaling, a first radio resource block, a first bit block, a first time-frequency-resource block and a second time-frequency-resource block according to one embodiment of the present disclosure.

Embodiment 8A illustrates a schematic diagram of relations among a first signaling, a first radio resource block, a first bit block, a first time-frequency-resource block and a second time-frequency-resource block according to one embodiment of the present disclosure, as shown in FIG. 8A.

In Embodiment 8A, a first signaling is used to determine a first radio resource block; the first radio resource block is reserved for a first bit block; the first radio resource block overlaps with a first time-frequency-resource block in time domain; and the first radio resource block overlaps with a second time-frequency-resource block in time domain In one embodiment, the first radio resource block comprises at least one RE.

In one embodiment, the first radio resource block comprises at least one sub-carrier symbol in frequency domain.

In one embodiment, the first radio resource block comprises at least one PRB in frequency domain In one embodiment, the first radio resource block comprises at least one RB in frequency domain.

In one embodiment, the first radio resource block comprises at least one multi-carrier symbol in time domain In one embodiment, the first radio resource block comprises at least one slot in time domain In one embodiment, the first radio resource block comprises at least one sub-slot in time domain In one embodiment, the first radio resource block comprises at least one ms in time domain In one embodiment, the first radio resource block comprises at least one inconsecutive slot in time domain In one embodiment, the first radio resource block comprises at least one consecutive slot in time domain.

In one embodiment, the first radio resource block comprises at least one subframe in time domain.

In one embodiment, the first radio resource block is configured by a higher-layer signaling.

In one embodiment, the first radio resource block is configured by an RRC signaling.

In one embodiment, the first radio resource block is configured by a MAC CE signaling.

In one embodiment, the first radio resource block comprises a PUCCH.

In one embodiment, the first signaling indicates the first radio resource block.

In one embodiment, a first radio resource block set comprises multiple radio resource blocks; the first radio resource block is a radio resource block in the first radio resource block set; and the first signaling indicates the first radio resource bock out of the first radio resource block set.

In one embodiment, N value ranges respectively correspond to N radio resource block sets; a first value range is one of the N value ranges; a first radio resource block set is one of the N radio resource block sets corresponding to the first value range; a number of bits comprised in the first bit block is equal to a value in the first value range; and the first signaling indicates the first radio resource bock out of the first radio resource block set.

In one embodiment, the first radio resource block overlaps with the first time-frequency-resource block in time domain on at least one multi-carrier symbol.

In one embodiment, the first radio resource block overlaps with the second time-frequency-resource block in time domain on at least one multi-carrier symbol.

In one embodiment, the first time-frequency-resource block does not overlap with the second time-frequency-resource block in frequency domain In one embodiment, the first signaling indicates time-domain resources occupied by the first radio resource block.

In one embodiment, the first signaling indicates frequency-domain resources occupied by the first radio resource block.

In one embodiment, the first signaling explicitly indicates the first radio resource block.

In one embodiment, the first signaling implicitly indicates the first radio resource block.

In one embodiment, one or more fields in the first signaling indicates the first radio resource block.

Embodiment 8B

Figure 8B:
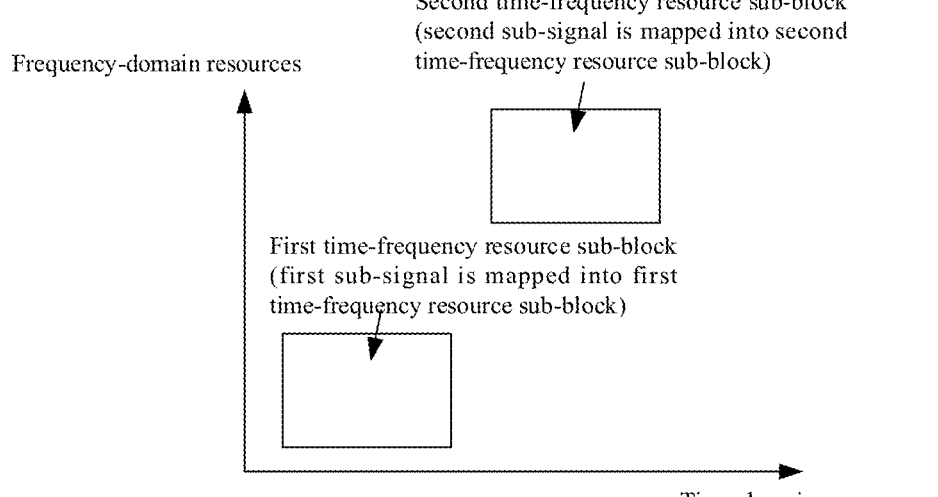
FIG. 8B illustrates a schematic diagram of a relation between a first time-frequency resource sub-block and a second time-frequency resource sub-block according to one embodiment of the present disclosure.

Embodiment 8B illustrates a schematic diagram of relations among a second signaling, a first radio resource block, a first signaling, a radio resource block and a second time-frequency-resource block according to one embodiment of the present disclosure, as shown in FIG. 8B. In FIG. 8B, two boxes respectively represent a first time-frequency resource sub-block and a second time-frequency resource sub-block.

In Embodiment 8B, a first time-frequency resource sub-block does not overlap a second time-frequency resource sub-block; a first sub-signal is mapped into the first time-frequency resource sub-block; and a second sub-signal is mapped into the second time-frequency resource sub-block.

In Embodiment 8B, the first signal in the present disclosure comprises the first sub-signal and the second sub-signal; the first time-frequency-resource block in the present disclosure comprises the first time-frequency resource sub-block and the second time-frequency resource sub-block.

In one embodiment, the first time-frequency resource sub-block comprises at least one RE.

In one embodiment, the second time-frequency resource sub-block comprises at least one RE.

In one embodiment, the second time-frequency resource sub-block comprises at least one sub-carrier symbol in frequency domain In one embodiment, the second time-frequency resource sub-block comprises at least one PRB in frequency domain.

In one embodiment, the second time-frequency resource sub-block comprises at least one RB in frequency domain.

In one embodiment, the second time-frequency resource sub-block comprises at least one multi-carrier symbol in time domain.

In one embodiment, the second time-frequency resource sub-block comprises at least one slot in time domain.

In one embodiment, the second time-frequency resource sub-block comprises at least one sub-slot in time domain In one embodiment, the second time-frequency resource sub-block comprises at least one ms in time domain In one embodiment, the second time-frequency resource sub-block comprises at least one inconsecutive slot in time domain In one embodiment, the second time-frequency resource sub-block comprises at least one consecutive slot in time domain In one embodiment, the second time-frequency resource sub-block comprises at least one subframe in time domain In one embodiment, the first time-frequency resource sub-block comprises at least one sub-carrier symbol in frequency domain In one embodiment, the first time-frequency resource sub-block comprises at least one PRB in frequency domain.

In one embodiment, the first time-frequency resource sub-block comprises at least one RB in frequency domain In one embodiment, the first time-frequency resource sub-block comprises at least one multi-carrier symbol in time domain In one embodiment, the first time-frequency resource sub-block comprises at least one slot in time domain.

In one embodiment, the first time-frequency resource sub-block comprises at least one sub-slot in time domain.

In one embodiment, the first time-frequency resource sub-block comprises at least one ms in time domain.

In one embodiment, the first time-frequency resource sub-block comprises at least one inconsecutive slot in time domain In one embodiment, the first time-frequency resource sub-block comprises at least one consecutive slot in time domain In one embodiment, the first time-frequency resource sub-block comprises at least one subframe in time domain In one embodiment, the phrase that the first sub-signal comprises a part of the first signal mapped into the first time-frequency resource sub-block in the present disclosure includes: the first sub-signal comprises all of the first signal mapped into the first time-frequency resource sub-block.

In one embodiment, the phrase that the second sub-signal comprises a part of the first signal mapped into the second time-frequency resource sub-block in the present disclosure includes: the second sub-signal comprises all of the first signal mapped into the second time-frequency resource sub-block.

In one embodiment, the phrase that the first time-frequency resource sub-block do not overlap with the second time-frequency resource sub-block in the present disclosure includes: the first time-frequency resource sub-block does not overlap with the second time-frequency resource sub-block in time domain; the first time-frequency resource sub-block and the second time-frequency resource sub-block occupy same frequency-domain resources.

In one embodiment, the phrase that the first time-frequency resource sub-block do not overlap with the second time-frequency resource sub-block in the present disclosure includes: the first time-frequency resource sub-block does not overlap with the second time-frequency resource sub-block in frequency domain; and the first time-frequency resource sub-block and the second time-frequency resource sub-block occupy same time-domain resources.

In one embodiment, the phrase that the first time-frequency resource sub-block does not overlap with the second time-frequency resource sub-block in the present disclosure includes: the first time-frequency resource sub-block does not overlap with the second time-frequency resource sub-block in frequency domain, or, the first time-frequency resource sub-block does not overlap with the second time-frequency resource sub-block in time domain.

In one embodiment, the first time-frequency-resource block comprises a first time-frequency resource sub-block and a second time-frequency-resource block; the first time-frequency resource sub-block does not overlap with the second time-frequency resource sub-block; the first sub-signal only comprises a part of the first signal mapped into the first time-frequency resource sub-block; the second sub-signal only comprises a part of the first signal mapped into the second time-frequency resource sub-block.

In one embodiment, the first time-frequency resource sub-block comprises part of time-frequency resources in the first time-frequency-resource block; and the second time-frequency resource sub-block comprises another part of time-frequency resources in the first time-frequency-resource block.

In one embodiment, the first time-frequency resource sub-block comprises K1 RE(s) in the first time-frequency-resource block; the second time-frequency resource sub-block comprises K2 the RE(s) other than the K1 RE(s) in the first time-frequency-resource block; both the K1 and the K2 are greater than 0.

In one embodiment, the K1 is equal to 1.

In one embodiment, the K2 is equal to 1.

In one embodiment, the K1 is greater than 1.

In one embodiment, the K2 is greater than 1.

In one embodiment, the first signal is mapped onto multiple transmission layers; the multiple transmission layers comprises a first transmission layer and a second transmission layer, and the first transmission layer is different from the second transmission layer; the first signal is mapped onto a first time-frequency resource sub-block and a second time-frequency-resource sub-block; the first time-frequency resource sub-block does not overlap with the second time-frequency resource sub-block; the first sub-signal comprises a part of the first signal mapped onto the first transmission layer in the first time-frequency resource sub-block; the second sub-signal comprises a part of the first signal mapped onto the second transmission layer in the second time-frequency resource sub-block.

In one subembodiment of the above embodiment, a signal in the first signal mapped onto the first transmission layer in the second time-frequency resource sub-block does not carry any bit block generated by the second bit block.

In one embodiment, the first time-frequency-resource block comprises the first time-frequency resource sub-block and the second time-frequency-resource block.

In one embodiment, the first signal is mapped onto multiple transmission layers; the multiple transmission layers comprises a first transmission layer and a second transmission layer, and the first transmission layer is different from the second transmission layer; the first signal is mapped onto multiple time-domain units; the multiple time-domain units comprises a first time-domain unit and a second time-domain unit, and the first time-domain unit does not overlap with the second time-domain unit in time domain; the first sub-signal comprises a part of the first signal mapped onto the first transmission layer in the first time-domain unit; and the second sub-signal comprises a part of the first signal mapped onto the second transmission layer in the second time-domain unit.

In one subembodiment of the above embodiment, a part of the first signal mapped onto the first transmission layer in the second time-domain unit does not carry any bit block generated by the second bit block.

In one embodiment, the first time-frequency-resource block comprises the first time-domain unit and the second time-domain unit in time domain In one embodiment, the multiple time-domain units comprises multiple slots.

In one embodiment, the multiple time-domain units comprises multiple sub-slots.

In one embodiment, the multiple time-domain units comprises multiple sub-frames.

In one embodiment, the multiple time-domain units comprises multiple ms.

In one embodiment, the first time-domain unit comprises a slot.

In one embodiment, the first time-domain unit comprises a sub-slot.

In one embodiment, the first time-domain unit comprises a subframe.

In one embodiment, the first time-domain unit comprises an ms.

In one embodiment, the second time-domain unit comprises a slot.

In one embodiment, the second time-domain unit comprises a sub-slot.

In one embodiment, the second time-domain unit comprises a subframe.

In one embodiment, the second time-domain unit comprises an ms.

Embodiment 9A

Figure 9A:
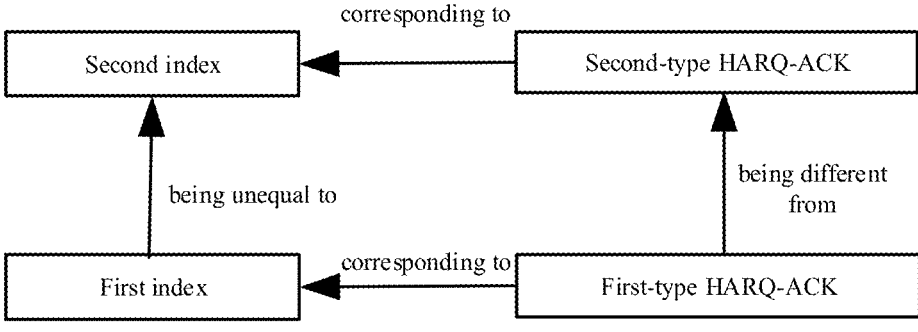
FIG. 9A illustrates a schematic diagram of relations among a first index, a first-type HARQ-ACK, a second index and a second-type HARQ-ACK according to one embodiment of the present disclosure.

Embodiment 9A illustrates a schematic diagram of relations among a first index, a first-type HARQ-ACK, a second index and a second-type HARQ-ACK according to one embodiment of the present disclosure, as shown in FIG. 9A.

In Embodiment 9A, the first-type HARQ-ACK corresponds to a first index; a second-type HARQ-ACK corresponds to a second index; the first index is not equal to the second index; and the first-type HARQ-ACK is different from the second-type HARQ-ACK.

In one embodiment, the first-type HARQ-ACK and the second-type HARQ-ACK are respectively HARQ-ACKs with different types.

In one embodiment, the first-type HARQ-ACK is different from the second-type HARQ-ACK.

In one embodiment, a priority index corresponding to the first-type HARQ-ACK and a priority index corresponding to the second-type HARQ-ACK are respectively equal to 1 and 0.

In one embodiment, a priority index corresponding to the first-type HARQ-ACK and a priority index corresponding to the second-type HARQ-ACK are respectively equal to 0 and 1.

In one embodiment, the first-type HARQ-ACK and the second-type HARQ-ACK are respectively HARQ-ACKs with different priorities.

In one embodiment, the different priorities are a high priority and a low priority respectively.

In one embodiment, the first-type HARQ-ACK and the second-type HARQ-ACK are respectively used for HARQ-ACKs with different service types.

In one embodiment, the different service types are URLLC and eMBB respectively.

In one embodiment, the different service types are respectively services on different links.

In one embodiment, the first-type HARQ-ACK and the second-type HARQ-ACK are respectively HARQ-ACKs corresponding to different QoS services.

In one embodiment, the first-type HARQ-ACK comprises indication information indicating whether a signaling of the first index is correctly received.

In one embodiment, the first-type HARQ-ACK comprises indication information of whether a first-type bit block is correctly received; a signaling indicating the first index comprises scheduling information of the first-type bit block.

In one embodiment, the first-type bit block comprises a TB.

In one embodiment, the first-type bit block comprises a CBG.

In one embodiment, the second-type HARQ-ACK comprises indication information indicating whether a signaling of the second index is correctly received.

In one embodiment, the second-type HARQ-ACK comprises indication information of whether a second-type bit block is correctly received; and a signaling indicating the second index comprises scheduling information of the second-type bit block.

In one embodiment, the second-type bit block comprises a TB.

In one embodiment, the second-type bit block comprises a CBG.

In one embodiment, the second-type bit block and first-type bit block are respectively bit blocks with different types.

In one embodiment, the second-type bit block and first-type bit block are respectively bit blocks with different priorities.

In one embodiment, the second-type bit block and first-type bit block are respectively bit blocks with different service types.

In one embodiment, the second-type bit block and first-type bit block are respectively bit blocks of different QoSs.

In one embodiment, the second-type bit block and first-type bit block are respectively a high-priority bit block and a low-priority bit block.

In one embodiment, the second-type bit block and first-type bit block are respectively a low-priority bit block and a high-priority bit block.

In one embodiment, the second-type bit block and first-type bit block are respectively a URLLC-service-type bit block and an eMBB-service-type bit block.

In one embodiment, the second-type bit block and first-type bit block are respectively an eMBB-service-type bit block and a URLLC-service-type bit block.

In one embodiment, the signaling indicating the first index comprises one or more fields in a piece of DCI.

In one embodiment, the signaling indicating the first index comprises one or more fields in an RRC layer signaling.

In one embodiment, the signaling indicating the first index comprises one or more fields in an IE.

In one embodiment, the signaling indicating the first index is DCI.

In one embodiment, the signaling indicating the first index is an RRC layer signaling.

In one embodiment, the signaling indicating the second index comprises one or more fields in a piece of DCI.

In one embodiment, the signaling indicating the second index comprises one or more fields in an RRC layer signaling.

In one embodiment, the signaling indicating the second index comprises one or more fields in an IE.

In one embodiment, the signaling indicating the second index is DCI.

In one embodiment, the signaling indicating the second index is an RRC layer signaling.

In one embodiment, the signaling indicating the first index indicates the first index.

In one embodiment, the signaling indicating the second index indicates the second index.

In one embodiment, the signaling indicating the first index explicitly indicates the first index.

In one embodiment, the signaling indicating the second index explicitly indicates the second index.

In one embodiment, the signaling indicating the first index implicitly indicates the first index.

In one embodiment, the signaling indicating the second index implicitly indicates the second index.

In one embodiment, a field of the signaling indicating the first index indicates the first index.

In one embodiment, a field of the signaling indicating the second index indicates the second index.

In one embodiment, the first signaling explicitly indicates the second index.

In one embodiment, the first signaling implicitly indicates the second index.

In one embodiment, a field in the first signaling indicates the second index.

In one embodiment, the implicitly indicating includes: it is indicated implicitly via a signaling format.

In one embodiment, the implicitly indicating includes: it is indicated implicitly via an RNTI.

Embodiment 9B

Figures 9B, 10A, 10B, 11A, 11B:
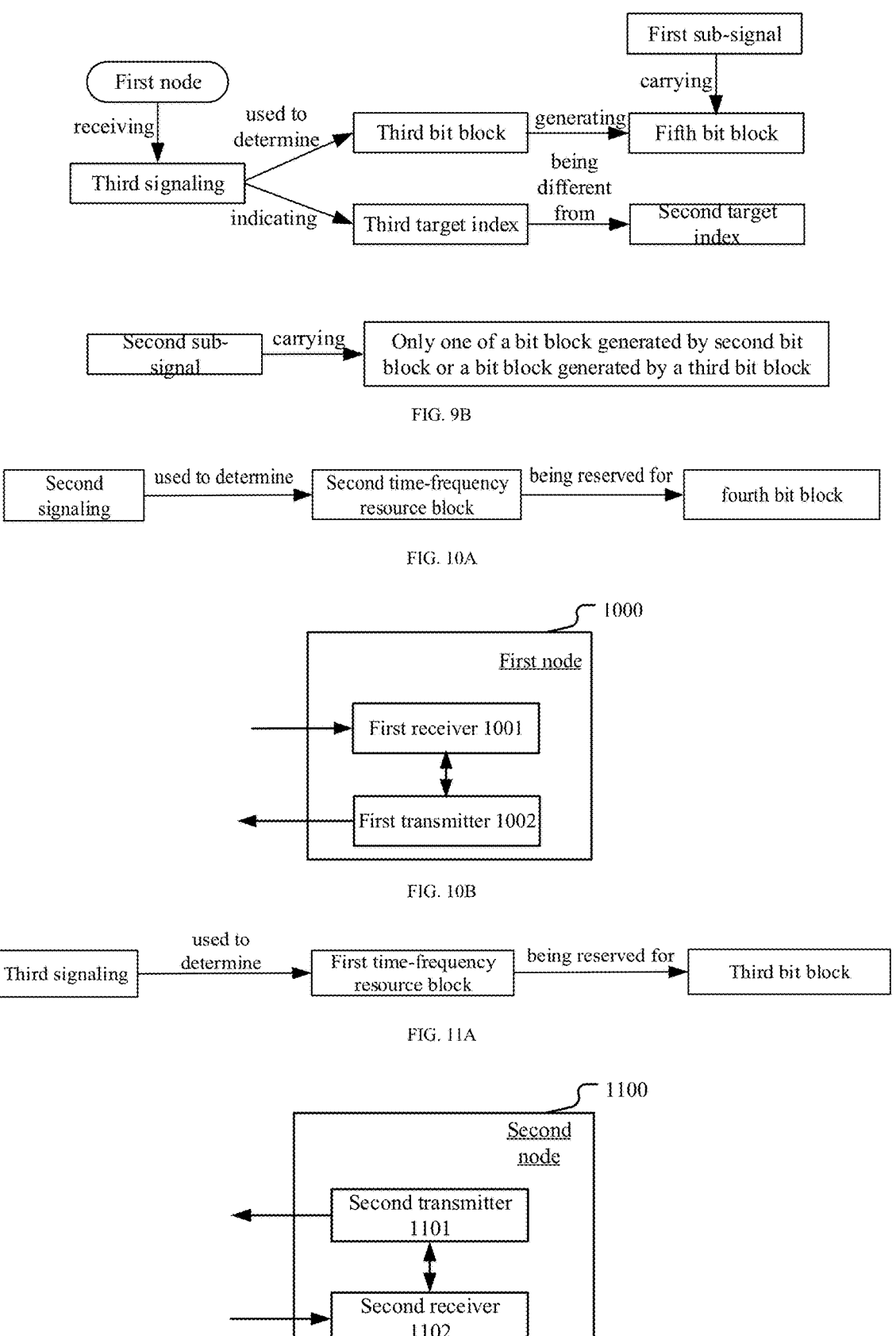
FIG. 9B illustrates a schematic diagram of relations among a first node, a third signaling, a third bit block, a fifth bit block, a third target index, a second target index, a first sub-signal, a second sub-signal and a second bit block according to one embodiment of the present disclosure.
FIG. 10A illustrates a schematic diagram of relations among a second signaling, a fourth bit block and a second time-frequency-resource block according to one embodiment of the present disclosure.
FIG. 10B illustrates a structure block diagram of a processing device in a first node according to one embodiment of the present disclosure.
FIG. 11A illustrates a schematic diagram of relations among a third signaling, a third bit block and a first time-frequency-resource block according to one embodiment of the present disclosure.
FIG. 11B illustrates a structure block diagram of a processing device in second node according to one embodiment of the present disclosure.

Embodiment 9B illustrates a schematic diagram of relations among a first node, a third signaling, a third bit block, a fifth bit block, a third target index, a second target index, a first sub-signal, a second sub-signal and a second bit block according to one embodiment of the present disclosure, as shown in FIG. 9B.

In Embodiment 9B, the first node in the present disclosure also receives a third signaling; the third signaling is used to determine a third bit block; the third signaling indicates a third target index, and a value of the third target index is different from a value of the second target index in the present disclosure; the first sub-signal in the present disclosure carries a fifth bit block, and the third bit block is used to generate the fifth bit block; the second sub-signal in the present disclosure carries only one of a bit block generated by the second bit block or a bit block generated by the third bit block in the present disclosure.

In one embodiment, the third signaling is an RRC layer signaling.

In one embodiment, the third signaling comprises one or more fields in an RRC-layer signaling.

In one embodiment, the third signaling is dynamically configured.

In one embodiment, the third signaling is a physical-layer signaling.

In one embodiment, the third signaling comprises a physical-layer signaling.

In one embodiment, the third signaling comprises a higher-layer signaling.

In one embodiment, the third signaling is DCI.

In one embodiment, the third signaling comprises one or more fields of DCI.

In one embodiment, the third signaling comprises one or more fields in an IE.

In one embodiment, the third signaling is a downlink scheduled signaling.

In one embodiment, the third signaling is transmitted on a downlink physical layer control channel (i.e., a downlink channel that can only be used for bearing a physical layer signaling).

In one embodiment, the third signaling is a signaling used to schedule a downlink physical layer data channel.

In one embodiment, the third signaling is DCI format 1_0, and the specific meaning of the DCI format 1_0 can be found in 3GPP TS38.212, chapter 7.3.1.2.

In one embodiment, the third signaling is DCI format 1_1, and the specific meaning of the DCI format 1_1 can be found in 3GPP TS38.212, chapter 7.3.1.2.

In one embodiment, the third signaling is DCI format 1_2, and the specific meaning of the DCI format 1_2 can be found in 3GPP TS38.212, chapter 7.3.1.2.

In one embodiment, the third signaling is a signaling used to schedule a downlink physical layer shared channel.

In one embodiment, the third signaling comprises scheduling information of a PDSCH.

In one embodiment, the third signaling indicates an SPS release.

In one embodiment, the third signaling is DCI format 0_0, the specific meaning of the DCI format 0_0 can be found in 3GPP TS38.212, chapter 7.3.1.1.

In one embodiment, the third signaling is DCI format 0_1, the specific meaning of the DCI format 0-1 can be found in 3GPP TS38.212, chapter 7.3.1.1.

In one embodiment, the third signaling is DCI format 0_2, the specific meaning of the DCI format 0_2 can be found in 3GPP TS38.212, chapter 7.3.1.1.

In one embodiment, the third signaling comprises scheduling information of a PSSCH.

In one embodiment, the third bit block comprises indication information of whether the third signaling is correctly received.

In one embodiment, the third bit block comprises indication information of whether a bit block scheduled by the third signaling is correctly received.

In one embodiment, the fifth bit block comprises the third bit block.

In one embodiment, the fifth bit block comprises all of bits in the third bit block.

In one embodiment, the fifth bit block only comprises part of bits in the third bit block.

In one embodiment, the third bit block generates the fifth bit block through a third procedure; and the third procedure comprises at least one operation of logic and, logical or, xor, deleting bit or zero-padding.

In one embodiment, the bit block generated by the third bit block comprises the third bit block.

In one embodiment, the bit block generated by the third bit block comprises all of bits in the third bit block.

In one embodiment, the bit block generated by the third bit block only comprises part of bits in the third bit block.

In one embodiment, the third bit block generates the bit block generated by the third bit block through a third procedure; and the third procedure comprises at least one operation of logic and, logical or, xor, deleting bit or zero-padding In one embodiment, the fifth bit block comprises an HARQ-ACK.

In one embodiment, the bit block generated by the third bit block comprises an HARQ-ACK.

In one embodiment, the fifth bit block comprises a bit carrying HARQ-ACK information.

In one embodiment, the bit block generated by the third bit block comprises a bit carrying HARQ-ACK information.

In one embodiment, the third bit block comprises at least one bit.

In one embodiment, the fifth bit block comprises at least one bit.

In one embodiment, the bit block generated by the third bit block comprises at least one bit.

In one embodiment, the first sub-signal comprises an output after all or part of bits in the fifth bit block sequentially through part or all of CRC Insertion, Segmentation, Code Block-level CRC Insertion, Channel Coding, Rate Matching, Concatenation, Scrambling, Modulation, Layer Mapping, Precoding, Mapping to REs, Multicarrier symbol Generation and Modulation and Upconversion.

In one embodiment, the second sub-signal carries a bit block generated by the third bit block; the second sub-signal comprises an output after all or part of bits in the bit block generated by the third bit block sequentially through part or all of CRC Insertion, Segmentation, Code Block-level CRC Insertion, Channel Coding, Rate Matching, Concatenation, Scrambling, Modulation, Layer Mapping, Precoding, Mapping to REs, Multicarrier symbol Generation and Modulation and Upconversion.

In one embodiment, the third target index is a priority index.

In one embodiment, the third target index is a priority index 1 or a priority index 0.

In one embodiment, the third target index is a positive integer.

In one embodiment, the third target index is used to indicate an index of a priority.

In one embodiment, the third target index indicates one of multiple priorities.

In one embodiment, the third target index indicates one of a high priority and a low priority.

In one embodiment, the third target index is an index used to indicate different service types.

In one embodiment, the third target index indicates one of multiple service types.

In one embodiment, the third target index is equal to 0.

In one embodiment, the third target index is equal to 1.

In one embodiment, the third target index and the second target index are both positive integers; and the third target index is greater than the second target index.

In one embodiment, the third target index and the second target index are both positive integers; and the third target index is less than the second target index.

In one embodiment, the third target index and the second target index respectively indicate different priorities.

In one embodiment, the third target index and the second target index respectively indicate different service types.

In one embodiment, the third target index indicates a high priority, and the second target index indicates a low priority.

In one embodiment, the second target index indicates a high priority, and the third target index indicates a low priority.

In one embodiment, the second target index is 0; and the third target index is 1.

In one embodiment, the second target index is 1; and the third target index is 0.

In one embodiment, when the second target index is different from the first target index, the third target index is the same as the first target index.

In one embodiment, when the second target index is the same as the first target index, the third target index is different from the first target index.

In one embodiment, the first target index and the second target index are used together to determine whether the second sub-signal carries a bit block generated by the second bit block or a bit block generated by the third bit block.

In one embodiment, when the second sub-signal carries a bit block generated by the second bit block, the second sub-signal does not carry any bit block generated by the third bit block; and when the second sub-signal does not carry any bit block generated by the second bit block, the second sub-signal does not carry a bit block generated by the third bit block.

Embodiment 10A

Embodiment 10A illustrates a schematic diagram of relations among a second signaling, a fourth bit block and a second time-frequency-resource block according to one embodiment of the present disclosure, as shown in FIG. 10A.

In Embodiment 10A, a second time-frequency-resource block is reserved for a fourth bit block; and a second signaling is used to determine the second time-frequency-resource block.

In one embodiment, the second signaling is an RRC layer signaling

In one embodiment, the second signaling comprises one or more fields in an RRC-layer signaling.

In one embodiment, the second signaling is dynamically configured.

In one embodiment, the second signaling is a physical-layer signaling.

In one embodiment, the second signaling comprises one or more fields in a physical-layer signaling.

In one embodiment, the second signaling is a higher-layer signaling.

In one embodiment, the second signaling comprises one or more fields in a higher-layer signaling.

In one embodiment, the second signaling is a DCI signaling.

In one embodiment, the second signaling comprises one or more fields of DCI.

In one embodiment, the second signaling comprises one or more fields in an IE.

In one embodiment, the second signaling is an UpLink Grant Signaling.

In one embodiment, the second signaling is transmitted on a downlink physical layer control channel (i.e., a downlink channel that can only be used for bearing physical layer signaling).

In one embodiment, the second signaling is DCI format 0_0, the specific meaning of the DCI format 0_0 can be found in 3GPP TS38.212, chapter 7.3.1.1.

In one embodiment, the second signaling is DCI format 0_1, the specific meaning of the DCI format 0-1 can be found in 3GPP TS38.212, chapter 7.3.1.1.

In one embodiment, the second signaling is DCI format 0_2, the specific meaning of the DCI format 0_2 can be found in 3GPP TS38.212, chapter 7.3.1.1.

In one embodiment, the second signaling is a signaling used to schedule an uplink physical layer data channel.

In one embodiment, the UL physical-layer data channel is a Physical Uplink Shared CHannel (PUSCH).

In one subembodiment, the UL physical-layer data channel is an sPUSCH.

In one embodiment, the UL physical-layer data channel is an NB-PUSCH.

In one embodiment, the fourth bit block comprises a TB.

In one embodiment, the fourth bit block comprises a CBG.

In one embodiment, the second signaling explicitly or implicitly indicates the first index.

In one embodiment, the second signaling explicitly or implicitly indicates the second index.

In one embodiment, the second signaling explicitly indicates the second time-frequency-resource block.

In one embodiment, the second signaling implicitly indicates the second time-frequency-resource block.

In one embodiment, one or more fields in the second signaling indicates the second time-frequency-resource block.

In one embodiment, the second signaling indicates time-domain resources occupied by the second time-frequency-resource block.

In one embodiment, the second signaling indicates frequency-domain resources occupied by the second time-frequency-resource block.

In one embodiment, the second signaling is used to indicate transmitting the fourth bit block in the second time-frequency-resource block.

Embodiment 10B

Embodiment 10B illustrates a structure block diagram of a processing device in a first node, as shown in FIG. 10B. In FIG. 10B, a first node's processing device 1000 comprises a first receiver 1001 and a first transmitter 1002.

In one embodiment, the first node 1000 is a UE.

In one embodiment, the first node 1000 is a relay node.

In one embodiment, the first node 1000 is a vehicle-mounted communication device.

In one embodiment, the first node 1000 is a UE that supports V2X communications.

In one embodiment, the first node 1000 is a relay node that supports V2X communications.

In one embodiment, the first receiver 1001 comprises at least one of the antenna 452, the receiver 454, the multi-antenna receiving processor 458, the receiving processor 456, the controller/processor 459, the memory 460 or the data source 467 in FIG. 4 of the present disclosure.

In one embodiment, the first receiver 1001 comprises at least the first five of the antenna 452, the receiver 454, the multi-antenna receiving processor 458, the receiving processor 456, the controller/processor 459, the memory 460 or the data source 467 in FIG. 4 of the present disclosure.

In one embodiment, the first receiver 1001 comprises at least the first four of the antenna 452, the receiver 454, the multi-antenna receiving processor 458, the receiving processor 456, the controller/processor 459, the memory 460 or the data source 467 in FIG. 4 of the present disclosure.

In one embodiment, the first receiver 1001 comprises at least the first three of the antenna 452, the receiver 454, the multi-antenna receiving processor 458, the receiving processor 456, the controller/processor 459, the memory 460 or the data source 467 in FIG. 4 of the present disclosure.

In one embodiment, the first receiver 1001 comprises at least the first two of the antenna 452, the receiver 454, the multi-antenna receiving processor 458, the receiving processor 456, the controller/processor 459, the memory 460 or the data source 467 in FIG. 4 of the present disclosure.

In one embodiment, the first transmitter 1002 comprises at least one of the antenna 452, the transmitter 454, the multi-antenna transmitting processor 457, the transmitting processor 468, the controller/processor 459, the memory 460, or the data source 467 in FIG. 4 of the present disclosure.

In one embodiment, the first transmitter 1002 comprises at least the first five of the antenna 452, the transmitter 454, the multi-antenna transmitting processor 457, the transmitting processor 468, the controller/processor 459, the memory 460, or the data source 467 in FIG. 4 of the present disclosure.

In one embodiment, the first transmitter 1002 comprises at least the first four of the antenna 452, the transmitter 454, the multi-antenna transmitting processor 457, the transmitting processor 468, the controller/processor 459, the memory 460, or the data source 467 in FIG. 4 of the present disclosure.

In one embodiment, the first transmitter 1002 comprises at least the first three of the antenna 452, the transmitter 454, the multi-antenna transmitting processor 457, the transmitting processor 468, the controller/processor 459, the memory 460, or the data source 467 in FIG. 4 of the present disclosure.

In one embodiment, the first transmitter 1002 comprises at least the first two of the antenna 452, the transmitter 454, the multi-antenna transmitting processor 457, the transmitting processor 468, the controller/processor 459, the memory 460, or the data source 467 in FIG. 4 of the present disclosure.

In Embodiment 10B, the first receiver 1001 receives a first signaling and a second signaling; the first transmitter 1002 transmits a first signal in a first time-frequency-resource block, and the first signal carries a first bit block group and a fourth bit block; the first signaling indicates the first time-frequency-resource block; the first signaling comprises scheduling information of the first signal; the second signaling is used to determine a second bit block; the first signal comprises a first sub-signal and a second sub-signal; the first sub-signal and the second sub-signal respectively carry different bit blocks in the first bit block group; the first sub-signal carries the fourth bit block, and the second bit block is used to generate the fourth bit block; the first signaling indicates a first target index, and the second signaling indicates a second target index; the first target index and the second target index are used together to determine whether the second sub-signal carries a bit block generated by the second bit block.

In one embodiment, the second sub-signal carries a bit block generated by the second bit block; and the bit block generated by the second bit block is the same as the fourth bit block.

In one embodiment, a first index is different from a second index; when the first target index is the first index and the second target index is the second index, the second sub-signal does not carry a bit block generated by the second bit block; when the first target index is not the first index or the second target index is not the second index, the second sub-signal carries a bit block generated by the second bit block.

In one embodiment, the second bit block comprises an HARQ-ACK.

In one embodiment, the first sub-signal and the second sub-signal occupies same time-frequency resources.

In one embodiment, the first signal is mapped onto multiple transmission layers; the multiple transmission layers comprises a first transmission layer and a second transmission layer, and the first transmission layer is different from the second transmission layer; the first sub-signal comprises a part of the first signal mapped onto the first transmission layer; and the second sub-signal comprises a part of the first signal mapped onto the second transmission layer.

In one embodiment, the first time-frequency-resource block comprises a first time-frequency resource sub-block and a second time-frequency-resource block; the first time-frequency resource sub-block does not overlap with the second time-frequency resource sub-block; the first sub-signal comprises a part of the first signal mapped into the first time-frequency resource sub-block; the second sub-signal comprises a part of the first signal mapped into the second time-frequency resource sub-block.

In one embodiment, a first time-frequency-resource block comprises a PUSCH; a second bit block comprises an HARQ-ACK; a first signal is transmitted in the PUSCH; the first signal comprises a first sub-signal and a second sub-signal; the first sub-signal and the second sub-signal respectively carry different bit blocks in a first bit block group; the different bit blocks in the first bit block group respectively comprise a TB; the first sub-signal carries a fourth bit block, and the second bit block is used to generate the fourth bit block; the first sub-signal and the second sub-signal occupy same time-frequency resources; the first signal is mapped to multiple transmission layers; the multiple transmission layers comprises a first transmission layer and a second transmission layer, and the first transmission layer is different from the second transmission layer; the first sub-signal comprises a part of the first signal mapped onto the first transmission layer; the second sub-signal comprises a part of the first signal mapped onto the second transmission layer; a first signaling indicates a first target index, and the first index comprises scheduling information of the PUSCH; a second signaling indicates a second target index, and the second signaling is used to determine the second bit block; the first index and the second index are respectively different priority indexes; when the first target index is the first index and the second target index is the second index, the second sub-signal does not carry a bit block generated by the second bit block; when the first target index is not the first index or the second target index is not the second index, the second sub-signal carries a bit block carrying HARQ-ACK information generated by the second bit block.

In one subembodiment of the above embodiment, the first signaling comprises one or more fields in DCI; the first signaling comprises a Priority Indicator field; and a Priority Indicator field in the first signaling indicates the first target index.

In one subembodiment of the above embodiment, the second signaling comprises one or more fields in DCI; the second signaling comprises a Priority Indicator field; and a Priority Indicator field in the second signaling indicates the second target index.

In one subembodiment of the above embodiment, the first index is equal to 0; and the second index is equal to 1.

In one subembodiment of the above embodiment, the first index is equal to 1; and the second index is equal to 0.

In one embodiment, a first time-frequency-resource block comprises a PUSCH; a second bit block comprises an HARQ-ACK; a first signal is transmitted in the PUSCH; the first signal comprises a first sub-signal and a second sub-signal; the first sub-signal and the second sub-signal respectively carry different bit blocks in a first bit block group; the different bit blocks in the first bit block group respectively comprise a TB; the first sub-signal carries a fourth bit block, and the second bit block is used to generate the fourth bit block; the PUSCH comprises a first time-frequency resource sub-block and a second time-frequency-resource block; the first time-frequency resource sub-block and the second time-frequency resource sub-block are not overlapped; the first time-frequency resource sub-block comprises K1 RE(s) in the PUSCH; the second time-frequency resource sub-block comprises K2 the RE(s) other than the K1 RE(s) in the PUSCH; both the K1 and the K2 are greater than 0; the first sub-signal comprises a part of the first signal mapped into the first time-frequency resource sub-block; the second sub-signal comprises a part of the first signal mapped into the second time-frequency resource sub-block; a first signaling indicates a first target index, and the first index comprises scheduling information of the PUSCH; a second signaling indicates a second target index, and the second signaling is used to determine the second bit block; the first index and the second index are respectively different priority indexes; when the first target index is the first index and the second target index is the second index, the second sub-signal does not carry a bit block generated by the second bit block; when the first target index is not the first index or the second target index is not the second index, the second sub-signal carries a bit block carrying HARQ-ACK information generated by the second bit block.

In one subembodiment of the above embodiment, the first signaling comprises one or more fields in DCI; the first signaling comprises a Priority Indicator field; and a Priority Indicator field in the first signaling indicates the first target index.

In one subembodiment of the above embodiment, the second signaling comprises one or more fields in DCI; the second signaling comprises a Priority Indicator field; and a Priority Indicator field in the second signaling indicates the second target index.

In one subembodiment of the above embodiment, the K1 is equal to 1; and the K2 is equal to 1;

In one subembodiment of the above embodiment, the K1 is greater than or equal to 1; and the K2 is greater than or equal to 1.

In one subembodiment of the above embodiment, the first index is equal to 0; and the second index is equal to 1.

In one subembodiment of the above embodiment, the first index is equal to 1; and the second index is equal to 0.

Embodiment 11A

Embodiment 11A illustrates a schematic diagram of relations among a third signaling, a third bit block and a first time-frequency-resource block according to one embodiment of the present disclosure, as shown in FIG. 11A.

In Embodiment 11A, the first time-frequency-resource block is reserved for a third bit block; and a third signaling is used to determine the first time-frequency-resource block.

In one embodiment, the third signaling is an RRC layer signaling.

In one embodiment, the third signaling comprises one or more fields in an RRC-layer signaling.

In one embodiment, the third signaling is dynamically configured.

In one embodiment, the third signaling is a physical-layer signaling.

In one embodiment, the third signaling comprises one or more fields in a physical-layer signaling In one embodiment, the third signaling is a higher-layer signaling.

In one embodiment, the third signaling comprises one or more fields in a higher-layer signaling In one embodiment, the third signaling is a DCI signaling.

In one embodiment, the third signaling comprises one or more fields of a piece of DCI.

In one embodiment, the third signaling comprises one or more fields in an IE.

In one embodiment, the third signaling is an uplink scheduled signaling.

In one embodiment, the third signaling is transmitted on a downlink physical layer control channel (i.e., a downlink channel that can only be used for bearing a physical layer signaling).

In one embodiment, the third signaling is DCI format 0_0, the specific meaning of the DCI format 0_0 can be found in 3GPP TS38.212, chapter 7.3.1.1.

In one embodiment, the third signaling is DCI format 0_1, the specific meaning of the DCI format 0-1 can be found in 3GPP TS38.212, chapter 7.3.1.1.

In one embodiment, the third signaling is DCI format 0_2, the specific meaning of the DCI format 0_2 can be found in 3GPP TS38.212, chapter 7.3.1.1.

In one embodiment, the third signaling is a signaling used to schedule an uplink physical layer data channel In one embodiment, the third bit block comprises a TB.

In one embodiment, the third bit block comprises a CBG.

In one embodiment, the third signaling explicitly or implicitly indicates the first index.

In one embodiment, the third signaling is used to indicate transmitting the third bit block in the first time-frequency-resource block.

In one embodiment, the third signaling explicitly indicates the first time-frequency-resource block.

In one embodiment, the third signaling implicitly indicates the first time-frequency-resource block.

In one embodiment, one or more fields in the third signaling indicates the first time-frequency-resource block.

In one embodiment, the third signaling indicates time-domain resources occupied by the first time-frequency-resource block.

In one embodiment, the third signaling indicates frequency-domain resources occupied by the first time-frequency-resource block.

In one embodiment, the second signaling explicitly or implicitly indicates the first index; and the third signaling explicitly or implicitly indicates the first index.

Embodiment 11B

Embodiment 11B illustrates a structure block diagram of a processing device in a second node, as shown in FIG. 11B. In FIG. 11B, a second node's processing device 1100 comprises a second transmitter 1101 and a second receiver 1102.

In one embodiment, the second node 1100 is a UE.

In one embodiment, the second node 1100 is a base station.

In one embodiment, the second node 1100 is a relay node.

In one embodiment, the second node 1100 is a vehicle-mounted communication device.

In one embodiment, the second node 1100 is a UE supporting V2X communications.

In one embodiment, the second transmitter 1101 comprises at least one of the antenna 420, the transmitter 418, the multi-antenna transmitting processor 471, the transmitting processor 416, the controller/processor 475 or the memory 476 in FIG. of the present disclosure.

In one embodiment, the second transmitter 1101 comprises at least first five of the antenna 420, the transmitter 418, the multi-antenna transmitting processor 471, the transmitting processor 416, the controller/processor 475 or the memory 476 in FIG. 4 of the present disclosure.

In one embodiment, the second transmitter 1101 comprises at least first four of the antenna 420, the transmitter 418, the multi-antenna transmitting processor 471, the transmitting processor 416, the controller/processor 475 or the memory 476 in FIG. 4 of the present disclosure.

In one embodiment, the second transmitter 1101 comprises at least first three of the antenna 420, the transmitter 418, the multi-antenna transmitting processor 471, the transmitting processor 416, the controller/processor 475 or the memory 476 in FIG. 4 of the present disclosure.

In one embodiment, the second transmitter 1101 comprises at least first two of the antenna 420, the transmitter 418, the multi-antenna transmitting processor 471, the transmitting processor 416, the controller/processor 475 or the memory 476 in FIG. 4 of the present disclosure.

In one embodiment, the second receiver 1102 comprises at least one of the antenna 420, the receiver 418, the multi-antenna receiving processor 472, the receiving processor 470, the controller/processor 475 or the memory 476 in FIG. 4 of the present disclosure.

In one embodiment, the second receiver 1102 comprises at least first five of the antenna 420, the receiver 418, the multi-antenna receiving processor 472, the receiving processor 470, the controller/processor 475 or the memory 476 in FIG. 4 of the present disclosure.

In one embodiment, the second receiver 1102 comprises at least first four of the antenna 420, the receiver 418, the multi-antenna receiving processor 472, the receiving processor 470, the controller/processor 475 or the memory 476 in FIG. 4 of the present disclosure.

In one embodiment, the second receiver 1102 comprises at least first three of the antenna 420, the receiver 418, the multi-antenna receiving processor 472, the receiving processor 470, the controller/processor 475 or the memory 476 in FIG. 4 of the present disclosure.

In one embodiment, the second receiver 1102 comprises at least first two of the antenna 420, the receiver 418, the multi-antenna receiving processor 472, the receiving processor 470, the controller/processor 475 or the memory 476 in FIG. 4 of the present disclosure.

In Embodiment 11B, the second transmitter 1101 transmits a first signaling and a second signaling; the second receiver 1102 receives a first signal in a first time-frequency-resource block, and the first signal carries a first bit block group and a fourth bit block; the first signaling indicates the first time-frequency-resource block; the first signaling comprises scheduling information of the first signal; the second signaling is used to determine a second bit block; the first signal comprises a first sub-signal and a second sub-signal; the first sub-signal and the second sub-signal respectively carry different bit blocks in the first bit block group; the first sub-signal carries the fourth bit block, and the second bit block is used to generate the fourth bit block; the first signaling indicates a first target index, and the second signaling indicates a second target index; the first target index and the second target index are used together to determine whether the second sub-signal carries a bit block generated by the second bit block.

In one embodiment, the second sub-signal carries a bit block generated by the second bit block; and the bit block generated by the second bit block is the same as the fourth bit block.

In one embodiment, a first index is different from a second index; when the first target index is the first index and the second target index is the second index, the second sub-signal does not carry a bit block generated by the second bit block; when the first target index is not the first index or the second target index is not the second index, the second sub-signal carries a bit block generated by the second bit block.

In one embodiment, the second bit block comprises an HARQ-ACK.

In one embodiment, the first sub-signal and the second sub-signal occupies same time-frequency resources.

In one embodiment, the first signal is mapped onto multiple transmission layers; the multiple transmission layers comprises a first transmission layer and a second transmission layer, and the first transmission layer is different from the second transmission layer; the first sub-signal comprises a part of the first signal mapped onto the first transmission layer; the second sub-signal comprises a part of the first signal mapped onto the second transmission layer.

In one embodiment, the first time-frequency-resource block comprises a first time-frequency resource sub-block and a second time-frequency-resource block; the first time-frequency resource sub-block does not overlap with the second time-frequency resource sub-block; the first sub-signal comprises a part of the first signal mapped into the first time-frequency resource sub-block; the second sub-signal comprises a part of the first signal mapped into the second time-frequency resource sub-block.

Embodiment 12

Figure 12:
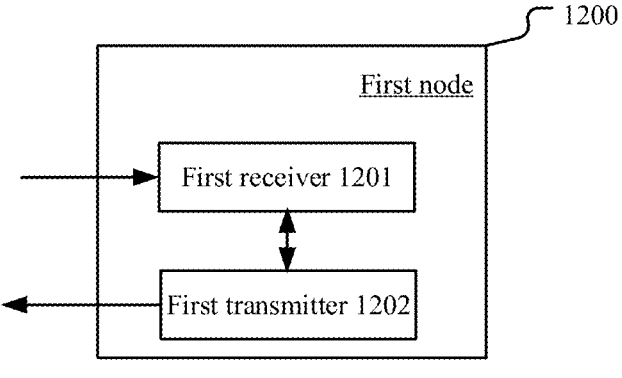
FIG. 12 illustrates a structure block diagram of a processing device in a first node according to one embodiment of the present disclosure.

Embodiment 12 illustrates a structure block diagram of a processing device in a first node, as shown in FIG. 12. In FIG. 12, a first node's processing device 1200 comprises a first receiver 1201 and a first transmitter 1202.

In one embodiment, the first node 1200 is a UE.

In one embodiment, the first node 1200 is a relay node.

In one embodiment, the first node 1200 is a vehicle-mounted communication device.

In one embodiment, the first node 1200 is a UE that supports V2X communications.

In one embodiment, the first node 1200 is a relay node that supports V2X communications.

In one embodiment, the first receiver 1201 comprises at least one of the antenna 452, the receiver 454, the multi-antenna receiving processor 458, the receiving processor 456, the controller/processor 459, the memory 460 or the data source 467 in FIG. 4 of the present disclosure.

In one embodiment, the first receiver 1201 comprises at least the first five of the antenna 452, the receiver 454, the multi-antenna receiving processor 458, the receiving processor 456, the controller/processor 459, the memory 460 or the data source 467 in FIG. 4 of the present disclosure.

In one embodiment, the first receiver 1201 comprises at least the first four of the antenna 452, the receiver 454, the multi-antenna receiving processor 458, the receiving processor 456, the controller/processor 459, the memory 460 or the data source 467 in FIG. 4 of the present disclosure.

In one embodiment, the first receiver 1201 comprises at least the first three of the antenna 452, the receiver 454, the multi-antenna receiving processor 458, the receiving processor 456, the controller/processor 459, the memory 460 or the data source 467 in FIG. 4 of the present disclosure.

In one embodiment, the first receiver 1201 comprises at least the first two of the antenna 452, the receiver 454, the multi-antenna receiving processor 458, the receiving processor 456, the controller/processor 459, the memory 460 or the data source 467 in FIG. 4 of the present disclosure.

In one embodiment, the first transmitter 1202 comprises at least one of the antenna 452, the transmitter 454, the multi-antenna transmitting processor 457, the transmitting processor 468, the controller/processor 459, the memory 460, or the data source 467 in FIG. 4 of the present disclosure.

In one embodiment, the first transmitter 1202 comprises at least first five the antenna 452, the transmitter 454, the multi-antenna transmitting processor 457, the transmitting processor 468, the controller/processor 459, the memory 460, or the data source 467 in FIG. 4 of the present disclosure.

In one embodiment, the first transmitter 1202 comprises at least first four the antenna 452, the transmitter 454, the multi-antenna transmitting processor 457, the transmitting processor 468, the controller/processor 459, the memory 460, or the data source 467 in FIG. 4 of the present disclosure.

In one embodiment, the first transmitter 1202 comprises at least first three the antenna 452, the transmitter 454, the multi-antenna transmitting processor 457, the transmitting processor 468, the controller/processor 459, the memory 460, or the data source 467 in FIG. 4 of the present disclosure.

In one embodiment, the first transmitter 1202 comprises at least first two the antenna 452, the transmitter 454, the multi-antenna transmitting processor 457, the transmitting processor 468, the controller/processor 459, the memory 460, or the data source 467 in FIG. 4 of the present disclosure.

In Embodiment 12, the first receiver 1201 receives a first signaling; the first transmitter 1202 transmits a first signal in a target time-frequency-resource block, the first signal carrying a second bit block; herein, the first signaling is used to determine a first bit block; the first bit block comprises a second-type HARQ-ACK; the first bit block is used to generate the second bit block; the target time-frequency-resource block is a first time-frequency-resource block or a second time-frequency-resource block; the first time-frequency-resource block and the second time-frequency-resource block are respectively reserved for different bit blocks; a number of resources used to transmit a first-type HARQ-ACK in the first time-frequency-resource block is used to determine whether the target time-frequency-resource block is the first time-frequency-resource block or the second time-frequency-resource block; the first-type HARQ-ACK corresponds to a first index; the second-type HARQ-ACK corresponds to a second index, and the first index is not equal to the second index; the first signaling indicates the second index; and the first time-frequency-resource block corresponds to the first index.

In one embodiment, the first time-frequency-resource block and the second time-frequency-resource block respectively belong to two different serving cells, and a serving cell ID corresponding to the first time-frequency-resource block is smaller than a serving cell ID corresponding to the second time-frequency-resource block.

In one embodiment, the second time-frequency-resource block corresponds to the first index.

In one embodiment, when a number of resources used to transmit the first-type HARQ-ACK in the first time-frequency-resource block is equal to 0, the target time-frequency-resource block is the first time-frequency-resource block;

when the number of resources used to transmit the first-type HARQ-ACK in the first time-frequency-resource block is greater than 0, the target time-frequency-resource block is the second time-frequency-resource block.

In one embodiment, when a number of resources used to transmit the first-type HARQ-ACK in the first time-frequency-resource block is not greater than a first value, the target time-frequency-resource block is greater than the first time-frequency-resource block; when the number of resources used to transmit the first-type HARQ-ACK in the first time-frequency-resource block is the first value, the target time-frequency-resource block is the second time-frequency-resource block; the first value is greater than 0.

In one embodiment, a first radio resource block is reserved for the first bit block; the first signaling is used to determine the first radio resource block; the first radio resource block overlaps with the first time-frequency-resource block in time domain; and the first radio resource block overlaps with the second time-frequency-resource block in time domain.

In one embodiment, the first receiver 1201 receives a second signaling; herein, the second time-frequency-resource block is reserved for a fourth bit block; and the second signaling is used to determine the second time-frequency-resource block.

In one embodiment, a first signal is transmitted in a target time-frequency-resource block, and the first signal carries a second bit block; a first signaling comprises one or more fields in a piece of DCI; the first signaling is used to determine a first bit block; both a first index and a second index are priority indexes; the first index is different from the second index; the first signaling indicates the second index; a first-type HARQ-ACK is an HARQ-ACK corresponding to the first index; a second-type HARQ-ACK is an HARQ-ACK corresponding to the second index; the first bit block comprises a second-type HARQ-ACK; the second bit block comprises the second-type HARQ-ACK comprised in the first bit block, or, the second bit block comprises a bit generated by the second-type HARQ-ACK comprised in the first bit block; the target time-frequency-resource block is a first time-frequency-resource block or a second time-frequency-resource block; the first time-frequency-resource block and the second time-frequency-resource block respectively comprise a PUSCH; the PUSCH comprised in the first time-frequency-resource block and the PUSCH comprised in the second time-frequency-resource block are respectively reserved for different bit blocks; when a number of resources used to transmit the first-type HARQ-ACK in the first time-frequency-resource block is equal to 0, the target time-frequency-resource block is the first time-frequency-resource block; the second bit block is transmitted in the PUSCH comprised in the first time-frequency-resource block; when the number of resources used to transmit the first-type HARQ-ACK in the first time-frequency-resource block is greater than 0, the target time-frequency-resource block is the second time-frequency-resource block; the second bit block is transmitted in the PUSCH comprised in the second time-frequency-resource block; the PUSCH comprised in the first time-frequency-resource block is a PUSCH whose priority index is the first index.

In one subembodiment of the above embodiment, the PUSCH comprised in the second time-frequency-resource block is a PUSCH whose priority index is the first index.

In one subembodiment of the above embodiment, the first time-frequency-resource block and the second time-frequency-resource block respectively belong to two different serving cells, and a serving cell ID corresponding to the first time-frequency-resource block is smaller than a serving cell ID corresponding to the second time-frequency-resource block.

In one subembodiment of the above embodiment, the phrase that a number of resources used to transmit the first-type HARQ-ACK in the first time-frequency-resource block is equal to 0 includes: the first time-frequency-resource block is not used to transmit the first-type HARQ-ACK.

In one subembodiment of the above embodiment, the phrase that a number of resources used to transmit the first-type HARQ-ACK in the first time-frequency-resource block is greater than 0 includes: the first time-frequency-resource block is used to transmit the first-type HARQ-ACK.

In one embodiment, a first signal is transmitted in a target time-frequency-resource block, and the first signal carries a second bit block; a first signaling comprises one or more fields in a piece of DCI; the first signaling is used to determine a first bit block; both a first index and a second index are priority indexes; the first index is equal to 1, and the second index is equal to 0; the first signaling indicates the second index; a first-type HARQ-ACK is an HARQ-ACK of priority index 1; a second-type HARQ-ACK is an HARQ-ACK of priority index 0; the first bit block comprises a second-type HARQ-ACK; the second bit block comprises the second-type HARQ-ACK comprised in the first bit block, or, the second bit block comprises a bit generated by the second-type HARQ-ACK comprised in the first bit block; the target time-frequency-resource block is a first time-frequency-resource block or a second time-frequency-resource block; the first time-frequency-resource block and the second time-frequency-resource block respectively comprise a PUSCH of priority index 1; the PUSCH of priority index 1 comprised in the first time-frequency-resource block and the PUSCH of priority index 1 comprised in the second time-frequency-resource block are respectively reserved for different bit blocks; when a number of resources used to transmit the first-type HARQ-ACK in the first time-frequency-resource block is equal to 0, the target time-frequency-resource block is the first time-frequency-resource block; the second bit block is transmitted in the PUSCH of priority index 1 comprised in the first time-frequency-resource block; when the number of resources used to transmit the first-type HARQ-ACK in the first time-frequency-resource block is greater than 0, the target time-frequency-resource block is the second time-frequency-resource block; the second bit block is transmitted in the PUSCH of priority index 1 comprised in the second time-frequency-resource block.

In one subembodiment of the above embodiment, the first time-frequency-resource block and the second time-frequency-resource block respectively belong to two different serving cells, and a serving cell ID corresponding to the first time-frequency-resource block is smaller than a serving cell ID corresponding to the second time-frequency-resource block.

In one subembodiment of the above embodiment, the phrase that a number of resources used to transmit the first-type HARQ-ACK in the first time-frequency-resource block is equal to 0 includes: the first time-frequency-resource block is not used to transmit the first-type HARQ-ACK.

In one subembodiment of the above embodiment, the phrase that a number of resources used to transmit the first-type HARQ-ACK in the first time-frequency-resource block is greater than 0 includes: the first time-frequency-resource block is used to transmit the first-type HARQ-ACK.

Embodiment 13

Figure 13:
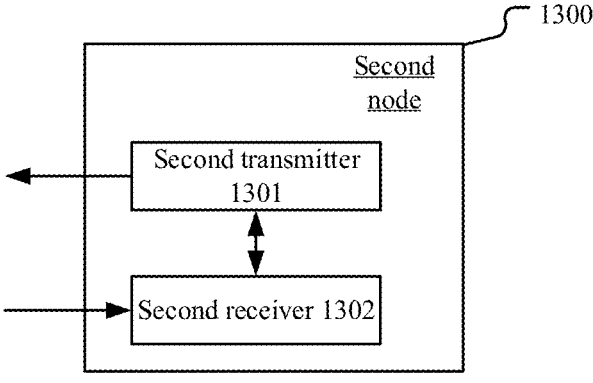
FIG. 13 illustrates a structure block diagram of a processing device in second node according to one embodiment of the present disclosure.

Embodiment 13 illustrates a structure block diagram of a processing device in a second node, as shown in FIG. 13. In FIG. 13, a second node's processing device 1300 comprises a second transmitter 1301 and a second receiver 1302.

In one embodiment, the second node 1300 is a UE.

In one embodiment, the second node 1300 is a base station.

In one embodiment, the second node 1300 is a relay node.

In one embodiment, the second node 1300 is a vehicle-mounted communication device.

In one embodiment, the second node 1300 is a UE supporting V2X communications.

In one embodiment, the second transmitter 1301 comprises at least one of the antenna 420, the transmitter 418, the multi-antenna transmitting processor 471, the transmitting processor 416, the controller/processor 475 or the memory 476 in FIG. of the present disclosure.

In one embodiment, the second transmitter 1301 comprises at least the first five of the antenna 420, the transmitter 418, the multi-antenna transmitting processor 471, the transmitting processor 416, the controller/processor 475 or the memory 476 in FIG. 4 of the present disclosure.

In one embodiment, the second transmitter 1301 comprises at least the first four of the antenna 420, the transmitter 418, the multi-antenna transmitting processor 471, the transmitting processor 416, the controller/processor 475 or the memory 476 in FIG. 4 of the present disclosure.

In one embodiment, the second transmitter 1301 comprises at least the first three of the antenna 420, the transmitter 418, the multi-antenna transmitting processor 471, the transmitting processor 416, the controller/processor 475 or the memory 476 in FIG. 4 of the present disclosure.

In one embodiment, the second transmitter 1301 comprises at least the first two of the antenna 420, the transmitter 418, the multi-antenna transmitting processor 471, the transmitting processor 416, the controller/processor 475 or the memory 476 in FIG. 4 of the present disclosure.

In one embodiment, the second receiver 1302 comprises at least one of the antenna 420, the receiver 418, the multi-antenna receiving processor 472, the receiving processor 470, the controller/processor 475 or the memory 476 in FIG. 4 of the present disclosure.

In one embodiment, the second receiver 1302 comprises at least first five of the antenna 420, the receiver 418, the multi-antenna receiving processor 472, the receiving processor 470, the controller/processor 475 or the memory 476 in FIG. 4 of the present disclosure.

In one embodiment, the second receiver 1302 comprises at least first four of the antenna 420, the receiver 418, the multi-antenna receiving processor 472, the receiving processor 470, the controller/processor 475 or the memory 476 in FIG. 4 of the present disclosure.

In one embodiment, the second receiver 1302 comprises at least first three of the antenna 420, the receiver 418, the multi-antenna receiving processor 472, the receiving processor 470, the controller/processor 475 or the memory 476 in FIG. 4 of the present disclosure.

In one embodiment, the second receiver 1302 comprises at least first two of the antenna 420, the receiver 418, the multi-antenna receiving processor 472, the receiving processor 470, the controller/processor 475 or the memory 476 in FIG. 4 of the present disclosure.

In Embodiment 13, the second transmitter 1301 transmits a first signaling; the second receiver 1302 receives a first signal in a target time-frequency-resource block, the first signal carrying a second bit block; herein, the first signaling is used to determine a first bit block; the first bit block comprises a second-type HARQ-ACK; the first bit block is used to generate the second bit block; the target time-frequency-resource block is a first time-frequency-resource block or a second time-frequency-resource block; the first time-frequency-resource block and the second time-frequency-resource block are respectively reserved for different bit blocks; a number of resources used to transmit a first-type HARQ-ACK in the first time-frequency-resource block is used to determine whether the target time-frequency-resource block is the first time-frequency-resource block or the second time-frequency-resource block; the first-type HARQ-ACK corresponds to a first index; the second-type HARQ-ACK corresponds to a second index, and the first index is not equal to the second index; the first signaling indicates the second index; and the first time-frequency-resource block corresponds to the first index.

In one embodiment, the first time-frequency-resource block and the second time-frequency-resource block respectively belong to two different serving cells, and a serving cell ID corresponding to the first time-frequency-resource block is smaller than a serving cell ID corresponding to the second time-frequency-resource block.

In one embodiment, the second time-frequency-resource block corresponds to the first index.

In one embodiment, when a number of resources used to transmit the first-type HARQ-ACK in the first time-frequency-resource block is equal to 0, the target time-frequency-resource block is the first time-frequency-resource block;

when the number of resources used to transmit the first-type HARQ-ACK in the first time-frequency-resource block is greater than 0, the target time-frequency-resource block is the second time-frequency-resource block.

In one embodiment, when a number of resources used to transmit the first-type HARQ-ACK in the first time-frequency-resource block is not greater than a first value, the target time-frequency-resource block is the first time-frequency-resource block; when the number of resources used to transmit the first-type HARQ-ACK in the first time-frequency-resource block is greater than the first value, the target time-frequency-resource block is the second time-frequency-resource block; the first value is greater than 0.

In one embodiment, a first radio resource block is reserved for the first bit block; the first signaling is used to determine the first radio resource block; the first radio resource block overlaps with the first time-frequency-resource block in time domain; and the first radio resource block overlaps with the second time-frequency-resource block in time domain.

In one embodiment, the second transmitter 1301 transmits a second signaling; herein, the second time-frequency-resource block is reserved for a fourth bit block; and the second signaling is used to determine the second time-frequency-resource block.

In one embodiment, a first signal is transmitted in a target time-frequency-resource block, and the first signal carries a second bit block; a first signaling comprises one or more fields in a piece of DCI; the first signaling is used to determine a first bit block; both a first index and a second index are priority indexes; the first index is different from the second index; the first signaling indicates the second index; a first-type HARQ-ACK is an HARQ-ACK corresponding to the first index; a second-type HARQ-ACK is an HARQ-ACK corresponding to the second index; the first bit block comprises a second-type HARQ-ACK; the second bit block comprises the second-type HARQ-ACK comprised in the first bit block, or, the second bit block comprises a bit generated by the second-type HARQ-ACK comprised in the first bit block; the target time-frequency-resource block is a first time-frequency-resource block or a second time-frequency-resource block; the first time-frequency-resource block and the second time-frequency-resource block respectively comprise a PUSCH; the PUSCH comprised in the first time-frequency-resource block and the PUSCH comprised in the second time-frequency-resource block are respectively reserved for different bit blocks; when a number of resources used to transmit the first-type HARQ-ACK in the first time-frequency-resource block is not greater than a first value, the target time-frequency-resource block is the first time-frequency-resource block; the second bit block is transmitted in the PUSCH comprised in the first time-frequency-resource block; when the number of resources used to transmit the first-type HARQ-ACK in the first time-frequency-resource block is greater than the first value, the target time-frequency-resource block is the second time-frequency-resource block; the second bit block is transmitted in the PUSCH comprised in the second time-frequency-resource block; the first value is greater than 0; the PUSCH comprised in the first time-frequency-resource block is a PUSCH whose priority index is the first index.

In one subembodiment of the above embodiment, the PUSCH comprised in the second time-frequency-resource block is a PUSCH whose priority index is the first index.

In one subembodiment of the above embodiment, the first time-frequency-resource block and the second time-frequency-resource block respectively belong to two different serving cells, and a serving cell ID corresponding to the first time-frequency-resource block is smaller than a serving cell ID corresponding to the second time-frequency-resource block.

In one subembodiment of the above embodiment, the phrase that a number of resources used to transmit the first-type HARQ-ACK in the first time-frequency-resource block is equal to 0 includes: the first time-frequency-resource block is not used to transmit the first-type HARQ-ACK.

In one subembodiment of the above embodiment, the phrase that a number of resources used to transmit the first-type HARQ-ACK in the first time-frequency-resource block is greater than 0 includes: the first time-frequency-resource block is used to transmit the first-type HARQ-ACK.

In one embodiment, a first signal is transmitted in a target time-frequency-resource block, and the first signal carries a second bit block; a first signaling comprises one or more fields in a piece of DCI; the first signaling is used to determine a first bit block; both a first index and a second index are priority indexes; the first index is equal to 1, and the second index is equal to 0; the first signaling indicates the second index; a first-type HARQ-ACK is an HARQ-ACK of priority index 1; a second-type HARQ-ACK is an HARQ-ACK of priority index 0; the first bit block comprises a second-type HARQ-ACK; the second bit block comprises the second-type HARQ-ACK comprised in the first bit block, or, the second bit block comprises a bit generated by the second-type HARQ-ACK comprised in the first bit block; the target time-frequency-resource block is a first time-frequency-resource block or a second time-frequency-resource block; the first time-frequency-resource block and the second time-frequency-resource block respectively comprise a PUSCH of priority index 1; the PUSCH of priority index 1 comprised in the first time-frequency-resource block and the PUSCH of priority index 1 comprised in the second time-frequency-resource block are respectively reserved for different bit blocks; when a number of resources used to transmit the first-type HARQ-ACK in the first time-frequency-resource block is not greater than a first value, the target time-frequency-resource block is the first time-frequency-resource block; the second bit block is transmitted in the PUSCH of priority index 1 comprised in the first time-frequency-resource block; when the number of resources used to transmit the first-type HARQ-ACK in the first time-frequency-resource block is greater than the first value, the target time-frequency-resource block is the second time-frequency-resource block; the second bit block is transmitted in the PUSCH of priority index 1 comprised in the second time-frequency-resource block; the first value is greater than 0.

In one subembodiment of the above embodiment, the first time-frequency-resource block and the second time-frequency-resource block respectively belong to two different serving cells, and a serving cell ID corresponding to the first time-frequency-resource block is smaller than a serving cell ID corresponding to the second time-frequency-resource block.

In one subembodiment of the above embodiment, the phrase that a number of resources used to transmit the first-type HARQ-ACK in the first time-frequency-resource block is equal to 0 includes: the first time-frequency-resource block is not used to transmit the first-type HARQ-ACK.

In one subembodiment of the above embodiment, the phrase that a number of resources used to transmit the first-type
HARQ-ACK in the first time-frequency-resource block is greater than 0 includes: the first time-frequency-resource block is used to transmit the first-type HARQ-ACK.

The ordinary skill in the art may understand that all or part of steps in the above method may be implemented by instructing related hardware through a program. The program may be stored in a computer readable storage medium, for example Read-Only Memory (ROM), hard disk or compact disc, etc. Optionally, all or part of steps in the above embodiments also may be implemented by one or more integrated circuits. Correspondingly, each module unit in the above embodiment may be realized in the form of hardware, or in the form of software function modules. The first node in the present disclosure includes but is not limited to mobile phones, tablet computers, notebooks, network cards, low-consumption equipment, enhanced MTC (eMTC) terminals, NB-IOT terminals, vehicle-mounted communication equipment, aircrafts, diminutive airplanes, unmanned aerial vehicles, telecontrolled aircrafts and other wireless communication devices. The second node in the present disclosure includes but is not limited to mobile phones, tablet computers, notebooks, network cards, low-consumption equipment, eMTC terminals, NB-IOT terminals, vehicle-mounted communication equipment, aircrafts, diminutive airplanes, unmanned aerial vehicles, telecontrolled aircrafts and other wireless communication devices. The UE or terminal in the present disclosure includes but is not limited to mobile phones, tablet computers, notebooks, network cards, low-consumption equipment, eMTC terminals, NB-IOT terminals, vehicle-mounted communication equipment, aircrafts, diminutive airplanes, unmanned aerial vehicles, telecontrolled aircrafts, etc. The base station or network side equipment in the present disclosure includes but is not limited to macro-cellular base stations, micro-cellular base stations, home base stations, relay base station, eNB, gNB, Transmitter Receiver Point (TRP), GNSS, relay satellites, satellite base stations, space base stations and other radio communication equipment.

The above are merely the preferred embodiments of the present disclosure and are not intended to limit the scope of protection of the present disclosure. Any modification, equivalent substitute and improvement made within the spirit and principle of the present disclosure are intended to be included within the scope of protection of the present disclosure.

What is claimed is:

1. A user equipment (UE) for wireless communications, comprising:
   a transceiver; and
   a processor;
   wherein the transceiver and the processor are configured to:
      transmit, in a first time-frequency-resource block, a first-type Hybrid Automatic Repeat reQuest Acknowledgement (HARQ-ACK) corresponding to a first index;
      receive a first control signaling indicating a second index associated with a second-type HARQ-ACK; and
      transmit, in a target time-frequency-resource block, a second-type HARQ-ACK corresponding to the second index;
   wherein a number of resources used to transmit the first-type HARQ-ACK in the first time-frequency-resource block is used to determine whether the target time-frequency-resource block is the first time-frequency-resource block or a second time-frequency-resource block.

2. The UE of claim 1, wherein the first control signaling is a Downlink Control Information (DCI) signaling.

3. The UE of claim 1, wherein the first control signaling is a Radio Resource Control (RRC) layer signaling.

4. The UE of claim 1, wherein the first time-frequency-resource block belongs to a first serving cell and the target time-frequency-resource block belongs to a second serving cell, and a serving cell identity (ID) corresponding to the first serving cell is less than a serving cell ID corresponding to the second serving cell.

5. The UE of claim 1, wherein the first time-frequency-resource block includes a first PUSCH and the second time-frequency-resource block includes a second Physical Uplink Shared Channel (PUSCH).

6. The UE of claim 1, wherein:
   on a condition that the number of resources used to transmit the first-type HARQ-ACK in the first time-frequency-resource block is equal to zero, the target time-frequency-resource block is the first time-frequency-resource block; and
   on a condition that the number of resources used to transmit the first-type HARQ-ACK in the first timefrequency-resource block is greater than zero, the target time-frequency-resource block is the second time-frequency-resource block.

7. The UE of claim 1, wherein a radio resource block is reserved for transmission of the first-type HARQ-ACK, wherein the first control signaling is used to determine the radio resource block, and wherein the radio resource block overlaps, in time domain, with both the first time-frequency-resource block and the second time-frequency-resource block on at least one multi-carrier symbol.

8. The UE of claim 1, wherein the transceiver is further configured to receive a second control signaling, and wherein the target time-frequency-resource block is reserved for transmission of a second-type HARQ-ACK based on the second control signaling.

9. The UE of claim 1, wherein the first index is different from the second index.

10. The UE of claim 1, wherein the first index and the second index are priority indexes.

11. A method performed by a user equipment (UE) for wireless communications, the method comprising:

transmitting, in a first time-frequency-resource block, a first-type Hybrid Automatic Repeat reQuest Acknowledgement (HARQ-ACK) corresponding to a first index;

receiving a first control signaling indicating a second index associated with a second- type HARQ-ACK; and transmitting, in a target time-frequency-resource block, a second-type HARQ-ACK corresponding to the second index;

wherein a number of resources used to transmit the first-type HARQ-ACK in the first time-frequency-resource block is used to determine whether the target time-frequency-resource block is the first time-frequency-resource block or a second time-frequency-resource block.

12. The method of claim 11, wherein the first control signaling is a Downlink Control Information (DCI) signaling.

13. The method of claim 11, wherein the first control signaling is a Radio Resource Control (RRC) layer signaling.

14. The method of claim 11, wherein the first time-frequency-resource block belongs to a first serving cell and the target time-frequency-resource block belongs to a second serving cell, and a serving cell identity (ID) corresponding to the first serving cell is less than a serving cell ID corresponding to the second serving cell.

15. The method of claim 11, wherein the first time-frequency-resource block includes a first Physical Uplink Shared Channel (PUSCH) and the second time-frequency-resource block includes a second PUSCH.

16. The method of claim 11, wherein:

on a condition that the number of resources used to transmit the first-type HARQ-ACK in the first time-frequency-resource block is equal to zero, the target time-frequency-resource block is the first time-frequency-resource block; and on a condition that the number of resources used to transmit the first-type HARQ-ACK in the first time-frequency-resource block is greater than zero, the target time-frequency-resource block is the second time-frequency-resource block.

17. The method of claim 11, wherein a radio resource block is reserved for transmission of the first-type HARQ-ACK, wherein the first control signaling is used to determine the radio resource block, and wherein the radio resource block overlaps, in time domain, with both the first time-frequency-resource block and the second time-frequency-resource block on at least one multi-carrier symbol.

18. The method of claim 11, further comprising:

receiving a second control signaling, and wherein the target time-frequency-resource block is reserved for transmission of a second-type HARQ-ACK based on the second control signaling.

19. The method of claim 11, wherein the first index is different from the second index.

20. The method of claim 11, wherein the first index and the second index are priority indexes.

* * * * *